United States Patent (10) Patent No.: US 8,073,201 B2
Satoh et al. (45) Date of Patent: Dec. 6, 2011

(54) POSITION/ORIENTATION MEASUREMENT METHOD AND APPARATUS

(75) Inventors: Kiyohide Satoh, Kawasaki (JP); Shinji Uchiyama, Yokohama (JP); Takaaki Endo, Urayasu (JP); Kenji Morita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1000 days.

(21) Appl. No.: 11/815,540

(22) PCT Filed: Feb. 3, 2006

(86) PCT No.: PCT/JP2006/301876
§ 371 (c)(1),
(2), (4) Date: Jan. 11, 2008

(87) PCT Pub. No.: WO2006/082928
PCT Pub. Date: Aug. 10, 2006

(65) Prior Publication Data
US 2009/0022369 A1 Jan. 22, 2009

(30) Foreign Application Priority Data

Feb. 4, 2005 (JP) .................................. 2005-029827
Feb. 2, 2006 (JP) .................................. 2006-026177

(51) Int. Cl.
*G06K 9/00* (2006.01)
*H04N 5/932* (2006.01)
(52) U.S. Cl. .......................... 382/106; 382/286; 386/220
(58) Field of Classification Search .................. 382/100, 382/106, 107, 108, 123, 168, 180, 181, 191–203, 382/206, 232, 254, 274, 275, 276, 286–297, 382/305, 312; 386/343, 220; 715/863; 345/1.3
See application file for complete search history.

(56) References Cited

U.S. PATENT DOCUMENTS 5,576,902 A * 11/1996 Lane et al. ..................... 386/343
5,751,893 A * 5/1998 Shimoda et al. ............... 386/220
(Continued)

FOREIGN PATENT DOCUMENTS

JP 2003-222509 8/2003
(Continued)

OTHER PUBLICATIONS

T. Rupp, et al., "Optimized Landmark Arrangement for Absolute Localization—A Practical Approach", Proceedings of the 2000 IEEE/RSJ International Conference on Intelligent Robots and Systems. pp. 448-453.

(Continued)

*Primary Examiner* — Seyed Azarian
(74) *Attorney, Agent, or Firm* — Fitzpatrick, Cella, Harper & Scinto

(57) ABSTRACT

This invention relates to a position/orientation measurement apparatus which can measure a position and orientation while achieving both high stability and precision. An image including indices laid out on a space is captured, and the indices are detected from the captured image. When a plurality of indices are detected, their distribution range is calculated, and an algorithm to be applied in position/orientation calculations is selected according to the size of the range (S3033, S3050, S3060). For example, when the indices are distributed over a sufficiently broad range, six parameters of the position and orientation of an image capture device are calculated as unknowns (S3070). As the distribution range of the indices becomes smaller, the degrees of freedom of unknown parameters to be calculated are reduced (S3035, S3025).

29 Claims, 24 Drawing Sheets

U.S. PATENT DOCUMENTS

| | | | | |
|---|---|---|---|---|
| 6,064,749 | A | 5/2000 | Hirota et al. | 382/103 |
| 6,064,794 | A * | 5/2000 | McLaren et al. | 386/343 |
| 6,268,857 | B1 * | 7/2001 | Fishkin et al. | 715/863 |
| 6,340,957 | B1 * | 1/2002 | Adler et al. | 345/1.3 |
| 7,082,578 | B1 * | 7/2006 | Fishkin et al. | 715/863 |

FOREIGN PATENT DOCUMENTS

| | | | |
|---|---|---|---|
| JP | 2004-233334 | * | 8/2003 |
| JP | 2003-279310 | | 10/2003 |
| JP | 2003-344018 | | 12/2003 |
| JP | 2004-233334 | | 8/2004 |
| JP | 2005-33319 | | 2/2005 |

OTHER PUBLICATIONS

European Office Action dated Jan. 23, 2011 in European Application No. 06713019.5.

"Robust Visual Tracking Using a Fixed Multi-Camera System", Vincenzo Lippiello et al.; *Proceedings of the IEEE* 2003; pp. 3333-3338; Sep. 2003.

"A Marker Calibration Method Utilizing a Priori Knowledge on Marker Arrangement", Daisuke Kotake et al.; *Proceedings of the Third IEEE and ACM International Symposium on Mixed and Augmented Reality* (ISMAR 2004); 10 pages; 2004.

K. Satoh et al.: "A Review of Registration Techniques in Mixed Reality", Transactions of the Virtual Reality Society of Japan, vol. 8, No. 2, pp. 171-180, Jun. 30, 2003.

H. Kato et al.: "An Augmented Reality System and its Calibration based on Marker Tracking", Transactions of the Virtual Reality Society of Japan, vol. 4, No. 4, pp. 607-616, 1999.

J. Park et al.: "Vision-Based Pose Computation: Robust and Accurate Augmented Reality Tracking", Proc. 2nd International Workshop on Augmented Reality (IWAR'99), pp. 3-12, 1999.

D.G. Lowe: "Fitting Parameterized Three-Dimensional Models to Images", IEEE Transactions on PAMI, vol. 13, No. 5, pp. 441-450, 1991.

K. Satoh et al.: "UG+B: A Registration Framework Using User's View, Gyroscope, and Bird's-Eye View", TVRSJ, vol. 10, No. 3, pp. 391-400, 2005.

I. Skrypnyk et al.: "Scene Modeling, Recognition and Tracking with Invariant Image Features", Proc. 3rd International Symposium on Mixed and Augmented Reality (ISMAR'04), pp. 110-119, 2004.

D. Kotake et al.: "A Hybrid and Linear Registration Method Utilizing Inclination Constraint", Proc. 4th International Symposium on Mixed and Augmented Reality (ISMAR'05), pp. 140-149, 2005.

* cited by examiner

F I G. 7
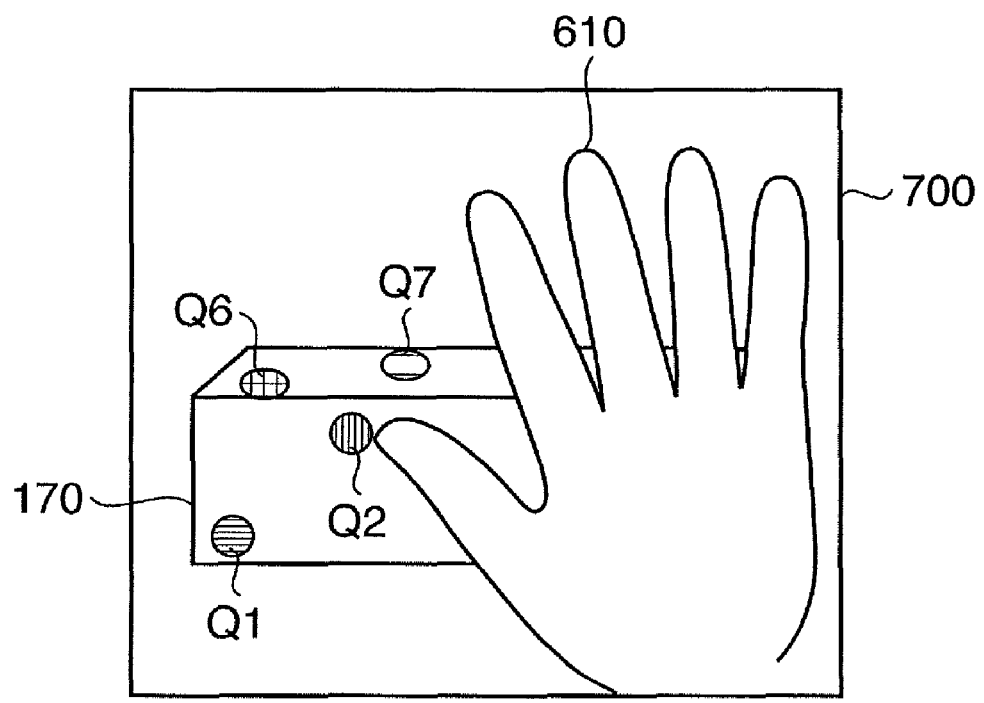

F I G. 11
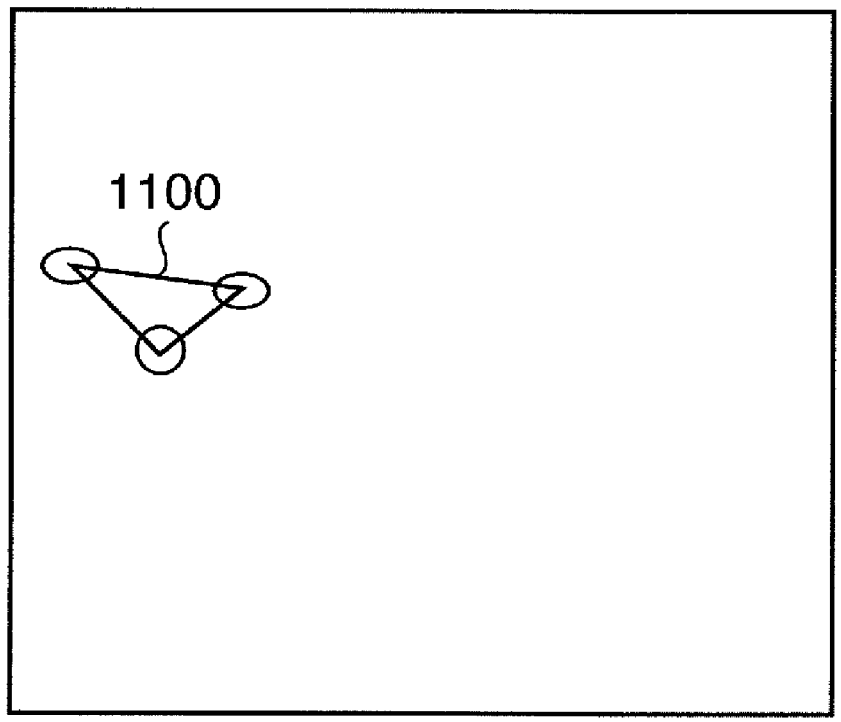

US 8,073,201 B2

POSITION/ORIENTATION MEASUREMENT METHOD AND APPARATUS

TECHNICAL FIELD

The present invention relates to a method and apparatus for measuring the position and orientation of an object and, in particular, those of an image capture device.

BACKGROUND ART

In recent years, extensive research has been conducted on mixed reality, which aims at seamless merging of physical and virtual spaces. An image display apparatus which presents mixed reality can be implemented as an apparatus which displays an image obtained by superimposing images of a virtual space (virtual objects, text information, and the like rendered by computer graphics), which are generated according to the position and orientation of an image capture device onto an image of a physical space captured by an image capture device such as a video camera or the like.

Essential for implementation of such an image display apparatus, is measurement of a relative position and orientation between a reference coordinate system defined on the physical space (a coordinate system on the physical space, which serves as a reference upon determining the position and orientation of a virtual object to be superimposed), and the coordinate system of the image capture device (camera coordinate system). This is because in order to render the virtual object (virtual space image) to fit the position on the physical space, the image of the virtual object must be generated using the same camera parameters as the physical camera parameters of the image capture device with respect to the reference coordinate system. For example, when superimposing the image of the virtual object at a certain position in a physical room, the reference coordinate system is defined on the room, and the position and orientation of the image capture device in the reference coordinate system can be calculated. When an arbitrary virtual pattern or label is to be superimposed on a physical box held by the hands of an observer, the object coordinate system of the box itself is considered as the reference coordinate system, and the position and orientation of the box (reference coordinate system) with respect to the image capture device can be calculated.

As a method of measuring the position and orientation of the image capture device, it is a common practice to lay out or set a plurality of indices (artificial markers, natural features, and the like) on the physical space, to detect the coordinates of projected images of the indices in an image captured by the image capture device, and to calculate the position and orientation of the image capture device based on the relationship with the coordinate information of the indices (for example, non-patent reference 1). However, using this approach, there is a restriction that the indices must always be captured.

On the other hand, an attempt has been made to mount a six-degrees-of-freedom position/orientation sensor using a magnetic sensor, ultrasonic sensor, or the like on the image capture device, and to correct errors of the position and orientation of the image capture device measured by this sensor using information (image information) obtained from an image acquired by capturing indices (for example, patent reference 1 and patent reference 2). With the method disclosed in patent reference 2, when indices are detected in the captured image, errors of sensor measurement values are corrected based on that information. When no index is detected, the measurement values of the six-degrees-of-freedom position/orientation sensor are used, unchanged, as the position and orientation of the image capture device. Because the position and orientation of the image capture device can be obtained irrespective of the presence/absence of the detection of indices, mixed reality can be presented stably.

With the method of patent reference 2, when the number of detected indices is three or more, the six degrees of freedom of the position and orientation of the image capture device are calculated based on the image information. When the number of detected indices is two or one, processing for correcting one of the position and orientation (two or three degrees of freedom) of the image capture device measured by the sensor is applied. More specifically, algorithms used to calculate the position and orientation of the image capture device are switched to have the number of detected indices as judging standards. In this way, even when the position and orientation of the image capture device cannot be calculated based only on the image information (when the number of captured indices is less than three), the position and orientation, which have undergone correction to cancel, as much as possible, errors in the sensor measurement values, can be acquired with reference to the sensor measurement values.

However, with the method of patent reference 1, processing for correcting only one of the position and orientation of the image capture device measured by the sensor based on the image information irrespective of the number of detected indices is applied. With this correction method, upon correcting the orientation, rotation correction values to cancel errors on indices are individually calculated for respective detected indices, and are averaged to calculate a correction value for the orientation measurement value. Upon correcting the position, translation correction values to cancel errors on indices are individually calculated for respective detected indices, and are averaged to calculate a correction value for the position measurement value. Since the degrees of freedom in correction are limited to two or three irrespective of the number of indices, stable solutions can be obtained even when the amount of information is insufficient.

Non-patent reference 1: Kato, et. al.: "An Augmented Reality System and its Calibration based on Marker Tracking", TVRSJ, vol. 4, no. 4, pp. 607-616, 1999.

Non-patent reference 2: J. Park, B. Jiang, and U. Neumann: "Vision-based pose computation: robust and accurate augmented reality tracking," Proc. 2nd International Workshop on Augmented Reality (IWAR'99), pp. 3-12, 1999.

Non-patent reference 3: D. G. Lowe: "Fitting parameterized three-dimensional models to images," IEEE Transactions on PAMI, vol. 13, no. 5, pp. 441-450, 1991.

Non-patent reference 4: Satoh, Uchiyama, and Yamamoto: UG+B: A Registration Framework Using User's View, Gyroscope, and Bird's-Eye View, TVRSJ, vol. 10, no. 3, pp. 391-400, 2005.

Non-patent reference 5: I. Skrypnyk and D. Lowe: "Scene modeling, recognition and tracking with invariant image features," Proc. 3rd International Symposium on Mixed and Augmented Reality (ISMAR'04), pp. 110-119, 2004.

Non-patent reference 6: D. Kotake, K. Satoh, S. Uchiyama, and H. Yamamoto: "A hybrid and linear registration method utilizing inclination constraint," Proc. 4th International Symposium on Mixed and Augmented Reality (ISMAR'05), pp. 140-149, 2005.

Patent reference 1: Japanese Patent Laid-Open No. 2003-222509

Patent reference 2: Japanese Patent Laid-Open No. 2003-279310

Patent reference 3: Japanese Patent Laid-Open No. 2003-344018

Patent reference 4: Japanese Patent Laid-Open No. 2004-233334

DISCLOSURE OF INVENTION

Problems that the Invention is to Solve

With the method of patent reference 2, when the three or more indices are observed, the algorithm for calculating the six degrees of freedom of the position and orientation is always selected. However, in practice, there is a situation in which an input image does not include sufficient image information to stably calculate the six degrees of freedom of the position even when the number of indices is three or more as in a case in which indices are unevenly distributed and observed in a partial region on an image. With the method of patent reference 2, the precision and stability of the obtained solutions often become insufficient in such situation, and there is room for improvement.

On the other hand, the method of patent reference 1 places an importance on stability rather than precision, and generally allows stable measurements compared to the method of patent reference 2, even in a situation of insufficient image information as in a case in which indices are unevenly distributed and observed in a partial region on an image. This is because an actual implementation system uses the six-degrees-of-freedom sensor such as a magnetic sensor which has poor precision but high stability. However, since this method corrects only some parameters even when sufficient image information is obtained, it is not a method that obtains high precision by making best use of the image information. In particular, as the position/orientation estimation method of the image capture device for mixed reality, it is more desirable to estimate the position and orientation of the image capture device by making best use of indices caught in the captured image. This is because it is required to minimize deviations in an image plane since such method aims at superimposing a virtual object on the captured image. In other words, the method of patent reference 2 bears improvements in aiming at obtaining precision using the image information.

As described above, it is difficult to simultaneously realize the effect of achieving high stability of patent reference 1, and the effect of obtaining high precision using image information of patent reference 2.

Furthermore, since the method of patent reference 1 merely calculates the average of two-dimensional correction values for individual indices, it is an improvement over an optimal correction, which is unable to minimize the sum of errors on all indices.

The present invention has been made in consideration of the problems of such prior arts, and has as its object to provide a position/orientation measurement method and apparatus, which can measure the position and orientation of a measurement target object while simultaneously achieving high stability and high precision.

Means of Solving the Problems

In order to achieve the above object, the present invention has the following arrangement.

The invention according to claim 1 is directed to a position/orientation measurement method for measuring a position and an orientation of a measurement target object, characterized by comprising: a captured image acquisition step of acquiring a captured image; an index detection step of detecting indices included in the captured image; a distribution range calculation step of calculating an evaluation value associated with a distribution range of the indices detected in the index detection step; and a position/orientation calculation step of calculating the position and the orientation of the measurement target object using information associated with image coordinates of the detected indices, and the evaluation value associated with the distribution range.

The invention according to claim 15 is directed to a position/orientation measurement method for measuring a position and an orientation of a measurement target object, characterized by comprising: an orientation measurement value input step of inputting an orientation measurement value from an orientation sensor attached to the measurement target object; a captured image acquisition step of acquiring a captured image; an index detection step of detecting indices included in the captured image; and a position/orientation calculation step of calculating the position and the orientation of the image capture device using information associated with image coordinates of the detected indices, and the orientation measurement value, wherein in the position/orientation calculation step, the position and the orientation of the image capture device are calculated using, as evaluation criteria, a difference between actually measured values of the information associated with the image coordinates of the detected indices and theoretical values of the information associated with the image coordinates of the detected indices, which are calculated based on estimated values of the position and the orientation of the image capture device, and a difference between the estimated values and at least some parameters of the orientation measurement value.

The invention according to claim 20 is directed to a position/orientation measurement method for measuring a position and an orientation of an image capture device as a measurement target object, characterized by comprising: an orientation measurement value input step of inputting an orientation measurement value from an orientation sensor attached to the image capture device; an image input step of inputting a captured image captured by the image capture device; an index detection step of detecting indices included in the captured image; a weight setting step of setting a weight input by an operator; and a position/orientation calculation step of calculating the position and the orientation of the image capture device using information associated with image coordinates of the indices detected in the index detection step, and the orientation measurement value, wherein in the position/orientation calculation step, the position and the orientation of the image capture device are calculated by changing influences of the information associated with the image coordinates of the indices and the orientation measurement value in accordance with the weight set in the weight setting step.

Effects of the Invention

According to the position/orientation measurement apparatus of the present invention, since the position and orientation of a measurement target object can be measured by a better method in consideration of not only the number of detected indices but also an evaluation value associated with their range of distribution, measurements with high stability and precision compared to the conventional methods can be implemented.

Other features and advantages of the present invention will become apparent from the following description taken in conjunction with the accompanying drawings. Note that the same reference numerals denote the same or similar components throughout the accompanying drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 7 shows an example of a captured image acquired by capturing an image of the object 170 to be measured by the image capture device 130;

FIG. 11 shows a convex hull obtained upon application of the processing in step S3040 to the captured image (captured image 800) shown in FIG. 8;

BEST MODE FOR CARRYING OUT THE INVENTION

Preferred embodiments of the present invention will be described in detail hereinafter with reference to the accompanying drawings.

First Embodiment

A position/orientation measurement apparatus according to this embodiment measures the positions and orientations of an image capture device and a measurement target object. The position/orientation measurement apparatus and position/orientation measurement apparatus according to this embodiment will be described hereinafter.

Figure 1:
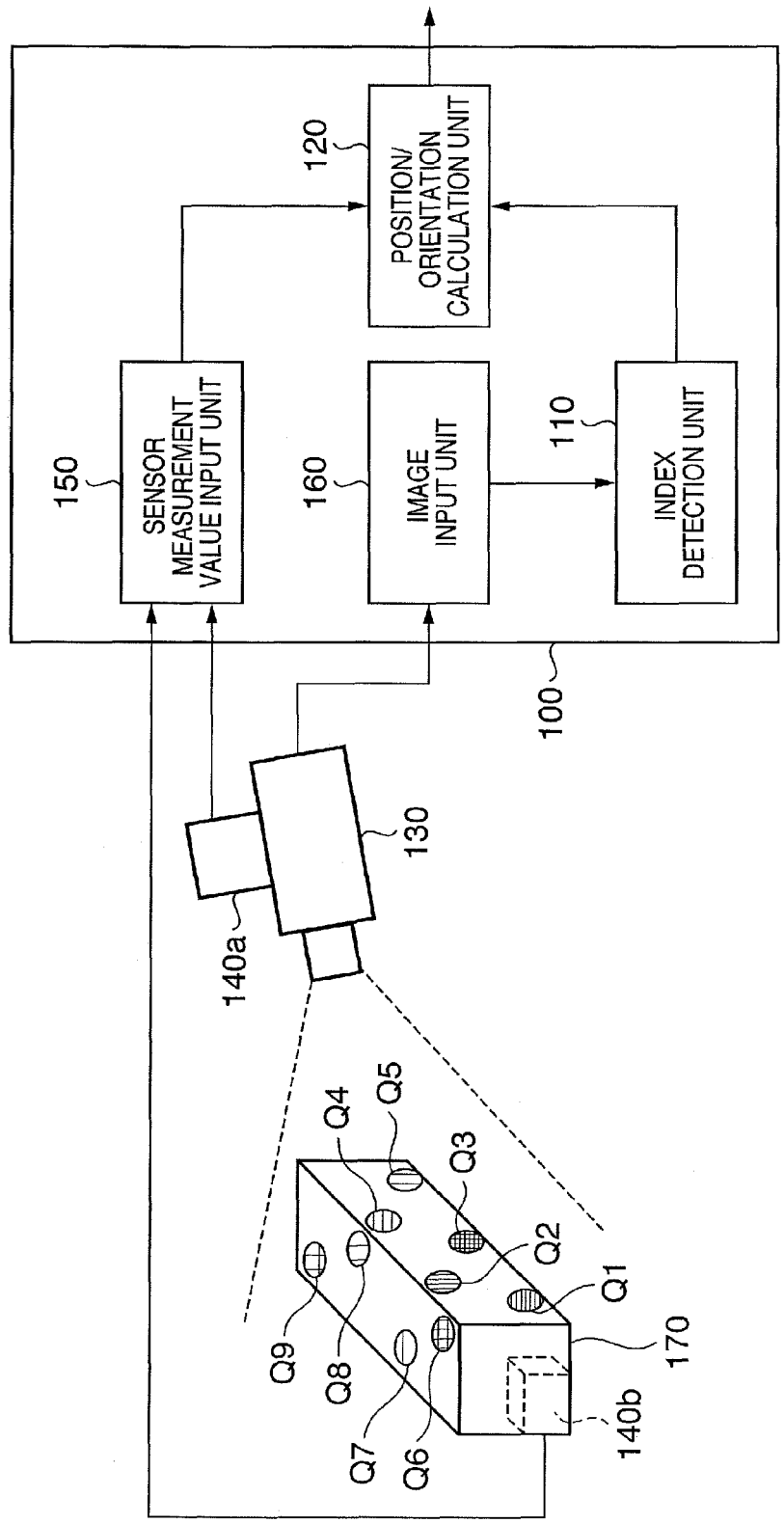
FIG. 1 is a block diagram showing the arrangement of a position/orientation measurement apparatus according to the first embodiment.

FIG. 1 shows the arrangement of a position/orientation measurement apparatus according to this embodiment. As shown in FIG. 1, a position/orientation measurement apparatus 100 according to this embodiment comprises an image input unit 160, index detection unit 110, sensor measurement value input unit 150, and position/orientation calculation unit 120. The apparatus 100 is connected to an image capture device 130, and position/orientation sensors 140, that is, sensors 140a and 140b, attached to the image capture device 130 and an object 170 to be measured.

A plurality of indices $Q_k$ (k=1, 2, . . . , K) whose positions on an object coordinate system (a coordinate system defined on the object 170 to be measured) are known are laid out at a plurality of positions on the object 170 to be measured. An example of FIG. 1 shows a situation in which K=9, that is, nine indices $Q_1$ to $Q_9$ are laid out. For example, the indices $Q_k$ may be configured by markers which have different colors and an identical shape (a circular shape in FIG. 1), or may be configured by feature points such as natural features or the like which have different texture features. Alternatively, rectangular indices which are formed of rectangular unicolor regions each having a certain area may be used. The indices $Q_k$ may have any forms as long as the image coordinates of their projected images on a captured image are detectable, and each of these indices $Q_k$ can be identified by an arbitrary method. Also, the indices may be deliberately set or may be natural-shaped ones not deliberately set.

An image (to be referred to as a captured image hereinafter) which is output from the image capture device 130 as, for example, a video camera is input to the position/orientation measurement apparatus 100.

The position/orientation sensors 140a and 140b as six-degrees-of-freedom sensors are respectively attached to the image capture device 130 and object 170 to be measured, and measure the positions and orientations of the image capture device 130 and object 170 to be measured on a reference coordinate system. Measurement values output from the position/orientation sensors 140 are input to the position/orientation measurement apparatus 100. Each position/orientation sensor 140 comprises, for example, FASTRAK available from Polhemus, U.S.A., or the like. Note that the positions and orientations measured by the position/orientation sensors 140 include errors due to the influences of distortions of magnetic fields and the like. However, these sensors can continuously and stably measure the positions and orientations within their measurement ranges.

The image input unit 160 converts a captured image input to the position/orientation measurement apparatus 100 into digital data, and outputs the digital data to the index detection unit 110.

The sensor measurement value input unit 150 receives the measurement values from the position/orientation sensors 140, that is, the sensors 140a and 140b, and outputs them to the position/orientation calculation unit 120.

The index detection unit 110 receives the captured image from the image input unit 160, and detects the image coordinates of the indices $Q_k$ captured in the input image. For example, when the indices $Q_k$ are configured by markers having different colors, the unit 110 detects a region corresponding to each individual marker color from the captured image, and decides its barycentric position as the detected coordinates of the index of interest. On the other hand, when the indices $Q_k$ are configured by feature points having different texture features, the unit 110 applies template matching using a template image of each individual index, which is held in advance as known information, to the captured image, thereby detecting the position of the index of interest. Furthermore, when rectangular indices are used, the unit 110 applies binarization processing to the image, and labels the binary image to detect regions each formed by four straight lines as index candidates. Furthermore, the unit 110 checks if each candidate region includes a specific pattern to eliminate detection errors and to acquire an identifier of that index. Note that the rectangular index detected in this way is considered as four indices individually formed by four vertices in the present specification.

The index detection unit 110 further outputs image coordinates $u^{Qkn}$ of the detected indices $Q_{kn}$ and their identifiers $k_n$ to the position/orientation calculation unit 120. Note that n (n=1, ... , N) is an index number of each detected index, and N represents the total number of detected indices.

The position/orientation calculation unit 120 receives the measurement values of the positions and orientations of the image capture device 130 and object 170 to be measured as the outputs from the sensor measurement value input unit 150, and the image coordinates $u^{Qkn}$ of the individual indices $Q_{kn}$ as the outputs from the index detection unit 110. The unit 120 corrects errors of the measurement values of the position and orientation of the object 170 to be measured or the image capture device 130, and outputs the corrected position and orientation data.

Note that at least some of the image input unit 160, index detection unit 110, sensor measurement value input unit 150, and position/orientation calculation unit 120 shown in FIG. 1 may be implemented as independent devices, or may be implemented as software programs that implement the functions by installing the software programs in one or a plurality of computers and executing them by a CPU of each computer. In this embodiment, assume that the respective units (image input unit 160, index detection unit 110, sensor measurement value input unit 150, and position/orientation calculation unit 120) are implemented by software and are installed in a single computer.

Figure 2:
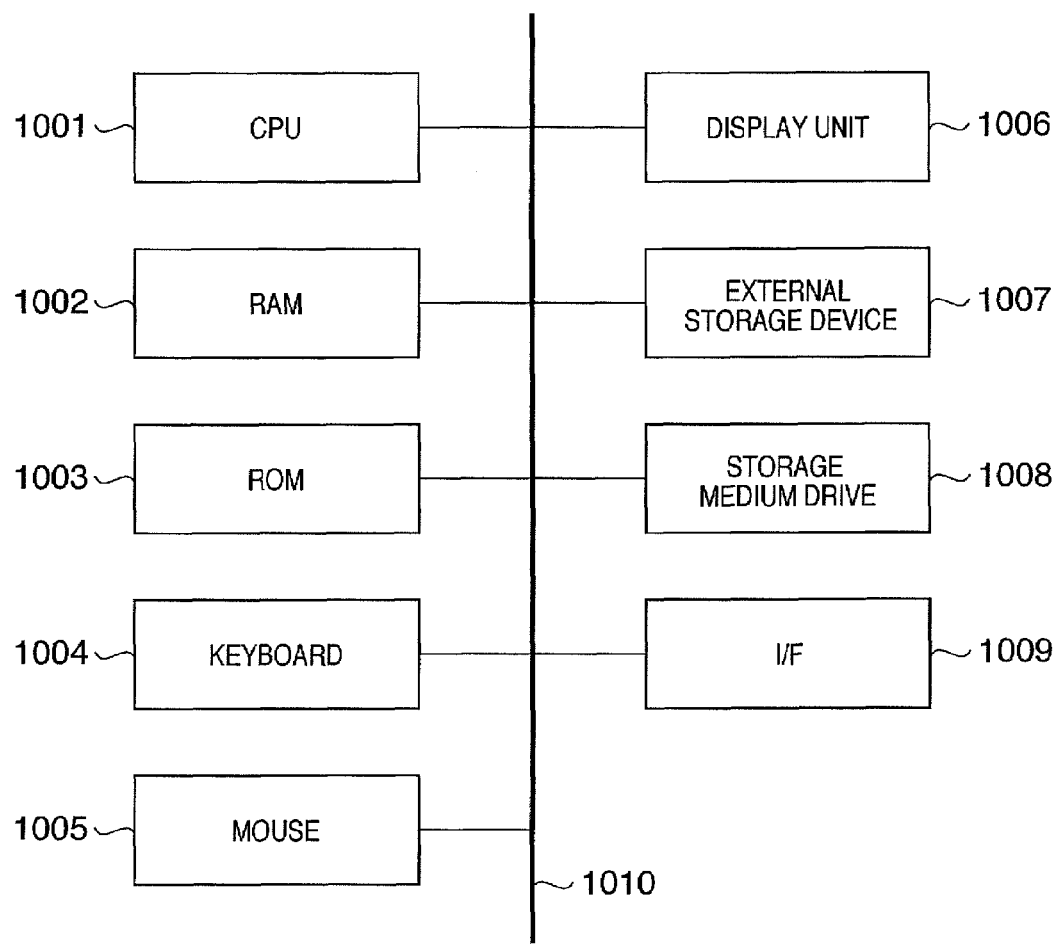
FIG. 2 is a block diagram showing the basic arrangement of a computer which can implement respective units of the position/orientation measurement apparatus by software.

FIG. 2 is a block diagram showing the basic arrangement of a computer which implements the functions of the image input unit 160, index detection unit 110, sensor measurement value input unit 150, and position/orientation calculation unit 120 by executing software.

A CPU 1001 controls the overall computer using programs and data stored in a RAM 1002 and ROM 1003, and controls execution of software programs of the image input unit 160, index detection unit 110, sensor measurement value input unit 150, and position/orientation calculation unit 120 to implement the functions of the respective units.

The RAM 1002 comprises an area for temporarily storing programs and data loaded from an external storage device 1007 or storage medium drive 1008, and a work area required for the CPU 1001 to execute various kinds of processing.

The ROM 1003 generally stores programs, setting data, and the like of the computer. A keyboard 1004 and mouse 1005 are input devices. The operator can inputs various instructions to the CPU 1001 using these input devices.

A display unit 1006 comprises a CRT, liquid crystal display, or the like, and can display messages and the like to be displayed for, for example, position/orientation measurements.

The external storage device 1007 is a device serving as a large-capacity information storage device such as a hard disk drive or the like, and saves an OS (operating system), programs to be executed by the CPU 1001, and the like. The external storage device 1007 saves information which are described as known information in the description of this embodiment, and such information is loaded into the RAM 1002 as needed.

The storage medium drive 1008 reads out programs and data stored in a storage medium such as a CD-ROM, DVD-ROM, or the like in accordance with an instruction from the CPU 1001, and outputs the readout programs and data to the RAM 1002 and external storage device 1007.

An I/F 1009 comprises an analog video port or a digital input/output port such as IEEE1394 or the like used to connect the image capture device 130, a serial port such as RS232C, USB, or the like used to connect the position/orientation sensors 140, an Ethernet® port used to externally output the calculated position and orientation, and the like. Data input from the respective devices are stored in the RAM 1002 via the I/F 1002. Some of the functions of the image input unit 160 and sensor measurement value input unit 150 are implemented by the I/F 1009.

The aforementioned components are interconnected by a bus 1010.

Figure 3:
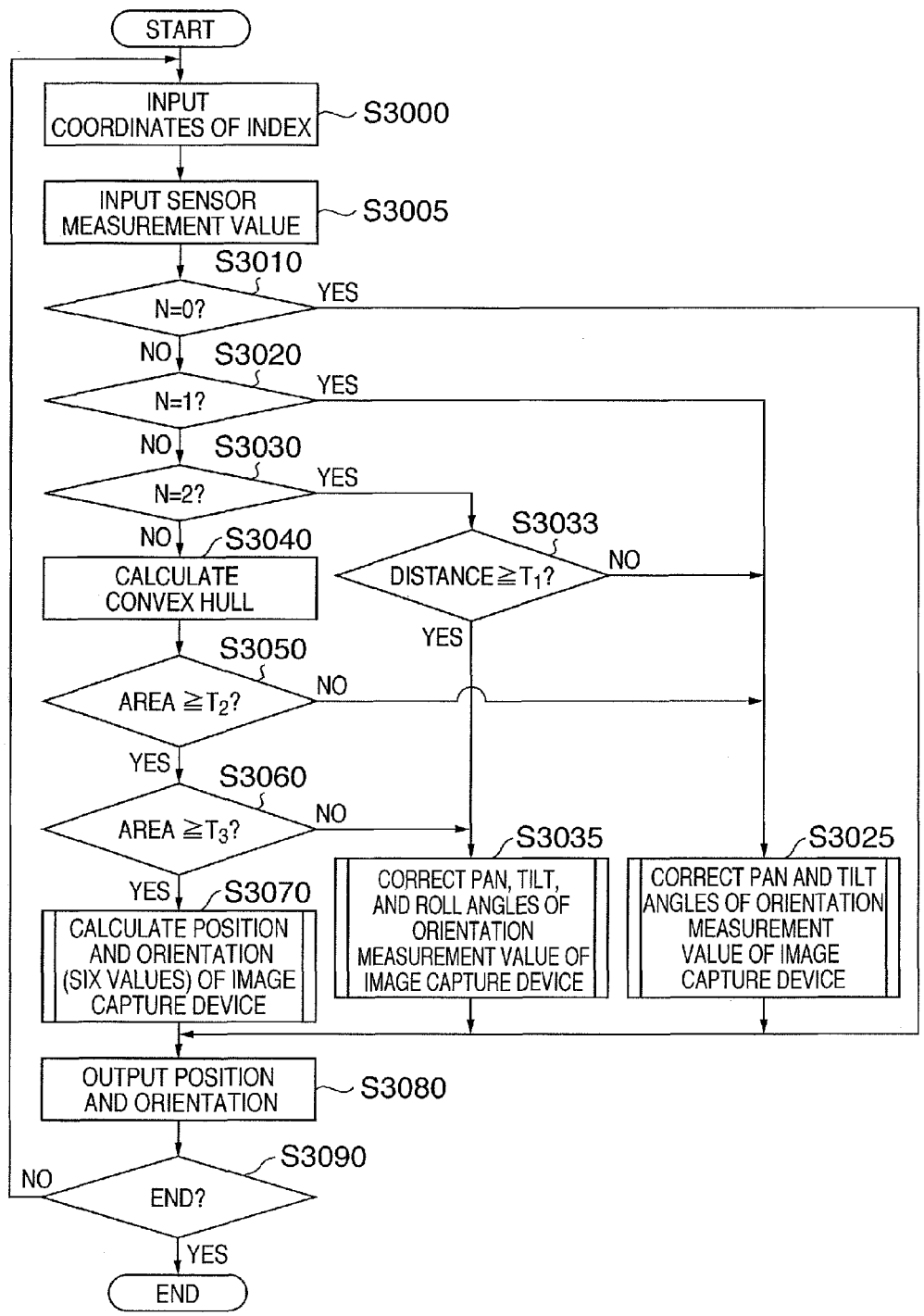
FIG. 3 is a flowchart for explaining the processing for calculating the positions and orientations of an image capture device 130 and object 170 to be measured according to the first embodiment.

FIG. 3 is a flowchart showing the processing sequence of the position/orientation calculation unit 120. In this embodiment, this processing sequence is implemented when the CPU 1001 executes a program that implements the function of the position/orientation calculation unit 120. Assume that the program code according to the flowchart has already been loaded from, for example, the external storage device 1007 onto the RAM 1002 prior to execution of the following processing.

In step S3000, the position/orientation calculation unit 120 receives the image coordinates $u^{Qkn}$ of the detected indices $Q_{kn}$ and their identifiers $k_n$ from the index detection unit 110. Assume that three-dimensional (3D) coordinates $x_O^{Qkn}$ of respective indices on the object coordinate system are loaded in advance onto the RAM 1002 as known values.

In step S3005, the position/orientation calculation unit 120 receives the measurement values of the positions and orientations of the image capture device 130 and object 170 to be measured by the sensors from the sensor measurement value input unit 150.

The position/orientation calculation unit 120 checks in step S3010 if indices are detected. If no index is detected, the process jumps to step S3080; otherwise, the process advances to step S3020.

The position/orientation calculation unit 120 checks in step S3020 if the total number of detected indices is one. If the total number of indices is one, the process advances to step S3025; otherwise, the process advances to step S3030.

In step S3025, the position/orientation calculation unit 120 applies correction to cancel errors (errors among the 3D coordinates $x_O^{Qkn}$ of indices on the object coordinate system, theoretical values $u^{Qkn*}$ of projected coordinates derived from the measurement values of the positions and orientations of the image capture device 130 and object 170 to be measured, and actual detected coordinates $u^{Qkn}$) on the detected indices to pan and tilt angles of the measurement values of the orientation of the image capture device 130 obtained in step S3005. The process then advances to step S3080. Since known processing can be applied as the correction processing in step S3025, no more explanation will be given. More specifically, methods disclosed in, for example, patent reference 1 (a correction method by means of rotation of a camera using one landmark (paragraphs "0019" to "0029") and a correction method by means of rotation of a camera using a plurality of landmarks (paragraphs "0039" to "0050")) can be used.

The position/orientation calculation unit 120 checks in step S3030 if the total number of detected indices is two. If the total number of indices is two, the process advances to step S3033; otherwise, the process advances to step S3040.

In step S3033, the position/orientation calculation unit 120 calculates a distance between the two detected indices on the image, and compares the calculated value with a threshold $T_1$ (e.g., ¼ of the diagonal line length of the image) which is defined as a predetermined value. If the distance is equal to or larger than the threshold $T_1$, the process advances to step S3035; otherwise, the process advances to step S3025 to execute the aforementioned processing.

In step S3035, the position/orientation calculation unit 120 applies correction to minimize the sum of errors on all the detected indices to three parameters (pan, tilt, and roll angles) which represent the measurement values of the orientation of the image capture device 130, while setting the measurement values of the position and orientation of the object 170 to be measured and that of the position of the image capture device 130 obtained in step S3005 as fixed values. The process then advances to step S3080. Details of this processing step will be described later.

Step S3040 is executed only when the total number of detected indices is three or more. In this step, the position/orientation calculation unit 120 calculates a convex hull which includes the image coordinates of all the detected indices as an example of an evaluation value of the distribution range of all the detected indices. Since a method of calculating a convex hull for a point group on an image is prevalently a state-of-the-art technique as a basic issue of the image processing, a detailed description thereof will not be given.

Figure 6:
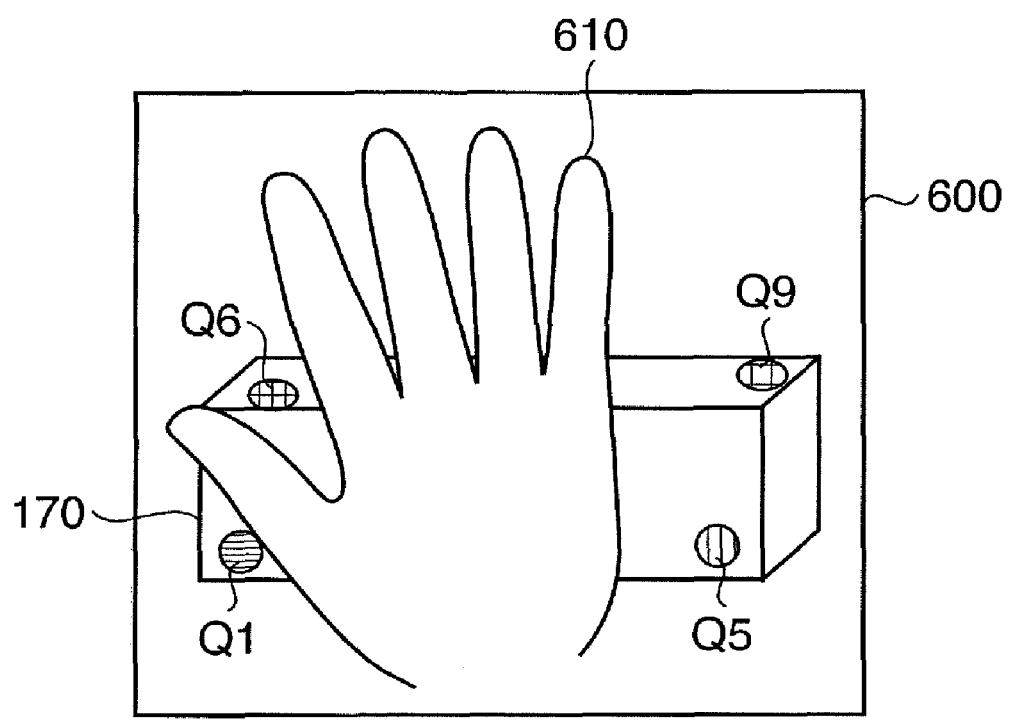
FIG. 6 shows an example of a captured image acquired by capturing an image of the object 170 to be measured by the image capture device 130.
Figure 8:
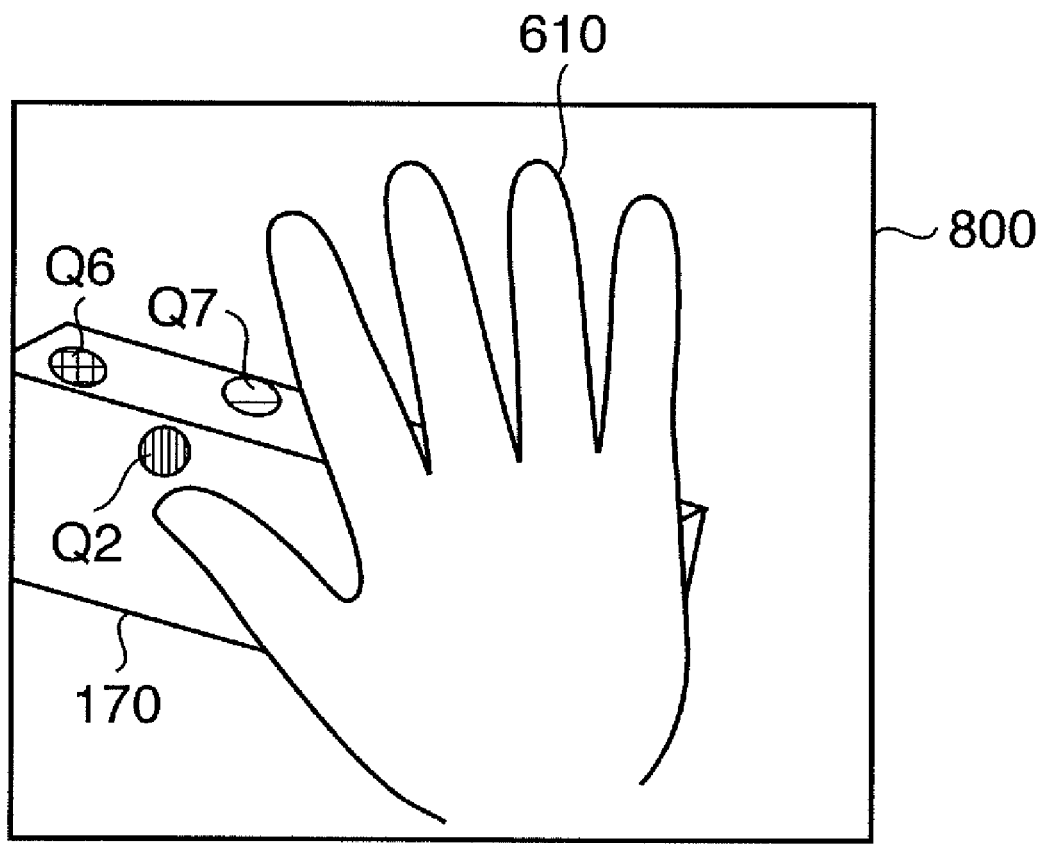
FIG. 8 shows an example of a captured image acquired by capturing an image of the object 170 to be measured by the image capture device 130.

FIGS. 6, 7, and 8 show examples of captured images acquired when the image capture device 130 captures an image of the object 170 to be measured. On a captured image 600 shown in FIG. 6, indices Q1, Q5, Q6, and Q9 are observed. On a captured image 700 shown in FIG. 7, indices Q1, Q2, Q6, and Q7 are observed. On a captured image 800 shown in FIG. 8, indices Q2, Q6, and Q7 are observed. Assume that other indices are occluded behind another object (a hand 610 of the user in this embodiment).

Figure 9:
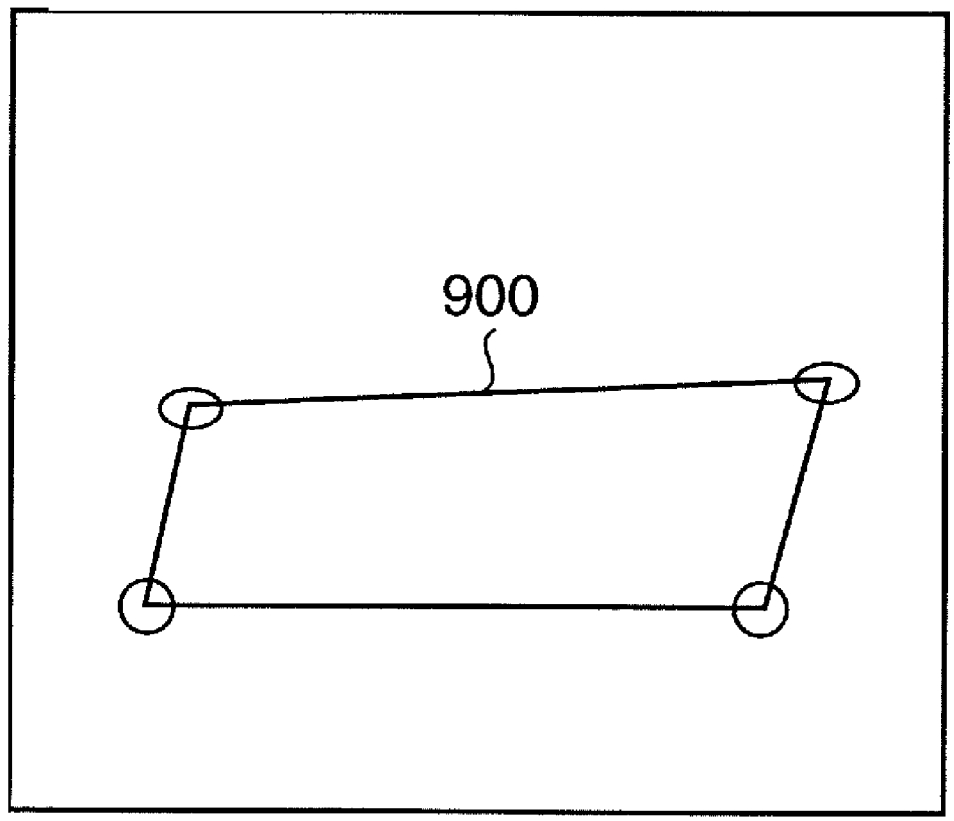
FIG. 9 shows a convex hull obtained upon application of the processing in step S3040 to the captured image (captured image 600) shown in FIG. 6.
Figure 10:
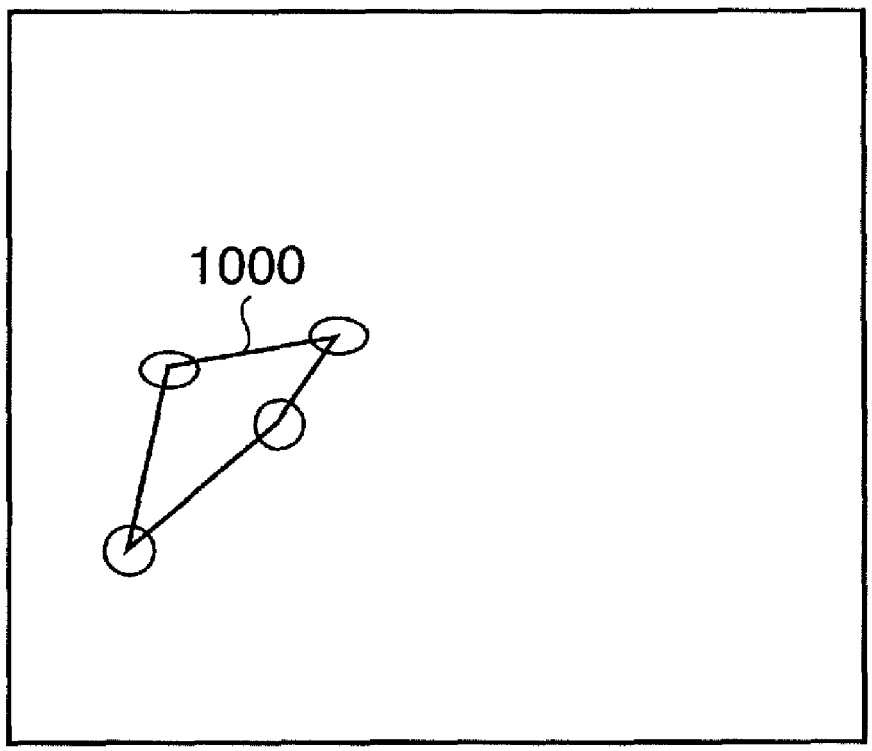
FIG. 10 shows a convex hull obtained upon application of the processing in step S3040 to the captured image (captured image 700) shown in FIG. 7.

Upon detection of indices for these captured images, and execution of the processing steps of the position/orientation calculation unit 120 shown in the flowchart of FIG. 3, since the number of indices detected from each image is three or more, the processes in step S3040 and subsequent steps are executed. FIGS. 9, 10, and 11 show convex hulls 900, 1000, and 1100 formed by the detected indices, obtained upon execution of the processing in step S3040 for the captured images 600, 700, and 800, respectively. In the following description, assume that letting $A_{900}$, $A_{1000}$, and $A_{1100}$ be the areas of the respective convex hulls, a relation $A_{1100} < T_2 < A_{1000} < T_3 < A_{900}$ is satisfied for thresholds $T_2$ and $T_3$ to be described below.

In step S3050, the position/orientation calculation unit 120 compares the area of the convex hull calculated in step S3040 with a threshold $T_2$ (e.g., 1/16 of the area of the overall captured image) which is defined as a predetermined value. If the area is equal to or larger than the threshold $T_2$, the process advances to step S3060; otherwise, the process advances to step S3025. In the examples shown in FIGS. 6 to 11, the process advances to step S3025 for the captured image 800, and to step S3060 for the captured images 700 and 600.

In step S3060, the position/orientation calculation unit 120 compares the area of the convex hull calculated in step S3040 with a threshold $T_3$ (e.g., ⅑ of the area of the overall captured image) which is defined as a predetermined value. If the area is equal to or larger than the threshold $T_3$, the process advances to step S3070; otherwise, the process advances to step S3035. In the examples shown in FIGS. 6 to 11, the process advances to step S3035 for the captured image 700, and to step S3070 for the captured image 600.

In step S3070, the position/orientation calculation unit 120 calculates the position and orientation of the image capture device 130 to minimize the sum of errors on the all the detected indices. Details of this processing step will be described later.

In step S3080, the position/orientation calculation unit 120 externally outputs data representing the positions and orientations of the image capture device 130 and object 170 to be measured obtained in step S3025, S3035, or S3070 via the I/F 1009. Alternatively, the unit 120 stores these data in the RAM 1002 after it converts them into a state usable by other applications.

Note that since only the measurement values associated with the image capture device 130 are corrected in step S3025, S3035, or S3070, the data of the positions and orientations output in step S3080 include the measurement values themselves by the sensor input in step S3005 in association with the object 170 to be measured. However, the output mode of the positions and orientations is not limited to this. Conversely, the measurement values of the image capture device 130 may not be corrected and those by the sensor may be output intact, and the measurement values of the object 170 to be measured may be corrected and output. In this case, in step S3080 the position/orientation calculation unit 120 executes coordinate conversion processing to be described below and then outputs the converted positions and orientations.

Upon describing the positions and orientations by a 4×4 coordinate conversion matrix using a homogeneous coordinate system, a corrected position and orientation $M_{WO}$ of the object 170 to be measured are calculated based on a position and orientation $M^{\#}_{WC}$ (# is a symbol that represents measurement values by the sensor; the same applies to the following description) of the image capture device 130, a position and orientation $M^{\#}_{WO}$ of the object 170 to be measured obtained as the sensor measurement values, and a corrected position and orientation $M_{WC}$ of the image capture device 130 obtained as the processing results until step S3070 by:

$$M_{WO} = M^{\#}_{WC} \cdot M_{WC}^{-1} \cdot M^{\#}_{WO} \quad (1)$$

At this time, the position and orientation of the object 170 to be measured on a camera coordinate system defined by the image capture device 130 are given by:

$$M_{CO} = M_{WC}^{-1} \cdot M^{\#}_{WO} = M^{\#}_{WC}^{-1} \cdot M_{WO} \quad (2)$$

More specifically, the relationships between the relative positions and orientations of the object 170 to be measured and image capture device 130 are equivalent to each other between a case in which the corrected position and orientation ($M_{WC}$) of the image capture device 130 obtained as the processing results until step S3070, and the position and orientation ($M^{\#}_{WO}$) of the object 170 to be measured obtained as the sensor measurement values are to be output, and a case in which the position and orientation ($M^{\#}_{WC}$) of the image capture device 130 obtained as the sensor measurement values, and the corrected position and orientation ($M_{WO}$) of the object 170 to be measured calculated by formula (1) are to be output. Therefore, it is preferable to select an output mode in correspondence with the mode required by an application that uses the outputs of this apparatus.

The position and orientation ($M_{CO}$) of the object 170 to be measured on the camera coordinate system may be calculated using formula (2) and may be output, or the position and orientation ($M_{CO}^{-1}$) of the image capture device 130 on the object coordinate system may be calculated and output.

The position/orientation calculation unit 120 checks in step S3090 if the processing is to end. If the processing is not to end, the process returns to step S3000.

The orientation calculation processing step of the image capture device 130 in step S3035 will be described below using the flowchart of FIG. 4. In the following description, the orientation of the image capture device 130 as unknown parameters to be calculated are internally expressed by a three-valued vector $s = \omega_{WC} = [\xi_{WC} \psi_{WC} \zeta_{WC}]^T$.

Various methods of expressing the orientation by three values are available. In this case, the orientation is expressed by a vector of three values, which define the rotation angle by the magnitude of the vector, and the rotation axis direction by the direction of the vector. Note that an orientation $\omega$ can be expressed by a 3×3 rotation matrix R given by:

$$R(\omega) = \begin{bmatrix} \frac{\xi^2}{\theta^2}(1-\cos\theta) + \cos\theta & \frac{\xi\psi}{\theta^2}(1-\cos\theta) - \frac{\zeta}{\theta}\sin\theta & \frac{\xi\zeta}{\theta^2}(1-\cos\theta) + \frac{\psi}{\theta}\sin\theta \\ \frac{\psi\xi}{\theta^2}(1-\cos\theta) + \frac{\zeta}{\theta}\sin\theta & \frac{\psi^2}{\theta^2}(1-\cos\theta) + \cos\theta & \frac{\psi\zeta}{\theta^2}(1-\cos\theta) - \frac{\xi}{\theta}\sin\theta \\ \frac{\zeta\xi}{\theta^2}(1-\cos\theta) - \frac{\psi}{\theta}\sin\theta & \frac{\zeta\psi}{\theta^2}(1-\cos\theta) + \frac{\xi}{\theta}\sin\theta & \frac{\zeta^2}{\theta^2}(1-\cos\theta) + \cos\theta \end{bmatrix} \quad (3)$$

(for $\theta = \sqrt{\xi^2 + \psi^2 + \zeta^2}$ )

$\omega$ and R can be uniquely converted to each other. Since the conversion method from R to $\omega$ is known to those who are skilled in the art, a detailed description thereof will not be given.

In step S4000, the position/orientation calculation unit 120 sets the orientation of the image capture device 130 obtained as the sensor measurement values as initial values of s.

In step S4010, the position/orientation calculation unit 120 calculates an estimated value $u^{Q_{kn}*}$ of the image coordinates of each individual index $Q_{kn}$. The calculation of $u^{Q_{kn}*}$ is made based on an observation equation of the index defined by s, that is, a function of calculating the image coordinates from coordinates $X_O^{Q_{kn}}$ (held in advance as known information) of each index $Q_{kn}$ on the object coordinate system:

$$u^{Q_{kn}*} = F_C(x_O^{Q_{kn}}, s) \quad (4)$$

More specifically, the observation equation Fc( ) is configured by a formula for calculating the camera coordinates (a coordinate system in which a viewpoint position of the image capture device 130 is defined as an origin, and three orthogonal axes are respectively defined as X-, Y-, and Z-axes) $x_C^{Q_{kn}}$ of the index of interest from $x_O^{Q_{kn}}$ as s:

$$x_C^{Q_{kn}} = \begin{bmatrix} x_C^{Q_{kn}} \\ y_C^{Q_{kn}} \\ z_C^{Q_{kn}} \end{bmatrix} = R(\omega_{WC})^{-1} \cdot (R_{WO} \cdot x_O^{Q_{kn}} + t_{WO} - t_{WC}) \quad (5)$$

and a formula for calculating the image coordinates $u^{Q_{kn}*}$ from the camera coordinates $x_C^{Q_{kn}}$:

$$u^{Q_{kn}*} = \begin{bmatrix} u_x^{Q_{kn}*} & u_y^{Q_{kn}*} \end{bmatrix}^T = \begin{bmatrix} -f_x^C \frac{x_C^{Q_{kn}}}{z_C^{Q_{kn}}} & -f_y^C \frac{y_C^{Q_{kn}}}{z_C^{Q_{kn}}} \end{bmatrix}^T \quad (6)$$

where $t_{WC}$ and $t_{WO}$ are 3D vectors which represent the position measurement values (translation components) of the image capture device 130 and object 170 to be measured, and are handled as fixed values in this case. $R_{WO}$ is a 3×3 rotation matrix which represents the orientation measurement value (rotation component) of the object 170 to be measured, and is similarly handled as a fixed value. $f^C_x$ and $f^C_y$ are focal lengths of the image capture device 130 in the x- and y-axis directions, and are held in advance as known values.

In step S4020, the position/orientation calculation unit 120 calculates an error $\Delta u^{Q_{kn}}$ between the estimated value $u^{Q_{kn}*}$ and actually measured value $u^{Q_{kn}}$ of the image coordinates for each individual index $Q_{kn}$ by:

$$\Delta u^{Q_{kn}} = u^{Q_{kn}} - u^{Q_{kn}*} \quad (7)$$

In step S4030, the position/orientation calculation unit 120 calculates an image Jacobian (i.e., a Jacobian matrix of 2 rows×3 columns having, as respective elements, solutions obtained by partially differentiating the observation equation Fc( ) given by formula (4) by the elements of s) $J_{us}^{Q_{kn}}$ ($=\partial u/\partial s$) for s with respect to each individual index $Q_{kn}$. More specifically, the unit 120 calculates a Jacobian matrix $J_{ux}^{Q_{kn}}$ ($=\partial u/\partial x$) of 2 rows×3 columns having, as respective elements, solutions obtained by partially differentiating the right-hand side of formula (6) by respective elements of the camera coordinates $x_C^{Q_{kn}}$, and a Jacobian matrix $J_{xs}^{Q_{kn}}$ ($=\partial x/\partial s$) of 3 rows×3 columns having, as respective elements, solutions obtained by partially differentiating the right-hand side of formula (5) by respective elements of the vector s, and then calculates $J_{us}^{Q_{kn}}$ by:

$$J_{us}^{Q_{kn}} = J_{ux}^{Q_{kn}} \cdot J_{xs}^{Q_{kn}} \quad (8)$$

In step S4040, the position/orientation calculation unit 120 calculates a correction value Δs of s based on the errors $\Delta u^{Q_{kn}}$ and image Jacobians $J_{us}^{Q_{kn}}$ calculated in steps S4020 and S4030. More specifically, the position/orientation calculation unit 120 generates a 2N-dimensional error vector defined by vertically arranging the errors $\Delta u^{Q_{kn}}$:

$$U = \begin{bmatrix} \Delta u^{Q_{k_1}} \\ \vdots \\ \Delta u^{Q_{k_N}} \end{bmatrix} \quad (9)$$

and a matrix of 2N rows×3 columns defined by vertically arranging the image Jacobians $J_{us}^{Q_{kn}}$:

$$\Theta = \begin{bmatrix} J_{us}^{Q_{k_1}} \\ \vdots \\ J_{us}^{Q_{k_N}} \end{bmatrix} \quad (10)$$

The unit 120 then calculates Δs, using a pseudo inverse matrix $\Theta^+$ of Θ, as:

$$\Delta s = \Theta^+ U \quad (11)$$

In this way, this embodiment calculates the correction value Δs by local linear approximation.

In step S4050, the position/orientation calculation unit 120 corrects s using the correction value Δs calculated in step S4040 according to formula (12), and sets the obtained value as a new estimated value of s:

$$s + \Delta s \rightarrow s \quad (12)$$

The position/orientation calculation unit 120 checks in step S4060 if the calculations are converged, using some criteria as to whether or not the error vector U is smaller than a predetermined threshold or whether or not the correction value Δs is smaller than a predetermined threshold. If the calculations are not converged, the unit 120 executes the processes in step S4010 and subsequent steps again using s after correction. If it is determined that the calculations are converged, the process advances to step S4070.

The aforementioned steps, that is, steps S4000 to S4060 solve nonlinear simultaneous equations for s consisting of a plurality of observation equations by the Newton method. These series of steps may use any other nonlinear solving methods, as will be described later in Modification 5.

In step S4070, the position/orientation calculation unit 120 sets s obtained by the processing until step S4060 as an estimated value $\omega_{WC}$ (after correction) of the orientation of the image capture device 130.

As described above, the orientation parameters that minimize the sum of errors on all the indices can be calculated while fixing the position parameters obtained as the sensor measurement values.

The position and orientation calculation processing steps of the image capture device 130 in step S3070 will be described below using the flowchart of FIG. 5. In the following description, the position and orientation of the image capture device 130 as unknown parameters to be calculated are internally expressed by a six-valued vector $s = [t_{WC}^T \omega_{WC}^T]^T = [x_{WC} y_{WC} z_{WC} \xi_{WC} \psi_{WC} \zeta_{WC}]^T$.

In step S5000, the position/orientation calculation unit 120 sets the position and orientation of the image capture device 130 obtained as the sensor measurement values as initial values of s.

In step S5010, the position/orientation calculation unit 120 calculates an estimated value $u^{Q_{kn}*}$ of the image coordinates of each individual index $Q_{kn}$. The calculation of $u^{Q_{kn}*}$ is made based on an observation equation of the index defined by s, that is, a function of calculating the image coordinates from coordinates $X_O^{Q_{kn}}$ of each index $Q_{kn}$ on the object coordinate system:

$$u^{Q_{kn}*} = F'_C(x_O^{Q_{kn}}, s) \quad (13)$$

More specifically, the observation equation F'c( ) is configured by formula (5) for calculating the camera coordinates $x_C^{Q_{kn}}$ of the index of interest from $x_O^{Q_{kn}}$ and s, and formula (6) for calculating the image coordinates $u^{Q_{kn}*}$ from the camera coordinate $x_C^{Q_{kn}}$. In this case, however, $t_{WC}$ (represents the position of the image capture device 130) in formula (5) is handled not as the fixed value but as some of parameters that form s. On the other hand, as for the position $t_{WO}$ and orientation $R_{WO}$ of the object 170 to be measured, the sensor measurement values are used intact as fixed values.

In step S5020, the position/orientation calculation unit 120 calculates an error $\Delta u^{Q_{kn}}$ between the estimated value $u^{Q_{kn}*}$ and actually measured value $u^{Q_{kn}}$ of the image coordinates for each individual index $Q_{kn}$ by formula (7).

In step S5030, the position/orientation calculation unit 120 calculates an image Jacobian (i.e., a Jacobian matrix of 2 rows×6 columns having, as respective elements, solutions obtained by partially differentiating the observation equation F'c( ) given by formula (13) by the elements of s) $J_{us}^{Q_{kn}}$ (=∂u/∂s) for s with respect to each individual index $Q_{kn}$. More specifically, the unit 120 calculates a Jacobian matrix $J_{us}^{Q_{kn}}$ (=∂u/∂x) of 2 rows×3 columns having, as respective elements, solutions obtained by partially differentiating the right-hand side of formula (6) by respective elements of the camera coordinates $x_C^{Q_{kn}}$, and a Jacobian matrix $J_{xs}^{Q_{kn}}$ (=∂x/∂s) of 3 rows×6 columns having, as respective elements, solutions obtained by partially differentiating the right-hand side of formula (5) by respective elements of the vector s, and then calculates $J_{us}^{Q_{kn}}$ by formula (8).

In step S5040, the position/orientation calculation unit 120 calculates a correction value Δs of s based on the errors $\Delta u^{Q_{kn}}$ and image Jacobians $J_{us}^{Q_{kn}}$ calculated in steps S5020 and S5030. More specifically, the position/orientation calculation unit 120 generates a 2N-dimensional error vector U defined by vertically arranging the errors $\Delta u^{Q_{kn}}$, and a matrix Θ of 2N rows×6 columns defined by vertically arranging the image Jacobians $J_{us}^{Q_{kn}}$, and then calculates Δs using a pseudo inverse matrix $\Theta^+$ of Θ by formula (11).

In step S5050, the position/orientation calculation unit 120 corrects s using the correction value Δs calculated in step S5040 according to formula (12), and sets the obtained value as a new estimated value of s.

The position/orientation calculation unit 120 checks in step S5060 if the calculations are converged, using some criteria such as whether or not an error vector U is smaller than a predetermined threshold or whether or not the correction value Δs is smaller than a predetermined threshold. If the calculations are not converged, the unit 120 executes the processes in step S5010 and subsequent steps again using s after correction. If it is determined that the calculations are converged, the process advances to step S5070.

In step S5070, the position/orientation calculation unit 120 sets s obtained by the processing until step S5060 as estimated values after correction of the position and orientation of the image capture device 130.

In this embodiment, in the processing of step S3070, the position and orientation of the image capture device 130 are selected as correction targets. Alternatively, the position and orientation of the object 170 to be measured may be selected as correction targets upon execution of the processing. In this case, unknown parameters to be calculated are internally expressed by a six-valued vector $s=[t_{WO}^T \omega_{WO}^T]^T = [x_{WO} y_{WO} z_{WO} \xi_{WO} \psi_{WO} \zeta_{WO}]^T$, and the position and orientation of the object 170 to be measured obtained as the sensor measurement values are set as initial values of s. Formula (5) which forms observation equation F'c( ) is modified as:

$$x_C^{Q_{k_n}} = R_{WC}^{-1} \cdot \left( R(\omega_{WO}) \cdot x_O^{Q_{k_n}} + t_{WO} - t_{WC} \right) \quad (14)$$

At this time, as for the position $t_{WO}$ and orientation $R_{WC}$ of the image capture device 130, the sensor measurement values are used intact as fixed values.

The position and orientation of the object 170 to be measured on the camera coordinate system or those of the image capture device 130 on the object coordinate system may be calculated as unknown parameters.

In the former case, unknown parameters to be calculated are internally expressed by a six-valued vector $s=[t_{CO}^T \omega_{CO}^T]^T = [x_{CO} y_{CO} z_{CO} \xi_{CO} \psi_{CO} \zeta_{CO}]^T$ which expresses the position and orientation of the object 170 to be measured on the camera coordinate system. The position/orientation calculation unit 120 calculates the position and orientation ($M^{\#}_{CO}$) of the object 170 to be measured on the camera coordinate system based on the sensor measurement values ($M^{\#}_{WC}$ and $M^{\#}_{WO}$) by:

$$M^{\#}_{CO} = M^{\#}_{WC}{}^{-1} \cdot M^{\#}_{WO} \quad (15)$$

The unit 120 sets this as an initial value of s. Also, formula (5) which forms observation equation F'c( ) is modified as:

$$x_C^{Q_{k_n}} = R(\omega_{CO}) \cdot x_O^{Q_{k_n}} + t_{CO} \quad (16)$$

On the other hand, in the latter case, unknown parameters to be calculated are internally expressed by a six-valued vector $s=[t_{OC}^T \omega_{OC}^T]^T = [x_{OC} y_{OC} z_{OC} \xi_{OC} \psi_{OC} \zeta_{OC}]^T$ which expresses the position and orientation of the image capture device 130 on the object coordinate system. The position/orientation calculation unit 120 calculates the position and orientation ($M^{\#}_{OC}$) of the image capture device 130 on the object coordinate system based on the sensor measurement values ($M^{\#}_{WC}$ and $M^{\#}_{WO}$) by:

$$M^{\#}_{OC} = M^{\#}_{WO}{}^{-1} \cdot M^{\#}_{WC} \quad (17)$$

The unit 120 sets this as an initial value of s. Also, formula (5) which forms observation equation F'c( ) is modified as:

$$x_C^{Q_{k_n}} = R(\omega_{OC})^{-1} \cdot \left( x_O^{Q_{k_n}} - t_{OC} \right) \quad (18)$$

In this way, the errors of the positions and orientations by the sensors can be corrected using, as unknown parameters, the relationship of the relative position and orientation between the object 170 to be measured and image capture device 130.

Since the conventional position/orientation measurement apparatus does not consider any distribution of indices, and solutions become unstable when indices are unevenly distributed and observed in a partial region on an image. On the other hand, according to the position/orientation measurement apparatus of this embodiment, since the methods are selected in consideration of the size of the distribution range of the indices in step S3033 and steps S3040, S3050, and S3060, even when, for example, a large number of indices are detected, if they are unevenly distributed in a small region on the image, it can be determined that these indices are insufficient to stably calculate the six degrees of freedom of the position and orientation. For this reason, even when indices are unevenly distributed and observed in a partial region on an image, an appropriate position/orientation estimation method is selected to lower the probability of a situation in which unstable solutions are obtained, and stable solutions can be obtained compared to the conventional method.

According to the position/orientation measurement apparatus of this embodiment, when the sensor measurement values are corrected by selecting only some parameters which form the position and orientation of the image capture device, correction that minimizes the sum of errors on the indices can be made under such restriction. Therefore, even when the position and orientation of the image capture device are to be stably measured by decreasing the number of unknown parameters, measurements with higher precision than the conventional method can be attained.

Second Embodiment

A position/orientation measurement apparatus according to this embodiment measures the position and orientation of an arbitrary measurement target object on a reference coordinate system defined in a room or the like.

The position/orientation measurement apparatus according to this embodiment is different from that of the first embodiment in that no position/orientation sensor is attached to the image capture device, and the image capture device is fixed at a known position and orientation using a tripod or the like. Only differences from the first embodiment will be described below.

Figure 12:
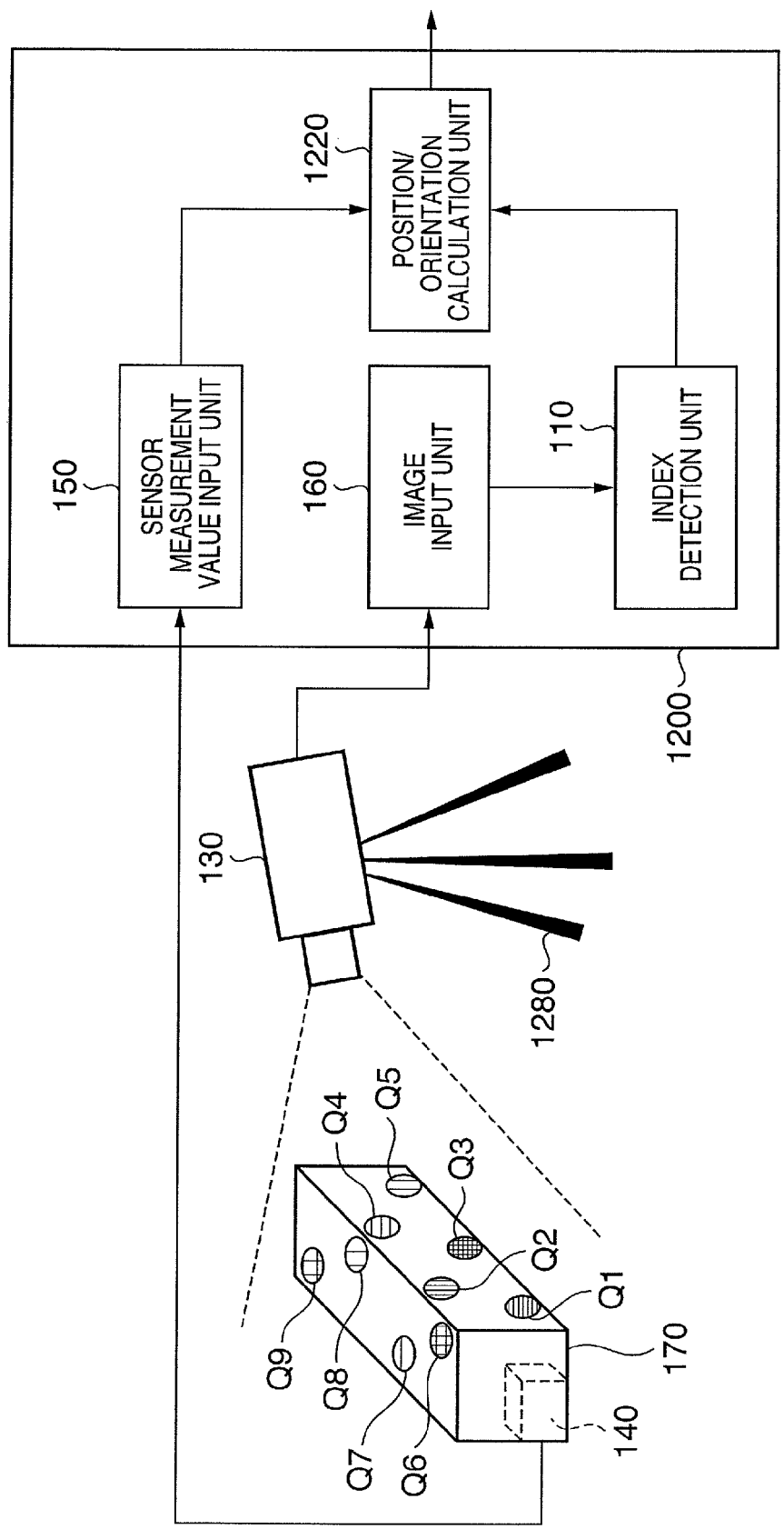
FIG. 12 is a block diagram showing the arrangement of a position/orientation measurement apparatus according to the second embodiment.

FIG. 12 is a block diagram showing the arrangement of the position/orientation measurement apparatus of this embodiment. As shown in FIG. 12, a position/orientation measurement apparatus 1200 of this embodiment comprises an image input unit 160, index detection unit 110, sensor measurement value input unit 150, and position/orientation calculation unit 1220, and is connected to an image capture device 130 and position/orientation sensor 140.

The image capture device 130 is fixed by the tripod 1280 at a known position and orientation in the space. A captured image output from the image capture device 130 is input to the image input unit 160 of the position/orientation measurement apparatus 1200. Assume that the position and orientation of the image capture device 130 on the reference coordinate system are held in advance as known values.

The sensor measurement value input unit 150 receives from the position/orientation sensor 140 the measurement values of the position and orientation of an object 170 to be measured, and outputs them to the position/orientation calculation unit 1220.

The position/orientation calculation unit 1220 receives the measurement values of the position and orientation of the object 170 to be measured as the outputs from the sensor measurement value input unit 150, and image coordinates $u^{Qkn}$ of respective indices $Q_{kn}$ as the outputs from the index detection unit 110, corrects errors of the measurement values of the position and orientation of the object 170 to be measured based on the input information, and outputs the corrected position and orientation data.

Note that at least some of the image input unit 160, index detection unit 110, sensor measurement value input unit 150, and position/orientation calculation unit 1220 shown in FIG. 12 may be implemented as independent devices, or may be implemented as software programs that implement the functions by installing the software programs in one or a plurality of computers and executing them by a CPU of each computer. In this embodiment, assume that the respective units (image input unit 160, index detection unit 110, sensor measurement value input unit 150, and position/orientation calculation unit 1220) are implemented by software and are installed in a single computer. The basic arrangement of the computer that implements the functions of the respective units by executing software is the same as that in the first embodiment, and a repetitive description thereof will be avoided.

The processing sequence of the position/orientation calculation unit 1220 of this embodiment is substantially the same as that of the position/orientation calculation unit 120 (corresponding to the flowchart of FIG. 3) in the first embodiment. The only difference is that the position and orientation of the image capture device 130 are not given as measurement values but are held in advance as known values. The position/orientation calculation unit 1220 sets the known values of the position and orientation of the image capture device 130 as temporary measurement values of the position and orientation of the image capture device 130 to correct the measurement values of the position and orientation of the image capture device 130 by the same steps as in steps S3000 to S3070 in the first embodiment. The unit 1220 then corrects the measurement values of the position and orientation of the object 170 to be measured in step S3080 (formula (1)) as in the first embodiment. In this embodiment, the position/orientation calculation unit 1220 outputs only the position and orientation of the object 170 to be measured in step S3080.

With the aforementioned processing, the position and orientation of the measurement target object are measured. As described above, according to the position/orientation measurement apparatus of this embodiment as well, since the methods are selected in consideration of the size of the distribution range of the indices, even when indices are unevenly distributed and observed in a partial region on the image, an appropriate position/orientation estimation method can be selected, and stable solutions can be obtained compared to the conventional method.

Note that the method of measuring the position and orientation of an arbitrary measurement target object by an image capture device which is fixed at a known position can be implemented even when the sensor to be attached to the measurement target object is changed to an orientation sensor. For example, when the distribution of detected indices is less than a threshold, the orientation measurement value of the orientation sensor is used as a fixed value, and only a position is estimated from the information of the indices. On the other hand, when the distribution of indices is equal to or larger than the threshold, six parameters of the position and orientation are estimated from the information of the indices. In this case, the number of image capture devices is not limited to one, and a plurality of image capture devices can be used.

Third Embodiment

A position/orientation measurement apparatus according to this embodiment measures the position and orientation of an image capture device on a space such as a room or the like. The position/orientation measurement apparatus according to this embodiment will be described hereinafter.

In this embodiment, no measurement target object other than the image capture device exists, and the position/orientation measurement apparatus according to this embodiment measures only the position and orientation of the image capture device unlike in the first embodiment. Only differences from the first embodiment will be explained below.

Figure 13:
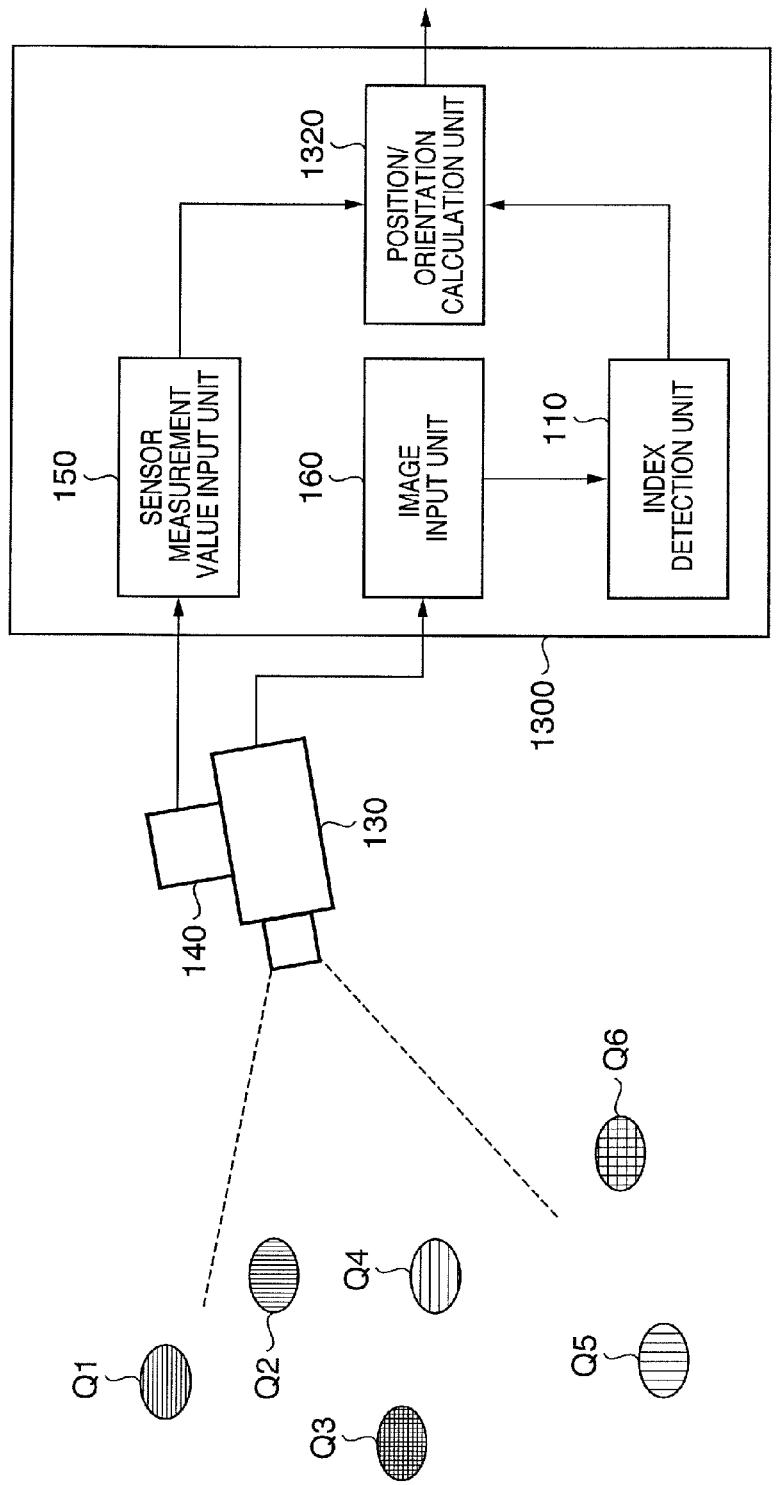
FIG. 13 is a block diagram showing the arrangement of a position/orientation measurement apparatus according to the third embodiment.

FIG. 13 is a block diagram showing the arrangement of a position/orientation measurement apparatus of this embodiment. As shown in FIG. 13, a position/orientation measurement apparatus 1300 of this embodiment comprises an image input unit 160, index detection unit 110, sensor measurement value input unit 150, and position/orientation calculation unit 1320, and is connected to an image capture device 130 and position/orientation sensor 140.

At a plurality of positions on the physical space, a plurality of indices $Q_k$ whose positions on the reference coordinate system are known are laid out as those to be captured by the image capture device 130. The indices $Q_k$ may adopt any form as long as the image coordinates of their projected images on the captured image are detectable, and each of the indices is identifiable by an arbitrary method.

The sensor measurement value input unit 150 receives the measurement values of the position and orientation of the image capture device 130 from the position/orientation sensor 140, and outputs them to the position/orientation calculation unit 1320.

The position/orientation calculation unit 1320 receives the measurement values of the position and orientation of the image capture device 130 as the outputs from the sensor measurement value input unit 150, and image coordinates $u^{Qkn}$ of respective indices $Q_{kn}$ as the outputs from the index detection unit 110, corrects errors of the measurement values of the position and orientation of the image capture device 130, and outputs the corrected position and orientation data.

Note that at least some of the image input unit 160, index detection unit 110, sensor measurement value input unit 150, and position/orientation calculation unit 1320 shown in FIG. 13 may be implemented as independent devices, or may be implemented as software programs that implement the functions by installing the software programs in one or a plurality of computers and executing them by a CPU of each computer. In this embodiment, assume that the respective units (image input unit 160, index detection unit 110, sensor measurement value input unit 150, and position/orientation calculation unit 1320) are implemented by software and are installed in a single computer. The basic arrangement of the computer that implements the functions of the respective units by executing software is the same as that in the first embodiment, and a repetitive description thereof will not be given.

Since the processing sequence of the position/orientation calculation unit 1320 in this embodiment is similar to that (corresponding to the flowchart of FIG. 3) of the position/orientation calculation unit 120 in the first embodiment, only differences from the first embodiment will be described below with reference to FIG. 3.

In step S3005, the position/orientation calculation unit 1320 receives the position and orientation of the image capture device 130 measured by the sensor from the sensor measurement value input unit 150.

In step S3025, the position/orientation calculation unit 1320 applies correction to cancel errors (errors among the 3D coordinates $x_W^{Qkn}$ of indices on the reference coordinate system, theoretical values $u^{Qkn}*$ of projected coordinates derived from the measurement values of the position and orientation of the image capture device 130, and actual detected coordinates $u^{Qkn}$) on the detected indices to pan and tilt angles of the measurement values of the orientation of the image capture device 130 obtained in step S3005. The process then advances to step S3080.

Since known processing can be used as such correction processing, no more explanation will be given. More specifically, methods disclosed in, for example, patent reference 1 (a correction method by means of rotation of a camera using one landmark (paragraphs "0019" to "0029") and a correction method by means of rotation of a camera using a plurality of landmarks (paragraphs "0039" to "0050")) can be used.

In step S3035, the position/orientation calculation unit 1320 applies correction to minimize the sum of errors on all the detected indices to three parameters (pan, tilt, and roll angles) which represent the measurement values of the orientation of the image capture device 130, while setting the position measurement value of the image capture device 130 obtained in step S3005 as a fixed value. The process then advances to step S3080. This correction processing step is similar to the correction processing step in step S3035 (corresponding to the flowchart of FIG. 4) in the first embodiment. However, in case of this embodiment, an observation equation F"c( ) of indices expresses a function of calculating image coordinates from coordinates $x_W^{Qkn}$ (held in advance as known information) of the indices $Q_{kn}$ on the reference coordinate system. That is, the observation equation F"c( ) is given by:

$$u_{k_n}^{Q^*} = F_C''(x_W^{Q_{k_n}}, s) \quad (19)$$

More specifically, the observation equation F"c( ) is configured by a formula which is used to calculate camera coordinates $x_C^{Qkn}$ of the index of interest from $x_W^{Qkn}$ and s, and is given by:

$$x_C^{Q_{k_n}} = R(\omega_{WC})^{-1} \cdot (x_W^{Q_{k_n}} - t_{WC}) \quad (20)$$

and formula (6) for calculating the image coordinates $u^{Qkn}*$ from the camera coordinates $x_C^{Qkn}$. This is only the difference. Note that $t_{WC}$ is a 3D vector that represents the position measurement value of the image capture device 130, and is handled as a fixed value in this formula.

In step S3070, the position/orientation calculation unit 1320 calculates the position and orientation of the image capture device 130 to minimize the sum of errors on the all the detected indices. Since detailed processing of this processing step can be implemented using a state-of-the-art technique disclosed in, for example, parent reference 2, a description thereof will not be given.

In step S3080, the position/orientation calculation unit 1320 externally outputs the position and orientation of the image capture device 130 obtained as the results until step S3070 via the I/F 1009. Alternatively, the unit 1320 stores these data on the RAM 1002 after it converts them into a state usable from other applications.

With the aforementioned processing, the position and orientation of the image capture device are measured. As described above, according to the position/orientation measurement apparatus of this embodiment as well, since the methods are selected in consideration of the size of the distribution range of the indices, even when indices are unevenly distributed and observed in a partial region on the image, an appropriate position/orientation estimation method can be selected, and stable solutions can be obtained compared to the conventional method.

Fourth Embodiment

A position/orientation measurement apparatus according to this embodiment measures the position and orientation of an arbitrary measurement target object on a space such as a room or the like. The position/orientation measurement apparatus according to this embodiment will be described below. In this embodiment, the position and orientation of an arbitrary measurement target object are measured in place of the image capture device unlike in the third embodiment. Only differences from the third embodiment will be described below.

Figure 14:
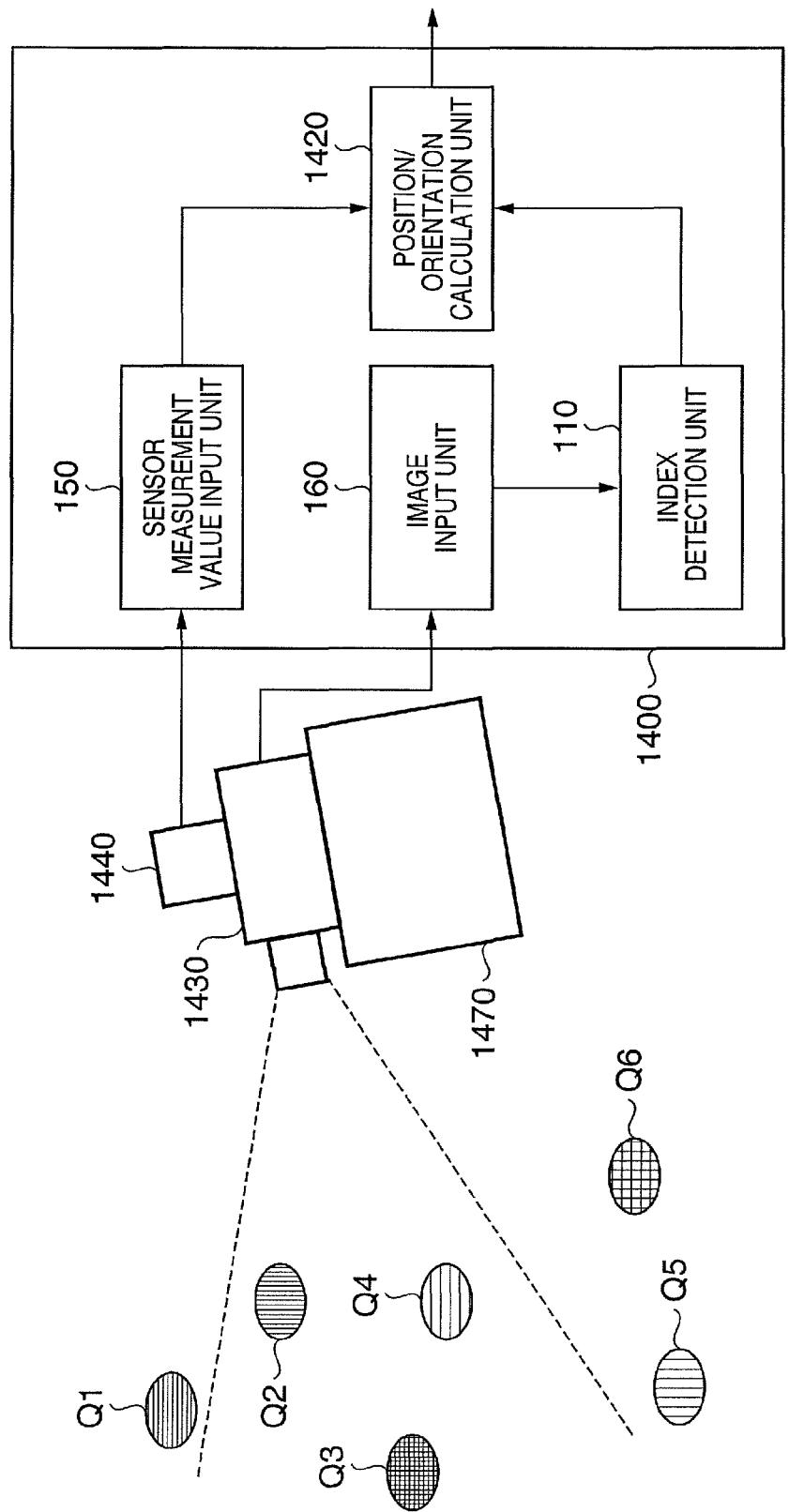
FIG. 14 is a block diagram showing the arrangement of a position/orientation measurement apparatus according to the fourth embodiment.

FIG. 14 is a block diagram showing the arrangement of a position/orientation measurement apparatus of this embodiment. As shown in FIG. 14, a position/orientation measurement apparatus of this embodiment 1400 of this embodiment comprises an image input unit 160, index detection unit 110, sensor measurement value input unit 150, image capture unit 1430, position/orientation measurement unit 1440, position/orientation calculation unit 1420, and is connected to an object 1470 to be measured.

The image capture unit 1430 is fixed and attached to the object 1470 to be measured as an object whose position and orientation are to be measured, and captures a video of the physical space including indices.

The position/orientation measurement unit 1440 is fixed and attached to the image capture unit 1430, measures the position and orientation of the image capture unit 1430 on the reference coordinate system, and outputs them to the sensor measurement value input unit 150. The position/orientation measurement unit 1440 comprises, for example, FASTRAK available from Polhemus, U.S.A., or the like.

The image input unit 160 converts a captured image captured by the image capture unit 1430 into digital data, and outputs the digital data to the index detection unit 110.

The sensor measurement value input unit 150 receives the measurement values of the position and orientation of the image capture unit 1430 from the position/orientation measurement unit 1440, and outputs them to the position/orientation calculation unit 1420.

The position/orientation calculation unit 1420 receives the measurement values of the position and orientation of the image capture unit 1430 as the outputs from the sensor measurement value input unit 150, and image coordinates $u^{Qkn}$ of respective indices $Q_{kn}$ as the outputs from the index detection unit 110, and corrects errors of the measurement values of the position and orientation of the image capture unit 1430.

The position/orientation calculation unit 1420 further calculates the position and orientation of the object 1470 to be measured on the reference coordinate system from the obtained position and orientation of the image capture unit 1430, and information about the relative position/orientation relationship between the image capture unit 1430 and object 1470 to be measured (more specifically, information indicating the position where the image capture unit 1430 is set on the object 1470 to be measured; that information is expressed by the position and orientation of the image capture unit 1430 on an object coordinate system defined by the object 1470 to be measured). The unit 1420 then externally outputs the calculated data via the I/F 1009. Alternatively, the unit 1420 stores these data in the RAM 1002 after it converts them into a state usable by other applications. Note that this conversion process is not always required, and the position and orientation of the image capture unit 1430 may be output intact.

In this embodiment, the position/orientation measurement unit 1440 measures the position and orientation of the image capture unit 1430. Alternatively, the position/orientation measurement unit 1440 may be configured to measure the position and orientation of the object 1470 to be measured. In this case, the position/orientation calculation unit 1420 calculates the position and orientation of the image capture unit 1430 from those of the object 1470 to be measured obtained as the measurement values using the relative position/orientation relationship between the image capture unit 1430 and object 1470 to be measured, which is held as known values, and executes the same processing as above using these values as initial values.

The position/orientation calculation unit 1420 corrects the orientation or the position and orientation of the image capture unit 1430, and then calculates the position and orientation of the object 1470 to be measured in any of steps S3025, S3035, and S3070. However, the position/orientation calculation unit 1420 may be configured to directly calculate the position and orientation of the object 1470 to be measured in steps S3035 and S3070.

When the position/orientation measurement unit 1440 measures the position and orientation of the image capture unit 1430, the position/orientation calculation unit 1420 calculates the position and orientation of the object 1470 to be measured from those of the image capture unit 1430 obtained as the measurement values, using the relative position/orientation relationship between the image capture unit 1430 and object 1470 to be measured, which is held in advance as known values, and uses them as initial values.

In step S3035, the position/orientation calculation unit 1420 sets, as unknown parameters, a three-valued vector $s=\omega_{WO}=[\xi_{WO}\psi_{WO}\zeta_{WO}]^T$ that expresses the orientation of the object 1470 to be measured. In step S3070, the position/orientation calculation unit 1420 sets, as unknown parameters, a six-valued vector $s=[t_{WO}^T \omega_{WO}^T]^T = [x_{WO}y_{WO}z_{WO}\xi_{WO}\psi_{WO}\zeta_{WO}]^T$ which expresses the position and orientation of the object 1470 to be measured. Also, the unit 1420 modifies formula (20) required to define the observation equation F"c( ) as:

$$x_C^{Q_{k_n}} = R_{OC}^{-1} \cdot \left( R(\omega_{WO})^{-1} \cdot \left( x_W^{Q_{k_n}} - t_{WO} \right) - t_{OC} \right) \quad (21)$$

where $t_{OC}$ and $R_{OC}$ are a 3×3 rotation matrix that represents the orientation of the image capture unit 1430 on an object coordinate system defined by the object 1470 to be measured, and a 3D vector that represents the position, and are held in advance as known values that represent the relative position/orientation relationship between the image capture unit 1430 and object 1470 to be measured. Note that $t_{WO}$ is set as a fixed value in step S3035.

With the above processing, the position and orientation of an arbitrary object are measured. As described above, according to the position/orientation measurement apparatus of this embodiment as well, since the methods are selected in consideration of the size of the range of distribution of the indices, even when indices are unevenly distributed and observed in a partial region on the image, an appropriate position/orientation estimation method can be selected, and stable solutions can be obtained compared to the conventional method.
Checked to Here (Dan)

Fifth Embodiment

A position/orientation measurement apparatus according to this embodiment measures the position and orientation of an image capture device on a space such as a room or the like. The position/orientation measurement apparatus according to this embodiment will be described below.

Figure 15:
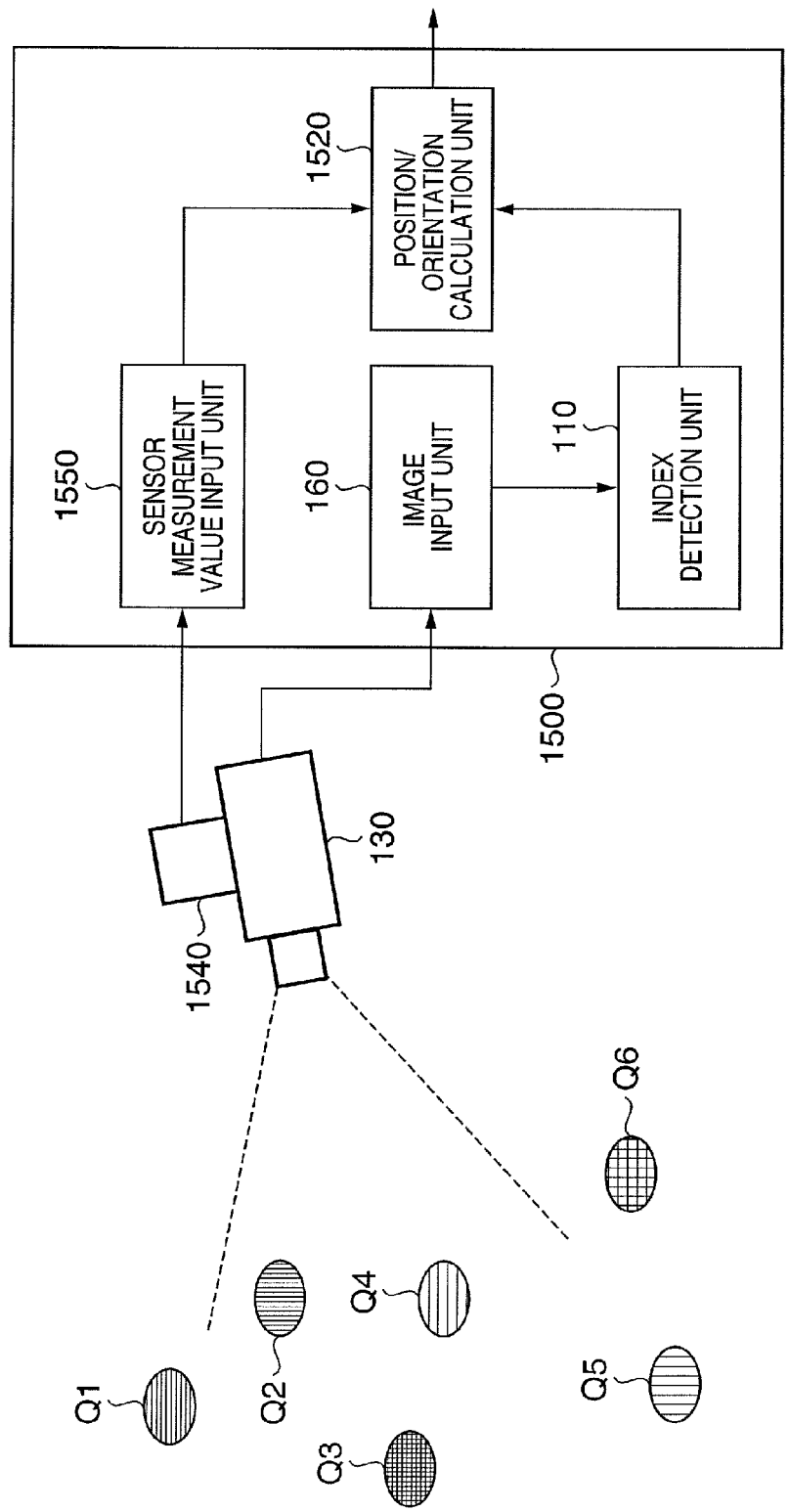
FIG. 15 is a block diagram showing the arrangement of a position/orientation measurement apparatus according to the fifth embodiment.

FIG. 15 is a block diagram showing the arrangement of the position/orientation measurement apparatus of this embodiment. As shown in FIG. 15, a position/orientation measurement apparatus 1500 of this embodiment comprises an image input unit 160, index detection unit 110, sensor measurement value input unit 1550, and position/orientation calculation unit 1520, and is connected to an image capture device 130 and orientation sensor 1540.

In this embodiment, the orientation sensor is attached to the image capture device 130 in place of the position/orientation sensor unlike in the third embodiment. Using the orientation sensor, a restriction which is imposed upon using the position/orientation and that a region other than the sensor measurement range cannot be measured can be avoided. Only differences from the third embodiment will be described below.

The orientation sensor 1540 is attached to the image capture device 130, measures the current orientation of the orientation sensor 1540 itself, and outputs it to the sensor measurement value input unit 1550. The orientation sensor 1540 is a sensor unit based on, e.g., a gyro sensor and acceleration sensor, and comprises TISS-5-40 available from TOKIMEC, InertiaCube2 available from InterSense, U.S.A., or the like. Since the orientation measurement value measured by each of these sensors is that measured as a value obtained by time-integrating inertia measurement values, it has errors different from a true orientation. However, these orientation sensors have a function of canceling accumulation of drift errors in tilt angle directions (pitch and roll angles) since they observe the direction of gravitational force of the earth by an internal acceleration sensor. For this reason, these sensors have a nature that no drift errors occur in the tilt angle directions. In other words, these sensors have drift errors accumulated along with an elapse of time in the azimuth direction (yaw angle direction).

The sensor measurement value input unit 1550 receives the updated value of the azimuth drift error correction value from the position/orientation calculation unit 1520, and updates and holds the current azimuth drift error correction value of the orientation sensor 1540. Also, the unit 1550 receives the orientation measurement value from the orientation sensor 1540, corrects it by the current azimuth drift error correction value, and outputs the corrected value to the position/orientation calculation unit 1520 as a predicted value of the orientation of the image capture device 130.

The position/orientation calculation unit 1520 receives, as input data, the predicted value of the orientation of the image capture device 130 as the output from the sensor measurement value input unit 1550, and image coordinates $u^{Q_{kn}}$ of respective indices $Q_{kn}$ as the outputs from the index detection unit 110, and calculates and outputs the position and orientation of the image capture device 130. Also, the unit 1520 outputs the updated value of the azimuth drift error correction value of the orientation sensor 1540 derived in the position and orientation calculation step to the sensor measurement value input unit 1550.

Note that at least some of the image input unit 160, index detection unit 110, sensor measurement value input unit 150, and position/orientation calculation unit 1520 shown in FIG. 15 may be implemented as independent devices, or may be implemented as software programs that implement the functions by installing the software programs in one or a plurality of computers and executing them by a CPU of each computer. In this embodiment, assume that the respective units (image input unit 160, index detection unit 110, sensor measurement value input unit 150, and position/orientation calculation unit 1520) are implemented by software and are installed in a single computer. The basic arrangement of the computer that implements the functions of the respective units by executing software is the same as that in the first embodiment, and a repetitive description thereof will be avoided.

Figure 16:
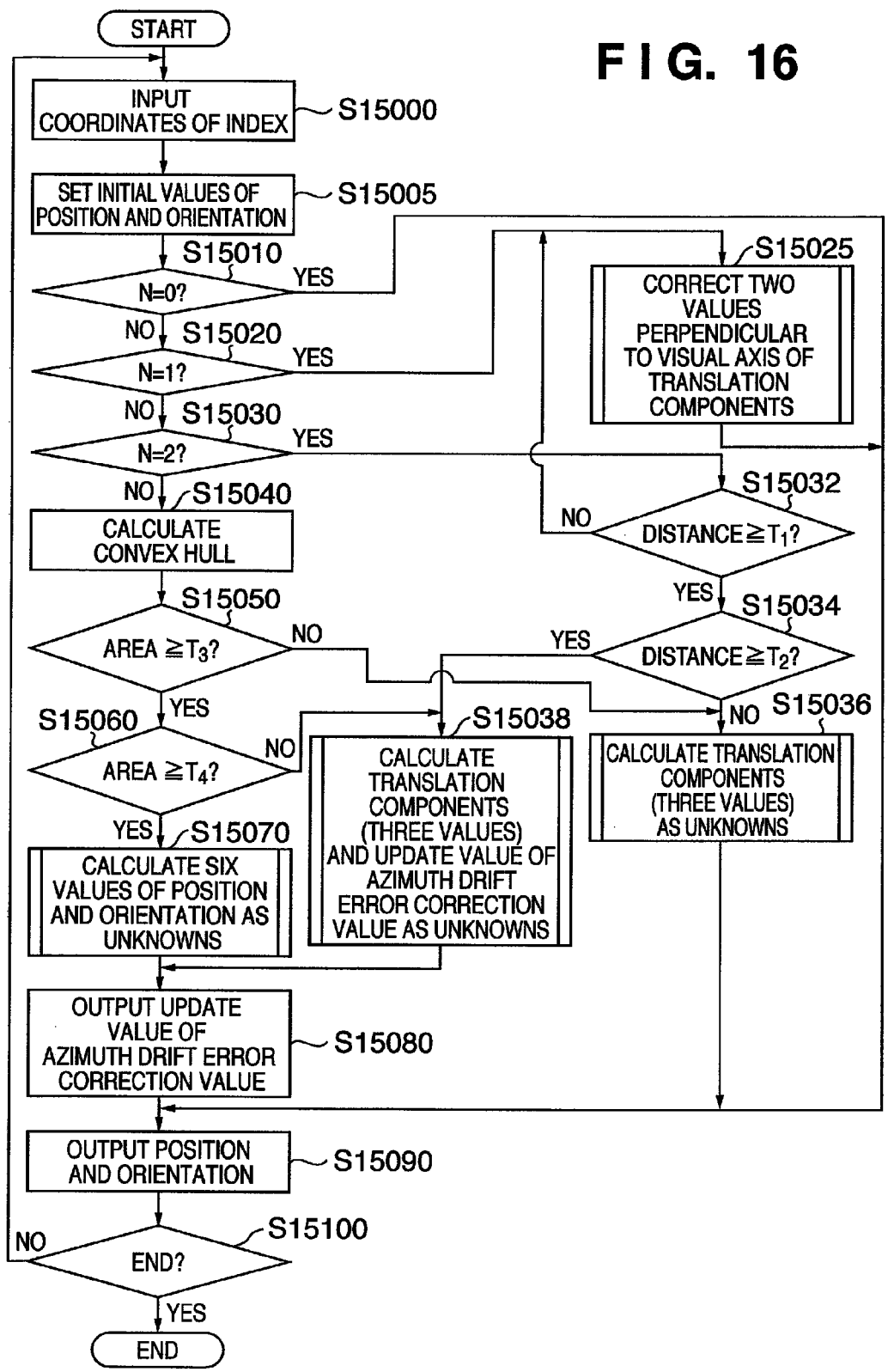
FIG. 16 is a flowchart for explaining the processing for calculating the position and orientation of an image capture device 130 according to the fifth embodiment.

FIG. 16 is a flowchart showing the processing for calculating parameters indicating the position and orientation of the image capture device 130. This processing is implemented when the CPU 1001 executes the software program of the position/orientation calculation unit 1520.

In step S15000, the position/orientation calculation unit 1520 receives the image coordinates $u^{Qkn}$ of the detected indices $Q_{kn}$ and their identifiers $k_n$ from the index detection unit 110. Assume that 3D coordinates $x^{Qkn}$ of respective indices on the reference coordinate system are loaded in advance onto the RAM 1002 as known values.

In step S15005, the position/orientation calculation unit 1520 receives a predicted value R* of the orientation of the image capture device 130 from the sensor measurement value input unit 1550, and sets it as an initial value of the orientation of the image capture device 130. In the second or subsequent processing, the unit 1520 sets the position of the image capture device 130 calculated in the processing of the immediately preceding loop as an initial value of the orientation of the image capture device 130.

The position/orientation calculation unit 1520 checks in step S15010 if indices are detected. If no index is detected, the process jumps to step S15090; otherwise, the process advances to step S15020.

The position/orientation calculation unit 1520 checks in step S15020 if the total number of detected indices is one. If the total number of indices is one, the process advances to step S15025; otherwise, the process advances to step S15030.

In step S15025, the position/orientation calculation unit 1520 applies correction to cancel errors on the detected indices to values in the two-axis directions perpendicular to the visual axis of translation components of the initial value set in step S15005 as correction target. The process then advances to step S15090. Since known processing can be provided as the processing step in step S15025, no more explanation will be given. More specifically, methods disclosed in, e.g., patent reference 1 (a correction method by means of translation of a camera using one landmark (paragraphs "0030" to "0036") and a correction method by means of translation of a camera using a plurality of landmarks (paragraphs "0051" to "0056")) can be used. Note that patent reference 1 has explained a case wherein the measurement values of a six-degrees-of-freedom position/orientation sensor are used as objects which are to undergo error correction. However, in this embodiment, a combination of the position calculated in the previous frame and the measurement value of the orientation sensor is used as a correction target unlike in patent reference 1.

The position/orientation calculation unit 1520 checks in step S15030 if the total number of detected indices is two. If the total number of indices is two, the process advances to step S15032; otherwise, the process advances to step S15040.

In step S15032, the position/orientation calculation unit 1520 calculates a distance between the two detected indices on the image, and compares the calculated value with a threshold $T_1$ (e.g., ⅛ of the diagonal line length of the image) which is defined as a predetermined value. If the distance is equal to or larger than the threshold $T_1$, the process advances to step S15034; otherwise, the process advances to step S15025.

In step S15034, the position/orientation calculation unit 1520 compares the distance between the two detected indices on the image with a threshold $T_2$ (e.g., ¼ of the diagonal line length of the image) which is defined as a predetermined value. If the distance is equal to or larger than the threshold $T_2$, the process advances to step S15038; otherwise, the process advances to step S15036.

In step S15036, the position/orientation calculation unit 1520 applies correction that minimizes errors on the detected indices to have three parameters (translation components) representing the position of the initial value set in step S15005 as update targets (i.e., under the assumption that the orientation measurement value does not include any errors) to only the parameters of the position. After that, the process advances to step S15090. Since details of this processing step are disclosed in, e.g., patent reference 3 (sixth embodiment), a repetitive description thereof will be avoided. Alternatively, an observation equation including the three parameters that represent the position as unknown variables may be configured, and error minimization calculations are made using image Jacobians, thus also correcting the position while minimizing errors on the image.

In step S15038, the position/orientation calculation unit 1520 handles, as unknown parameters to be calculated, a total of four parameters including the three parameters (translation components) representing the position of the initial value set in step S15005, and an update value φ of the azimuth drift error correction value of the orientation sensor 1540, and calculates them using information of the detected indices. Since details of this processing step is disclosed in, e.g., patent reference 3 (seventh embodiment), a repetitive description thereof will be avoided. Alternatively, an observation equation including these four parameters as unknown variables may be configured, and error minimization calculations are made using image Jacobians, thus also calculating the position and the update value of the azimuth drift error correction value while minimizing errors on the image. Furthermore, the process advances to step S15080.

Step S15040 is executed only when the total number of detected indices is three or more. In this step, the position/orientation calculation unit 1520 calculates a convex hull which includes the image coordinates of all the detected indices as an example of an evaluation value associated with the distribution range of all the detected indices.

In step S15050, the position/orientation calculation unit 1520 compares the area of the convex hull calculated in step S15040 with a threshold $T_3$ (e.g., 1/16 of the area of the overall captured image) which is defined as a predetermined value. If the area is equal to or larger than the threshold $T_3$, the process advances to step S15060; otherwise, the process advances to step S15036 to execute the aforementioned processing.

In step S15060, the position/orientation calculation unit 1520 compares the area of the convex hull calculated in step S15040 with a threshold $T_4$ which is defined as a predetermined value. If the area is equal to or larger than the threshold $T_3$ (e.g., ⅑ of the area of the overall captured image), the process advances to step S15070; otherwise, the process advances to step S15038 to execute the aforementioned processing.

In step S15070, the position/orientation calculation unit 1520 calculates the position and orientation of the image capture device 130 to minimize the sum of errors on the all the detected indices. This calculation is implemented by calculating parameters that minimize errors by an iterative solving method of a nonlinear equation using the initial value set in step S15005 to have, e.g., the six parameters representing the position and orientation of the image capture device 130 as variables. That is, an observation equation including the six parameters representing the position and orientation as unknown variables is configured, and a correction value of each parameter is calculated using errors of the index projected positions calculated based on this equation, and image Jacobians associated with that parameter, thus calculating the position and orientation that minimize the errors on the image by repeating the correction processing.

The position/orientation calculation unit 1520 further calculates a change between the initial value of the orientation set in step S15005 and the calculated orientation, and sets its azimuth component as the update value φ of the azimuth drift error correction value.

In step S15080, the position/orientation calculation unit 1520 outputs the update value φ of the azimuth drift error correction value obtained in step S15038 or S15070 to the sensor measurement value input unit 1550.

In step S15090, the position/orientation calculation unit 1520 externally outputs the position and orientation of the image capture device 130 obtained as results until step S15080 via the I/F 1009. Alternatively, the unit 1520 stores these data on the RAM 1002 after it converts them into a state usable from other applications.

The position/orientation calculation unit 1520 checks in step S15100 if the processing is to end. If the processing is not to end, the process returns to step S15000.

With the aforementioned processing, the position and orientation of the image capture device are measured.

According to the position/orientation measurement apparatus of this embodiment, since the methods are selected in consideration of the size of the distribution range of the indices in steps S15034 S15050 (i.e., to check whether or not to update the azimuth drift error correction value), when indices are unevenly distributed and observed in a partial region on an image, a situation in which the azimuth drift error correction value is updated inaccurately can be avoided.

According to the position/orientation measurement apparatus of this embodiment, in addition to the effects of the third embodiment, by selecting the methods in step S15060, even when image information is insufficient, the position and orientation can be stably derived by trusting in the tilt angle information by the orientation sensor. In addition, when sufficient image information is obtained, the position and orientation can be estimated with high precision. Hence, advantages of the position/orientation estimation method based on normal image information can be achieved at the same time.

Modifications of First to Fifth Embodiments (Modification 1)

In each of the aforementioned embodiments, the correction algorithms to be applied are selected based on the distribution of indices on the image. These algorithms (steps S3025, S3035, S3070 in the first embodiment, modifications of these steps in the second to fourth embodiments, and steps S15025, S15036, S15038, and S15070 in the fifth embodiment) are not limited to those described in the above embodiments, and may be replaced by other correction algorithms as long as they are appropriately set according to the information size of image information assumed according to the distribution of indices.

For example, in step S3025 or S3035 in the first to fourth embodiments, the measurement value of the position may be corrected in place of the measurement value of the orientation. In this case, in step S3025 the position/orientation calculation unit can apply correction to cancel errors on the detected indices to have values in the two two-axis directions perpendicular to the visual axis of the camera of the position measurement value based on the correction method by means of translation of a camera using one or a plurality of indices, as disclosed in, e.g., paragraphs "0030" to "0036" and "0051" to "0056" of patent reference 1.

Figure 5:
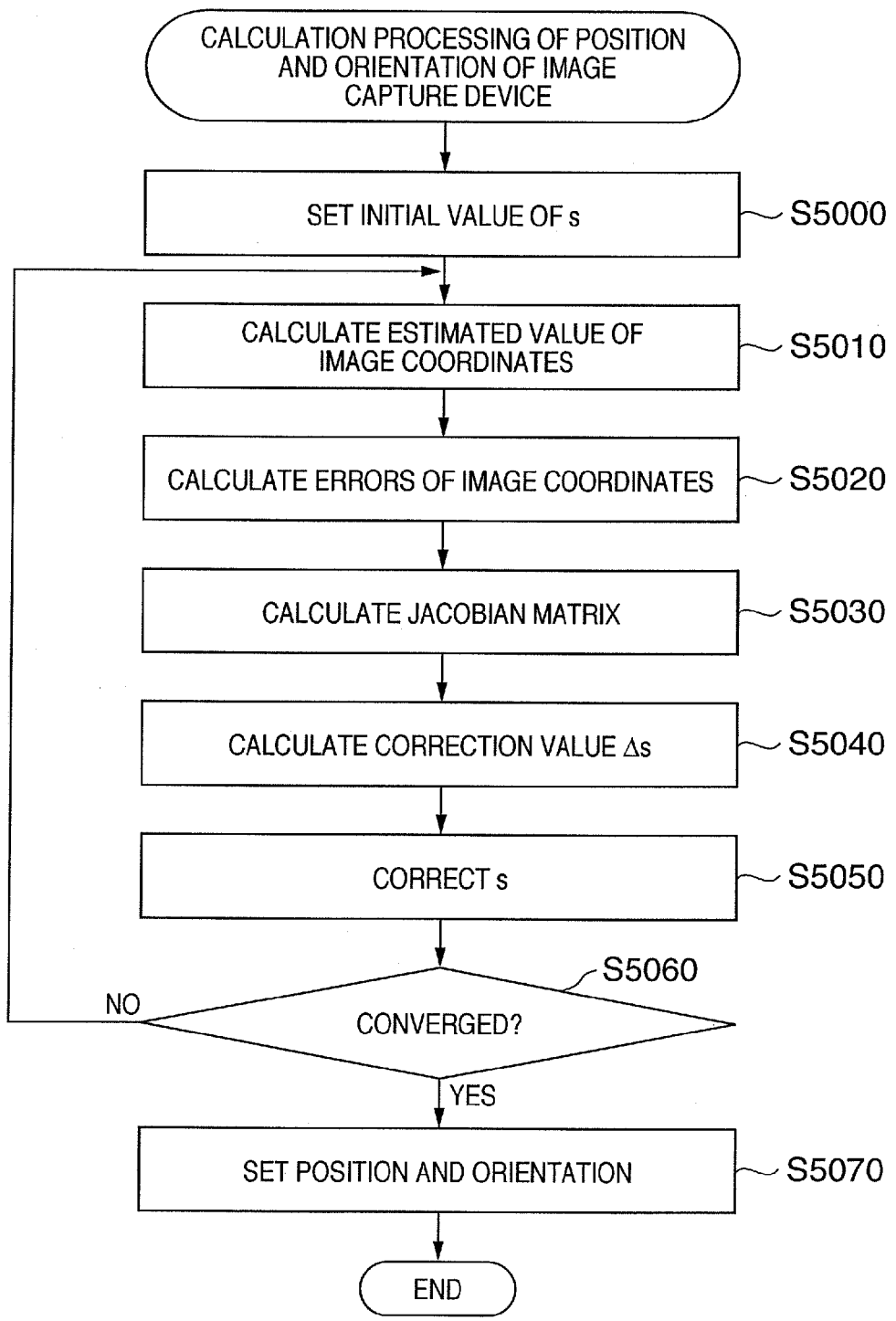
FIG. 5 is a flowchart for explaining details of position and orientation calculation processing in step S3070 in FIG. 3.

In step S3035 the position/orientation calculation unit corrects the position in the same processing sequence as in FIG. 5 to have, as unknown parameters to be calculated, a three-valued vector $s = t_{WC} = [x_{WC} y_{WC} z_{WC}]^T$. Unlike in the first embodiment, formula (5) which configures the observation equation is modified as:

$$x_C^{Q_{k_n}} = R_{WC}^{-1} \cdot (R_{WO} \cdot x_O^{Q_{k_n}} + t_{WO} - t_{WC}) \quad (22)$$

where $R_{WC}$ is the orientation measurement value of the image capture device 130 by the sensor, which is used as a fixed value. Also, $R_{WO}$ and $t_{WO}$ are the sensor measurement values of the position and orientation of the object 170 to be measured as in formula (5) in the first embodiment, which are handled as fixed values.

Since formula (22) is a linear equation, simultaneous equations are formed from the observation equation combined with formula (6), and are solved, thus obtaining the correction value without using iterative operations.

Note that the user may be allowed to freely select to give priority to correction of the orientation or position via a UI (not shown). In this case, upon execution of steps S3025 and S3035, the orientation or position correction algorithm is executed according to the user's choice. In this manner, even when position/orientation sensors having different characteristics are used, more preferred measurements can be made.

In step S3025, the position/orientation calculation unit may select arbitrary two out of the six parameters obtained as measurement values as correction targets, and may make calculations using these parameters as unknowns in the same manner as in the aforementioned method. Likewise, in step S3035, the position/orientation calculation unit may select arbitrary three out of the six parameters obtained as measurement values as correction targets, and may make calculations using these parameters as unknowns by the same framework as in the aforementioned method.

(Modification 2)

In the first to fourth embodiments, the process branches to three different algorithms (steps S3033, S3050, and S3060) based on the measure of the distribution of indices on the image. However, the number of branches to be made based on the measure of the distribution of indices is not limited to three. For example, the process in step S3050 may be omitted, and the process may branch to step S3035 or S3070 based on the magnitude relationship between the threshold $T_3$ and the area of the convex hull. Alternatively, a larger number of thresholds may be set, and the process may branch to four or more ways. For example, the number (2 to 6) of parameters to be corrected may be changed according to the area of the convex hull, and the position and orientation may be calculated to have them as unknowns by the same method.

(Modification 3)

In each of the above embodiments, the position and orientation of a measurement target (the measurement target object or an image capture device) are calculated using the measurement values of the position/orientation sensor or orientation sensor, and image information captured by the image capture device together. However, the basic technical idea of selecting the algorithm used to calculate the position and orientation based on the distribution of indices on the image can also be applied to a case in which the position and orientation of the measurement target are calculated from only the image information without using any measurement values from these sensors.

For example, a case will be examined below wherein the position/orientation measurement apparatus 1300 does not have any sensor measurement value input unit 150, and no position/orientation sensor 140 is attached to the image capture device 130 in the arrangement of the third embodiment shown in FIG. 13. In this case, assuming that the position/orientation calculation unit 1320 uses, as initial values, the calculation values of the position and orientation calculated in the previous frame (or the position and orientation in the current frame predicted from the previous calculation values) in place of the measurement values of the position and orientation of the image capture device 130 by the position/orientation sensor 140, it executes the same processing as in FIG. 3 to have these values as temporary measurement values, thus selecting an appropriate calculation algorithm of the position and orientation according to the distribution of indices.

(Modification 4)

In each of the above embodiments, when three or more indices are detected, the convex hull defined by these indices are calculated, and its area is used as the evaluation value used to evaluate the distribution of indices. However, the measure used upon evaluating the distribution of indices is not limited to this, and other measures may be used. For example, an index located at a position farthest from the image center is selected as a first index, an index located at a position farthest from the first index is selected as a second index, and an index having the longest distance from a line that connects the first and second indices is selected as a third index. Then, the area of a triangle formed by these first, second, and third indices may be used as the measure of the distribution in place of the area of the convex hull. More simply, the distance between such first and second indices may be used as the measure of the distribution, and another arbitrary information that can express the distribution as a numerical value such as a variance, standard deviation, or the like of the image coordinates of indices may be used as the measure of the distribution.

As a practical method of using the variance of the image coordinates of other indices, a method of using a covariance of the image coordinates of indices is available. That is, this method calculates a variance-covariance matrix of the image coordinates of detected indices, and uses its eigenvalue (this value corresponds to the variance of principal components in principal component analysis). In this case, using the second eigenvalue as the measure, the two-dimensional spread of indices on the image can be evaluated. Also using the first eigenvalue as the measure, the linear spread of the image can be evaluated.

In addition, feature amounts other than the area of the convex hull such as the perimeter of the convex hull and the like may be used. Also, a feature amount obtained from a circumscribing quadrangle, circumscribing circle, or the like for all the detected indices may be used. Analytic values of the moments of the image coordinates of indices (e.g., the major and minor axis lengths of an inertia equivalent ellipse) or the like may be used. When a single polygonal index is used, the area of an index region obtained upon detecting that index may be used intact.

In place of directly measuring the distribution of the detected indices, the size of the distribution of indices may be estimated based on arbitrary information. For example, the coordinates of indices which are to be observed on the image may be calculated based on the estimated values (initial values) of the position and orientation of the camera or object obtained from the previous frame or information from the sensor to obtain the calculatory distribution of indices. Furthermore, the distances to indices may be approximately estimated based on the apparent sizes and the like of detected indices, and the distribution may be estimated based on these distances.

(Modification 5)

Figure 4:
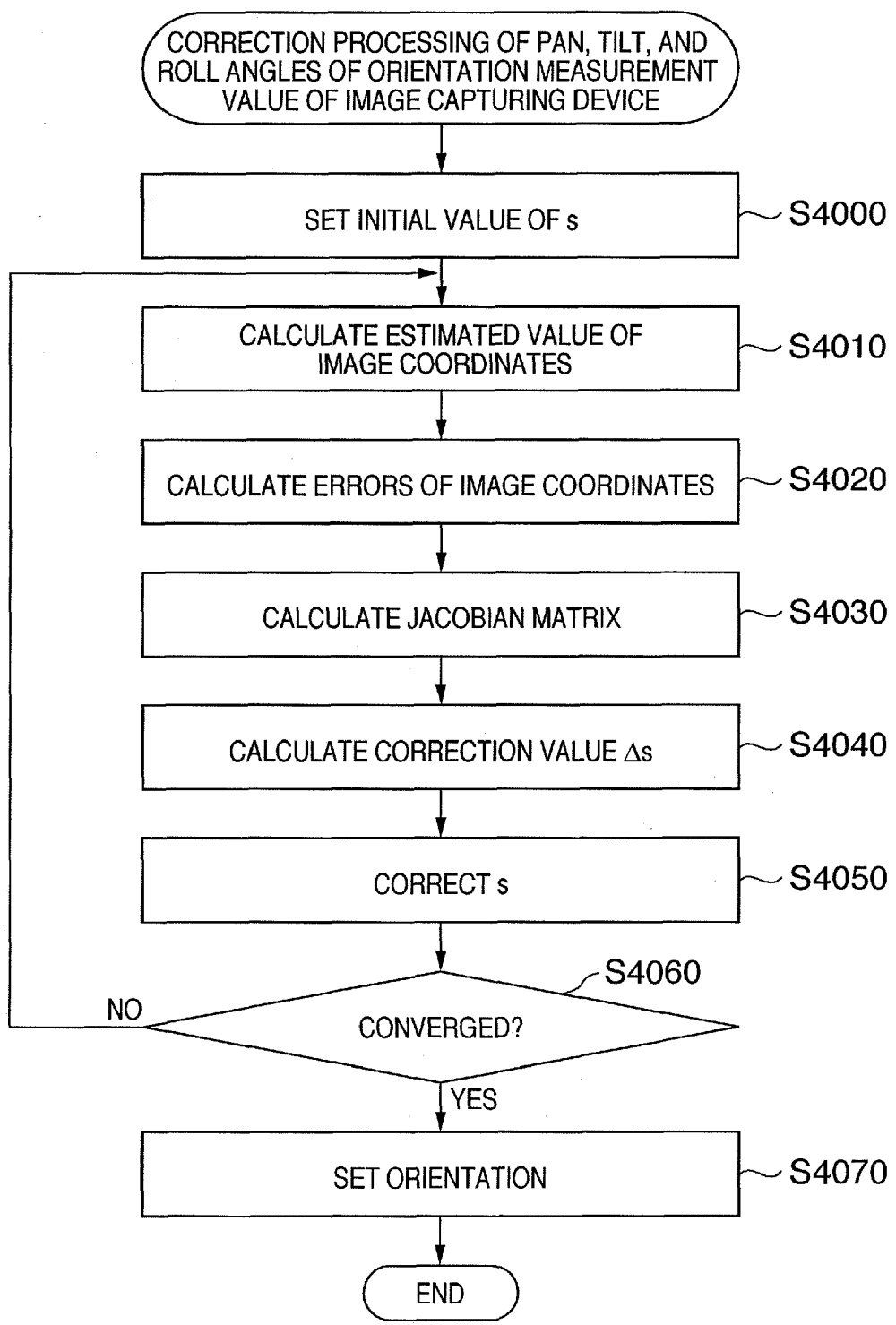
FIG. 4 is a flowchart for explaining details of position and orientation calculation processing in step S3035 in FIG. 3.

In step S3035 in the first embodiment, a method described by formula (11) is used to calculate the correction value $\Delta s$ based on the error vector U and matrix $\Theta$, as has been described in detail in step S4040 in FIG. 4. Also, s is calculated by the Newton method that replaces s by s+$\Delta s$ using $\Delta s$ as a result. However, a method of calculating s is not limited to this Newton method. For example, s may be calculated using, e.g., an LM method (Levenberg-Marquardt method) as a known iterative solving method of a nonlinear equation, or a statistical method such as M-estimation or the like as a known robust estimation method may be combined. Hence, the gist of the invention does not impair even when any other numerical calculation methods are applied. By defining s as a state vector and formula (4) as an observation equation in the above embodiment, an Extended Kalman Filter or iterative Extended Kalman Filter having an effect of correcting only some parameters of the measurement values of the position/orientation sensors using image Jacobians can be configured. Since the Extended Kalman Filter and iterative Extended Kalman Filter are known to those who are skilled in the art, as described in non-patent reference 2, no more explanation about their details will be given.

(Modification 6)

In each of the aforementioned embodiments, indices each of which represents one coordinate position (to be referred to as point indices hereinafter) are used. However, indices other than point indices may be used. For example, indices configured by line features (to be referred to as line indices hereinafter) used in a known position/orientation measurement apparatus (e.g., see non-patent reference 3) may be used. For example, when an error vector U is configured by errors calculated from detection values from the image using the distances from an origin to the line indices as criteria for evaluation and estimated values based on s, and a matrix $\Theta$ is configured by a Jacobian matrix of 1 row×6 columns having, as elements, solutions obtained by partially differentiating the observation equation by elements of s, the position and orientation can be measured (corrected) as in the above embodiments. By accumulating errors obtained from the line indices, point indices, and other indices, and image Jacobians, these features can be used together.

(Modification 7)

In each of the aforementioned embodiments, the subsequent processing is selected according to the distribution of indices with respect to the image area. However, a relative ratio to the measurement target object may be used as the measure. For example, in the first embodiment, in step S3040 position/orientation calculation unit calculates an area $S_O$ of a projected image of the object 170 to be measured (assume that 3D data representing a rough shape of the object 170 is stored) onto the image in addition to the area $S_H$ of the convex hull formed by all the detected indices, and obtains a ratio ($S_H/S_O$) of them. Then, the conditional branch in steps S3050 and S3060 may be executed using thresholds which are appropriately set for the ratio.

The distribution of indices on the physical space in place of the image may be used as the measure. For example, in the first embodiment, in step S3040 the position/orientation calculation unit calculates a 3D convex hull formed by the 3D coordinates of all the detected indices on the object coordinate system, calculates its volume $V_H$, and obtains a ratio ($V_H/V_O$) to a volume $V_O$ of the object 170 to be measured, thus deriving a ratio of the distribution of the detected indices on the object 170 to be measured. Then, the conditional branch in steps S3050 and S3060 may be executed using thresholds which are appropriately set for the ratio. Also, the area of a triangle formed by three detected indices which are farthest from each other on the object coordinate system is calculated, a ratio to the size of the object 170 to be measured (for example, the area of a rectangle formed by two longest sides of a circumscribing rectangular parallelepiped) is calculated, and that ratio can be used as the measure.

Sixth Embodiment

In the first to fifth embodiments, one of some methods for calculating the position and orientation is selected in accordance with the distribution of indices. This embodiment implements the stable measurements of the position and orientation in consideration of the distribution of indices by a method different from selection of one method.

A position/orientation measurement apparatus according to this embodiment measures the positions and orientations of an image capture device and measurement target object as in the first embodiment. The position/orientation measurement apparatus and position/orientation measurement method according to this embodiment will be described below.

The arrangement of the position/orientation measurement apparatus according to this embodiment is substantially the same as that of the first embodiment, except for the internal operation of the position/orientation calculation unit 120. Hence, only the operation of the position/orientation calculation unit of this embodiment as the difference from the first embodiment will be described below.

Figure 17:
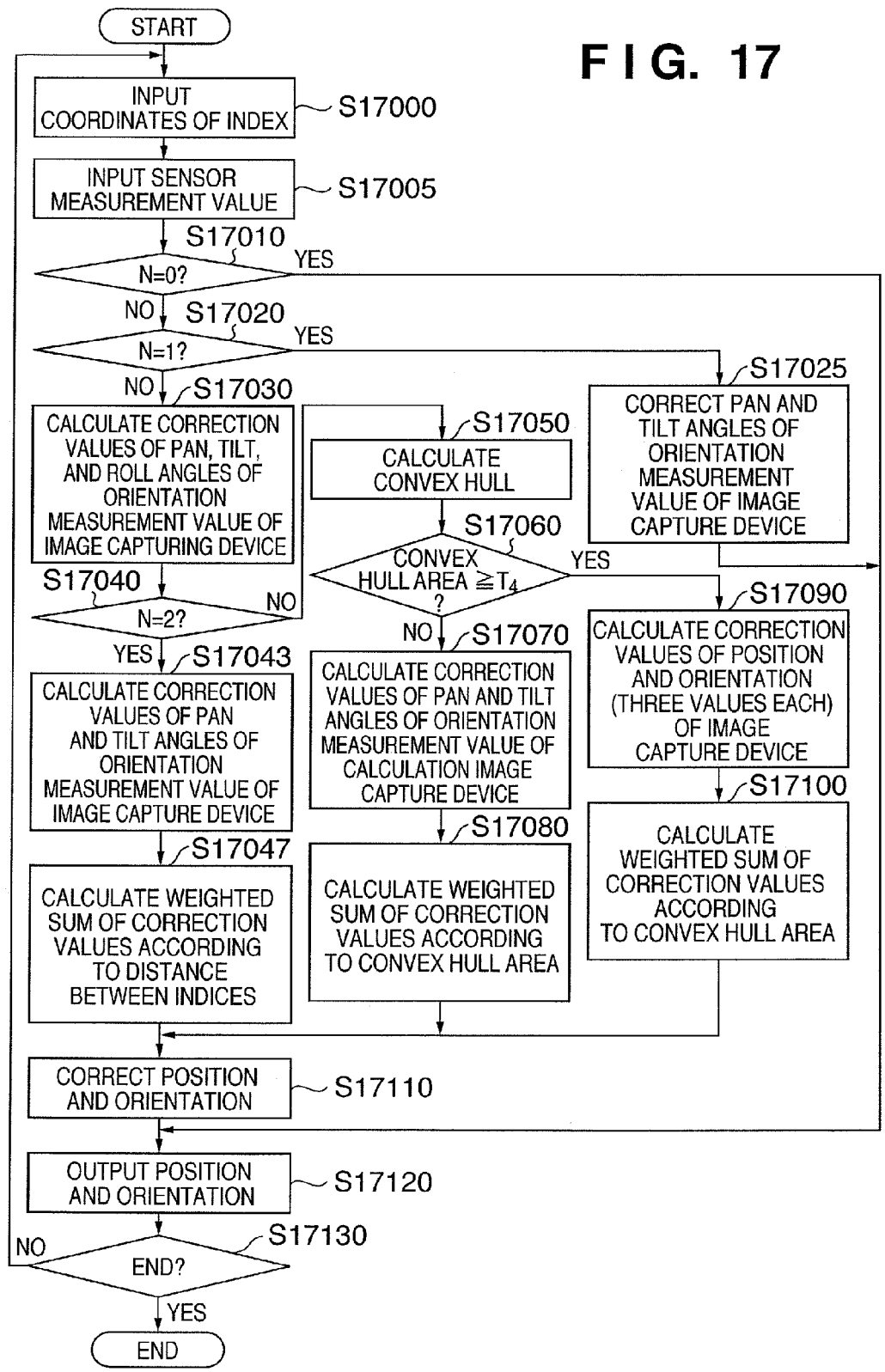
FIG. 17 is a flowchart for explaining the processing for calculating the positions and orientations of an image capture device 130 and object 170 to be measured according to the sixth embodiment.

FIG. 17 is a flowchart showing the processing sequence of a position/orientation calculation unit 1720 of this embodiment. In this embodiment, the following sequence is implemented when the CPU 1001 executes a program that implements the function of the position/orientation calculation unit 1720.

In step S17000, the position/orientation calculation unit 1720 receives the image coordinates $u^{Qkn}$ of the detected indices $Q_{kn}$ and their identifiers $k_n$ from the index detection unit 110. Assume that the 3D coordinates $x_O^{Qkn}$ of respective indices on the object coordinate system are loaded in advance onto the RAM 1002 as known values.

In step S17005, the position/orientation calculation unit 1720 receives the sensor measurement values of the positions and orientations of the image capture device 130 and object 170 to be measured from the sensor measurement value input unit 150. In the following description, the position measurement value of the image capture device 130 is expressed by a three-valued vector $t^{\#}_{WC}$, and its orientation measurement value is expressed by a 3×3 rotation matrix $R^{\#}_{WC}$. Also, the position measurement value of the object 170 to be measured is expressed by a three-valued vector $t^{\#}_{WO}$, and its orientation measurement value is expressed by a 3×3 rotation matrix $R^{\#}_{WO}$.

The position/orientation calculation unit 1720 checks in step S17010 if indices are detected. If no index is detected (N=0), the process jumps to step S17120; otherwise (N≧1), the process advances to step S17020.

The position/orientation calculation unit 1720 checks in step S17020 if the total number of detected indices is one. If the total number of indices is one, the process advances to step S17025; otherwise, the process advances to step S17030.

In step S17025, the position/orientation calculation unit 1720 applies correction to cancel errors on the detected indices to two parameters (pan and tilt angles) of the orientation measurement value of the image capture device 130. The process then jumps to step S17120. Since the correction processing in step S17025 is the same as that in step S3025 in the first embodiment, a detailed description thereof will not be given.

In step S17030, the position/orientation calculation unit 1720 calculates a correction matrix $\Delta R_{WC\_1}$ used to apply correction to three parameters (pan, tilt, and roll angles) of the orientation measurement value of the image capture device 130, so as to cancel errors on the detected indices. Initially, the unit 1720 corrects the three parameters of the orientation by the same method as in step S3035 in the first embodiment to obtain a corrected orientation $R_{WC\_1}$ of the image capture device. Then, the unit 1720 calculates $\Delta R_{WC\_1}$ based on the obtained $R_{WC\_1}$ and the orientation measurement value $R^{\#}_{WC}$ by the sensor by:

$$\Delta R_{WC\_1} = \Delta R_{WC\_1} \cdot \Delta R^{\#}_{WC}{}^{-1} \qquad (23)$$

Although the position is not corrected in step S17030, the correction value of the position is described by a three-valued vector $\Delta t_{WC\_1}$ for the sake of descriptive convenience. Then, we have $\Delta t_{WC\_1} = [0\ 0\ 0]^T$.

The position/orientation calculation unit 1720 checks in step S17040 if the total number N of detected indices is two. If the total number N of indices is two, the process advances to step S17043; otherwise, the process advances to step S17050.

In step S17043, the position/orientation calculation unit 1720 calculates a correction matrix $\Delta R_{WC\_2}$ used to apply correction to two parameters (pan and tilt angles) of the orientation measurement value of the image capture device 130, so as to cancel errors on the detected indices. Initially, the unit 1720 corrects the orientation by the same method as in step S17025 to obtain a corrected orientation $R_{WC\_2}$ of the image capture device. Then, the unit 1720 calculates $\Delta R_{WC\_2}$ based on the obtained $R_{WC\_2}$ and the orientation measurement value $R^{\#}_{WC}$ in the same manner as in formula (23).

In step S17047, the position/orientation calculation unit 1720 calculates an orientation correction value (correction matrix $\Delta R_{WC}$) to be actually applied by combining the two orientation correction values (correction matrices $\Delta R_{WC\_1}$ and $\Delta R_{WC\_2}$). Since the position is not corrected, the correction vector $\Delta t_{WC}$ of the position is equated to $[0\ 0\ 0]^T$. The process then advances to step S17111.

Figure 18:
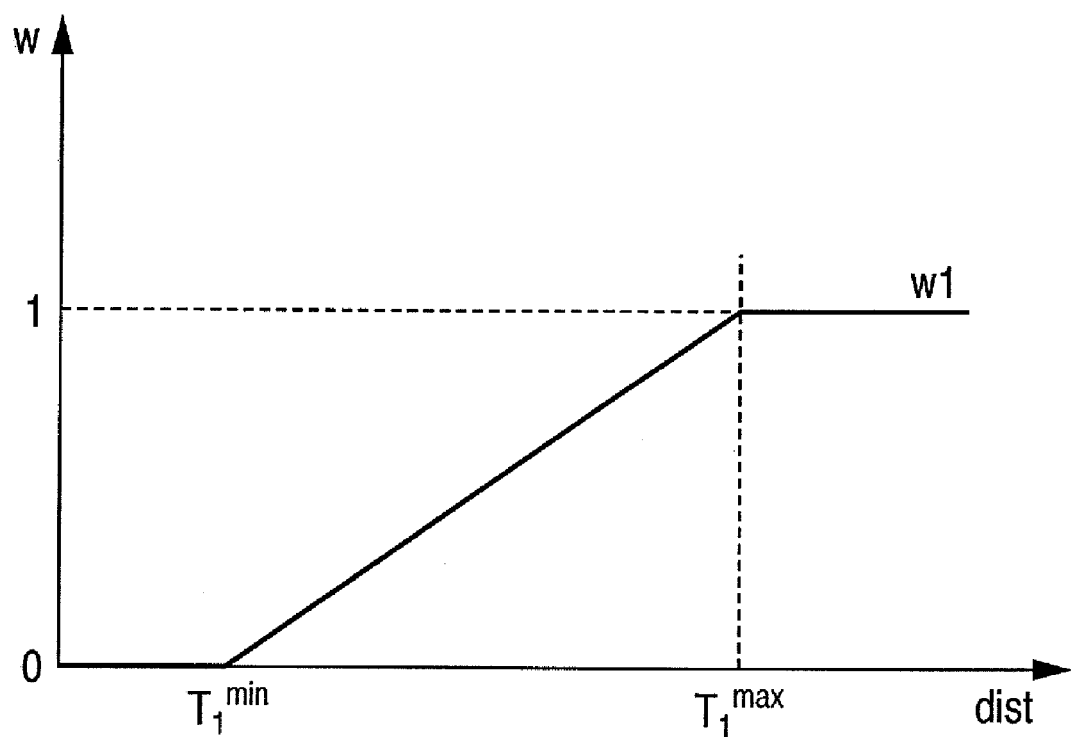
FIG. 18 is a graph showing the relationship between the distance between detected indices and a weight $w_1$, which is obtained by formula (28)

Details of the combining processing of the orientation correction values in step S17047 will be described below. The position/orientation calculation unit 1720 determines a weight $w_1$ of the two correction values in accordance with a distance dist between the two detected indices by:

$$w_1 = \begin{cases} 0 & dist \leq T_1^{min} \\ \dfrac{dist - T_1^{min}}{T_1^{max} - T_1^{min}} & T_1^{min} < dist < T_1^{max} \\ 1 & T_1^{max} \leq dist \end{cases} \quad (24)$$

where $T_1^{min}$ and $T_1^{max}$ are parameters used to normalize the distance between the indices, and appropriate values are set in advance. FIG. 18 shows the relationship between the weight $w_1$ and dist obtained by formula (24).

Next, the position/orientation calculation unit 1720 obtains orientation components of the correction matrices $\Delta R_{WC\_1}$ and $\Delta R_{WC\_2}$ as quaternion expressions (expressed by four-valued vectors $\Delta H_{WC\_1}$ and $\Delta H_{WC\_2}$), and calculates their weighted sum $\Delta H_{WC}$ by:

$$\Delta H_{WC} = (1-w_1)\Delta H_{WC\_2} + w_1 \Delta H_{WC\_1} \quad (25)$$

The position/orientation calculation unit 1720 converts the obtained weighted sum $\Delta H_{WC}$ into $\Delta R_{WC}$ as a rotation matrix expression. Since the mutual conversion method between the rotation matrix and the weighted sum as the quaternion is a basic point in the field of computer graphics and the like, a detailed description thereof will not be given.

Formula (25) selects correction of two parameters when the weight $w_1 = 0$, and selects correction of three parameters when the weight $w_1 = 1$. When the weight $w_1$ ranges from 0 to 1, an intermediate conversion matrix between the correction of two parameters and that of three parameters is generated according to the magnitude of the weight $w_1$.

A case will be explained below wherein $N \neq 2$ in step S17040, i.e., the three or more indices are detected. In step S17050, the position/orientation calculation unit 1720 calculates a convex hull which includes the image coordinates of all the detected indices.

In step S17060, the position/orientation calculation unit 1720 compares an area A of the convex hull calculated in step S17050 with a threshold $T_4$ (e.g., 1/12 of the area of the overall captured image) which is defined as a predetermined value. If the area A is equal to or larger than the threshold $T_4$, the process advances to step S17090; otherwise, the process advances to step S17070. Note that the threshold $T_4$ can assume any value as long as it satisfies $T_2^{max} \leq T_4 \leq T_3^{min}$ for two parameters $T_2^{max}$ and $T_3^{min}$ to be described later.

In step S17070, the position/orientation calculation unit 1720 calculates the correction matrix $\Delta R_{WC\_2}$ used to apply correction to the pan and tilt angles of the orientation measurement value of the image capture device 130 as in step S17043.

In step S17080, the position/orientation calculation unit 1720 calculates the correction matrix $\Delta R_{WC}$ by combining the two correction matrices $\Delta R_{WC\_1}$ and $\Delta R_{WC\_2}$ as in step S17047. The process then advances to step S17110. Note that in step S17080 the unit 1720 determines the weight $w_1$ in accordance with the area A of the convex hull calculated in step S17050 in place of the distance dist between the indices by:

$$w_1 = \begin{cases} 0 & A \leq T_2^{min} \\ \dfrac{A - T_2^{min}}{T_2^{max} - T_2^{min}} & T_2^{min} < A < T_2^{max} \\ 1 & T_2^{max} \leq A \end{cases} \quad (26)$$

where $T_2^{min}$ and $T_2^{max}$ are parameters used to normalize the area of the convex hull, and appropriate values which meet $T_2^{max} \leq T_4$ are set.

In step S17090, the position/orientation calculation unit 1720 calculates correction values of the position and orientation of the image capture device 130 to minimize the sum of errors on all the detected indices. Note that the correction value of the position is expressed by a three-valued vector $\Delta t_{WC\_3}$, and the correction value of the orientation is expressed by a 3×3 rotation matrix $\Delta R_{WC\_3}$. Initially, the unit 1720 corrects the position and orientation of the image capture device by the same method as in step S3070 in the first embodiment to obtain a corrected position $t_{WC\_3}$ and orientation $R_{WC\_3}$ of the image capture device. Then, the unit 1720 calculates $\Delta R_{WC\_3}$ as in formula (23) based on the obtained $R_{WC\_3}$ and the orientation measurement value $R^{\#}_{WC}$ by the sensor. Furthermore, the unit 1720 calculates $\Delta t_{WC\_3}$ based on the obtained $t_{WC\_3}$ and the position measurement value $t^{\#}_{WC}$ by:

$$\Delta t_{WC\_3} = t_{WC\_3} - t^{\#}_{WC} \quad (27)$$

In step S17100, the position/orientation calculation unit 1720 calculates correction values to be actually applied to the sensor measurement values by combining the two pairs of correction values ($\Delta R_{WC\_1}$ and $\Delta t_{WC\_1}$, and $\Delta R_{WC\_3}$ and $\Delta t_{WC\_3}$). The process then advances to step S17110.

Figure 19:
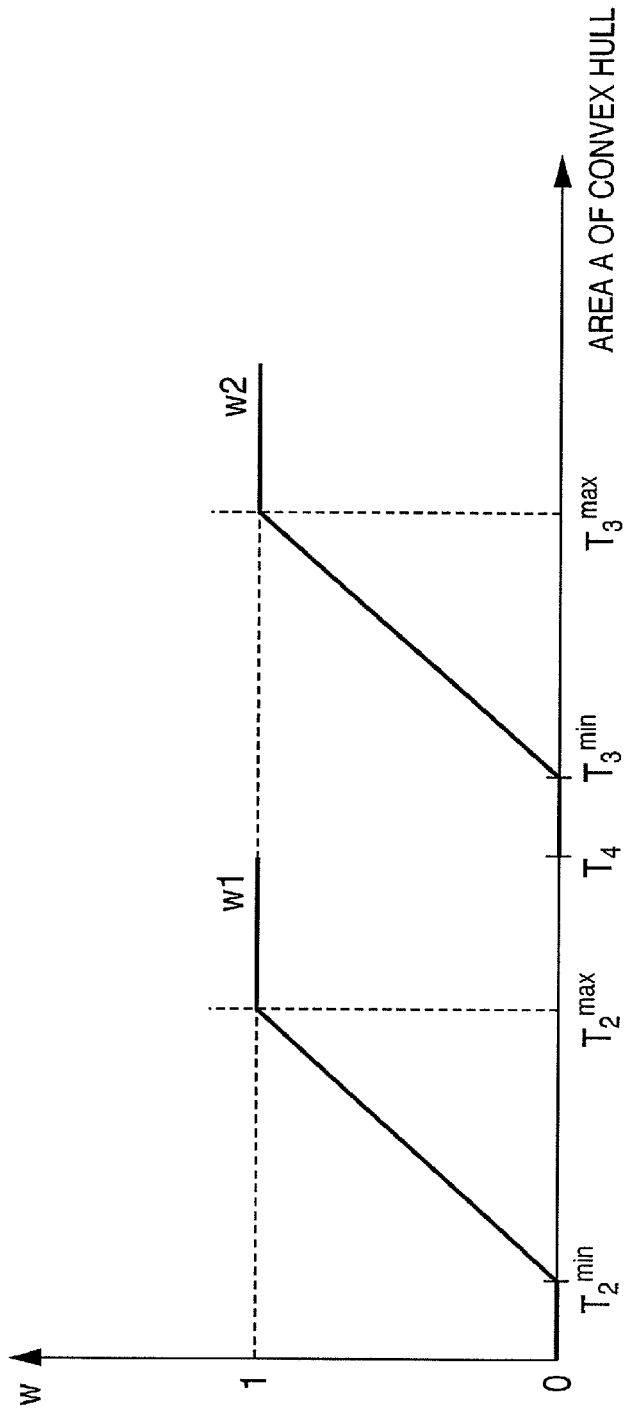
FIG. 19 is a graph showing the relationship between the area of the convex hull and weights $w_1$ and $w_2$, which is obtained by formulas (26) and (28)

Details of the processing in step S17100 will be described below. The position/orientation calculation unit 1720 determines a weight $w_2$ in accordance with the area A of the convex hull calculated in step S17050 by:

$$w_2 = \begin{cases} 0 & A \leq T_3^{min} \\ \dfrac{A - T_3^{min}}{T_3^{max} - T_3^{min}} & T_3^{min} < A < T_3^{max} \\ 1 & T_3^{max} \leq A \end{cases} \quad (28)$$

where $T_3^{min}$ and $T_3^{max}$ are parameters used to normalize the area of the convex hull, and appropriate values are set in advance to meet $T_4 \leq T_3^{min}$. FIG. 19 shows the relationship between the area A of the convex hull and the weights $w_1$ and $w_2$ obtained by formulas (26) and (28).

Next, the position/orientation calculation unit 1720 calculates the weighted sum of the two correction values for each of the position and orientation. As for the orientation, the unit 1720 obtains orientation components of the correction matrices $\Delta R_{WC\_1}$ and $\Delta R_{WC\_3}$ as quaternion expressions (expressed by four-valued vectors $\Delta H_{WC\_1}$ and $\Delta H_{WC\_3}$), and calculates their weighted sum $\Delta H_{WC}$ by:

$$\Delta H_{WC} = (1-w_2)\Delta H_{WC\_1} + w_2 \Delta H_{WC\_3} \quad (29)$$

The position/orientation calculation unit 1720 converts the obtained weighted sum $\Delta H_{WC}$ into $\Delta R_{WC}$ as a rotation matrix expression. On the other hand, as for the correction value of the position, the unit 1720 directly calculates a weighted sum $\Delta T_{WC}$ of the two vectors by:

$$\Delta t_{WC} = (1-w_2)\Delta t_{WC\_1} + w_2 \Delta t_{WC\_3} \quad (30)$$

A described above, $\Delta t_{WC\_1} = [0\ 0\ 0]^T$. Therefore, formulas (29) and (30) select correction of only three values of the orientation when the weight $w_2 = 0$, and selects correction of six degrees of freedom by adding three values of the position when the weight $w_2 = 1$. When the weight $w_2$ ranges from 0 to 1, an intermediate correction value between the correction of only the orientation and that of six degrees of freedom is generated according to the magnitude of the weight $w_2$.

In step S17110, the position/orientation calculation unit 1720 applies correction to the sensor measurement values of the position and orientation of the image capture device by formulas (31) and (32) below to obtain a corrected position $t_{WC}$ and orientation $R_{WC}$:

$$R_{WC} = \Delta R_{WC} + R^{\#}_{WC} \quad (31)$$

$$t_{WC} = \Delta t_{WC} + t^{\#}_{WC} \quad (32)$$

In step S17120, the position/orientation calculation unit 1720 externally outputs obtained data representing the positions and orientations of the image capture device 130 and object 170 to be measured via the I/F 1009. Alternatively, the unit 1720 stores these data on the RAM 1002 after it converts them into a state usable from other applications.

Note that the measurement values of the position and orientation of the object 170 to be measured may be corrected and output as in the first embodiment. The position and orientation of the object 170 to be measured on a camera coordinate system may be calculated and output. Also, the position and orientation of the image capture device 130 on the object coordinate system may be calculated and output.

The position/orientation calculation unit 1720 checks in step S17130 if the processing is to end. If the processing is not to end, the process returns to step S17000.

With the aforementioned processing, the position and orientation of the image capture device are measured.

In this embodiment, the use ratio of the plurality of correction methods is changed according to the distribution condition of the detected indices. For this reason, when the distributions of the detected indices on time-series images change gradually, the degrees of influence of the plurality of methods on calculation of the estimated values or correction values change gradually, and the methods are switched seamlessly. For this reason, compared to the first embodiment that completely switches the method via the threshold processing, this embodiment has superiority in terms of smoothness on the time axis.

In this embodiment, the method that places an importance on an image and the method that places an importance on the sensor measurement values are combined. As a result, the degree of influence (degree of contribution) of image information on the estimated position and orientation changes according to the distribution of the detected indices. More specifically, the following effect can be obtained: when sufficient image information is obtained, the image information is preferentially used; otherwise, the degree of influence of image information lowers.

Note that the correction values are always calculated by the two methods independently of the values of the weights w, i.e., weights $w_1$ and $w_2$, in the above description. However, the weight w is calculated first, and when its value is 0 or 1, the calculation processing of a correction value whose weight is zero may be skipped. In this way, the calculation volume when the weight=0 or 1 can be reduced.

In the above description, the weighted sums of the correction values (correction vectors and correction matrices) obtained by the two methods are calculated and added to the sensor measurement values. However, by calculating the weighted sums of the positions and orientations themselves obtained by the two methods, the same effect can be obtained. In this case, in step S17047 the unit 1720 calculates the weighted sum of the orientation $R_{WC\_1}$ calculated in step S17030 and the orientation $R_{WC\_2}$ calculated in step S17043 as in formula (25). In step S17070, the unit 1720 calculates the weighted sum of the orientation $R_{WC\_1}$ calculated in step S17030 and the orientation $R_{WC\_2}$ calculated in step S17070 as in formula (25). In step S17100, the unit 1720 calculates the weighted sums of the orientation $R_{WC\_1}$ and position $t^{\#}_{WC}$ calculated in step S17030 and the orientation $R_{WC\_3}$ and position $t_{WC\_3}$ calculated in step S17090 as in formulas (29) and (30). Then, the unit 1720 outputs the position and orientation obtained as the results of the weighted sums without executing step S17110.

The gist of the technical idea described in this embodiment is to combine the solutions obtained by the plurality of methods in accordance with the distribution of the detected indices. Therefore, in the second to fifth embodiments, by changing the selection step of the methods according to the distribution of the indices to the weighted sums of both the results, the position/orientation measurement apparatus which has the same effects as in this embodiment can be configured.

For example, a case will be examined below wherein the idea of this embodiment is applied to the fifth embodiment. For example, both the processes of steps S15070 and S15038 are executed to obtain the positions and orientations by these processes. The weight $w_2$ for the area A of the convex hull is calculated as in formula (28), and the weighted sums of the position and orientation are calculated as in formulas (29) and (30). At this time, as for the orientation, the weighted sum of the correction values obtained by the respective methods may be calculated, and may be added to the sensor measurement value. Since the same applies to the method of changing the selection step of another method to the weighted sum, no more explanation will be given.

In this embodiment as well, the use of the area of the convex hull formed by the detected indices as the measure of the distribution of indices is not indispensable, and various other measures may be used as in Modification 4 of the above embodiments.

As shown in formulas (24), (26), and (28), and FIGS. 18 and 19, in this embodiment, when the measure of the distribution of indices transits from the lower limit value to the upper limit value, the weight, i.e., the weight $w_1$ or $w_2$, is set to linearly transit from 0 to 1. However, the weight calculation method is not limited to such specific method. That is, when the measure of the distribution of indices is the lower limit value, the weight value is 0; when it is the upper limit value, the weight value is 1; and the weight value assumes a monotonically increasing value between these two values, thus obtaining the same effects. For example, formula (26) may be modified as:

$$w_1 = \begin{cases} 0 & A \leq T_2^{min} \\ \left(\cos\left(\frac{A - T_2^{min}}{T_2^{max} - T_2^{min}}\pi\right) + 1\right)\Big/2 & T_2^{min} < A < T_2^{max} \\ 1 & T_2^{max} \leq A \end{cases} \quad (33)$$

Of course, other similar monotonic increasing functions may be used instead.

As the method of calculating the weighted mean of the two orientations, the weighted sums of quaternions given by formulas (25) and (29) are used in this embodiment. However, the weighted mean method of the orientations is not limited to this, and other calculation methods may be used. For example, in place of using formula (25), the following method may be used. Initially, an orientation which expresses the difference between orientation-correction matrices $\Delta R_{WC\_2}$ and $\Delta R_{WC\_1}$ is calculated as an expression by a rotation axis a and rotation angle θ. Next, an angle obtained by multiplying the rotation angle θ by the weight $w_1$ is equated to θ'. Finally, the orientation expressed by the rotation axis a and rotation angle θ is calculated, and is multiplied by $\Delta R_{WC\_2}$. This result is $\Delta R_{WC\_2}$ when $w_1=0$ or $\Delta R_{WC\_1}$ when $w_1=1$. When $w_1$ assumes an intermediate value between 0 and 1, a correction matrix obtained by weighting and interpolating the two correction matrices can be obtained. Of course, various other calculation methods of, e.g., weighting and interpolating the two orientations, may be used.

Seventh Embodiment

In the above embodiments, the distribution condition of the detected indices is explicitly expressed by a numerical value, and the degree of influence of information other than the detected indices in the frame of interest is controlled based on that value. This embodiment is common to the above embodiments since it provides the method of controlling the degree of influence of information other than the indices according to the distribution condition of indices, except that it does not perform explicit numeric conversion of the distribution of indices.

A position/orientation measurement apparatus according to this embodiment measures the position and orientation of an image capture device by exploiting time-series images captured by the image capture device as a measurement target object. The position/orientation measurement apparatus and position/orientation measurement method according to this embodiment will be described below.

Figure 20:
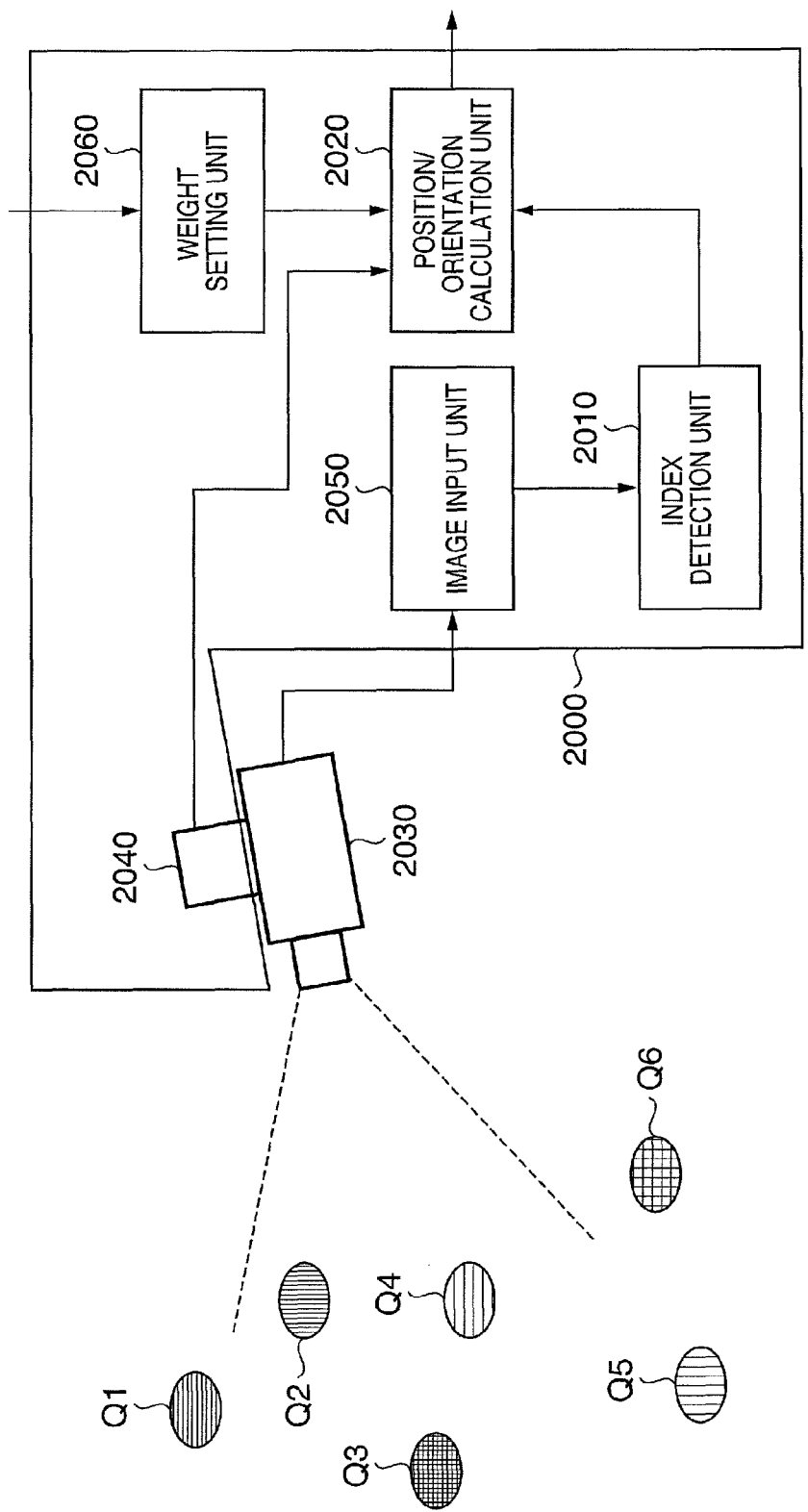
FIG. 20 is a block diagram showing the arrangement of a position/orientation measurement apparatus according to the seventh embodiment.

FIG. 20 is a block diagram showing the arrangement of the position/orientation measurement apparatus according to this embodiment. As shown in FIG. 20, a position/orientation measurement apparatus 2000 of this embodiment comprises an image input unit 2050, index detection unit 2010, position/orientation calculation unit 2020, weight setting unit 2060, and orientation sensor 2040. The apparatus 2000 is connected to an image capture device 2030 as a measurement target object. The position/orientation measurement apparatus 2000 according to this embodiment measures the position and orientation of the image capture device 2030.

A reference coordinate system (expressed by symbol W) is defined in a scene (a space to be captured by the image capture device 2030). At a plurality of positions in the scene, a plurality of indices $Q_k$ (k=1, 2, ..., K) whose positions (reference coordinates) on the reference coordinate system are known are laid out. Note that k indicates an identifier of each index. K indicates the total number of indices which are laid out. The layout of the indices $Q_k$ is preferably adjusted, so that they are always observed in a captured image when the image capture device 2030 moves within a measurement range.

An example of FIG. 20 shows a situation in which K=6, i.e., six indices $Q_1$ to $Q_6$ are laid out in the scene. For example, the indices $Q_k$ may be configured by markers which have different colors and an identical shape (a circular shape in FIG. 20), or may be configured by feature points such as natural features or the like which have different texture features. Alternatively, rectangular indices which are formed of rectangular unicolor regions each having a certain area may be used. The indices $Q_k$ may have any forms as long as the image coordinates of their projected images on a captured image are detectable, and each of these indices $Q_k$ can be identified by an arbitrary method. Also, the indices may be set by intent or may be natural-shaped ones without being set by intent.

The image capture device 2030 comprises, e.g., a video camera. An image captured by the image capture device 2030 is input to the position/orientation measurement apparatus 2000. A camera coordinate system is defined on the image capture device 2030. In the following description, the camera coordinate system is expressed by symbol C as needed. The position/orientation measurement apparatus 2000 measures the position and orientation of this camera coordinate system with respect to the reference coordinate system as those of the image capture device 2030. The camera coordinate system is a coordinate system which defines the viewpoint position of the image capture device 2030 as an origin, and the visual axis as a −Z axis, and defines two orthogonal axes perpendicular to the Z-axis as X- and Y-axes. Assume that camera internal parameters of the image capture device 2030 are known.

The orientation sensor 2040 is attached to the image capture device 2030, and measures the orientation of the image capture device 2030 on the reference coordinate system. The measurement value output from the orientation sensor 2040 is input to the position/orientation calculation unit 2020. The orientation sensor 2040 comprises, e.g., InertiaCube2 available from InterSense, U.S.A., or the like.

The image input unit 2050 converts a captured image input to the position/orientation measurement apparatus 2000 into digital data, and outputs the digital data to the index detection unit 2010.

The index detection unit 2010 receives the captured image from the image input unit 2050. The index detection unit 2010 analyzes the input image and detects (and identifies) indices captured in the image. Note that in this specification, "detected indices" mean "identified indices" unless otherwise specified. The index detection unit 2010 further outputs reference coordinates corresponding to the image coordinates of detected indices (to be also referred to as detection indices hereinafter as needed) to the position/orientation calculation unit 2020.

Note that serial numbers n (n=1, 2, ..., N) are assigned to respective detection indices, and each index detected on the image is described as $Q_{kn}$. Note that N indicates the total number of indices detected on the image. The image coordinates (actually measured value) of each detection index $Q_{kn}$ are described as $u_n$, and the image coordinates of each index $Q_k$ are described by $u_C^{Qk}$ as needed (i.e., $u_n = u_C^{Qkn}$). The reference coordinates of each index $Q_k$ as the known value are described as $x_W^{Qk}$.

The indices are detected by methods according to the types of indices to be used. For example, as in the example of FIG. 20, when the indices are configured by markers having different colors, a region corresponding to each individual marker color is detected from the captured image. Then, its barycentric position is decided as the detected coordinates of the index of interest. On the other hand, when the indices are configured by feature points having different texture features, the position of each index is detected by template matching using its template image. In this case, the template image of each individual index is held in advance as known information.

When rectangular indices are used, the image undergoes binarization processing and labeling processing to detect a label region formed by four straight lines as an index candidate Furthermore, by checking if the rectangular region of each candidate region includes a specific pattern, detection errors are eliminated. Also, an identifier of that index is acquired based on the pattern in the rectangular region. Finally, the coordinates of four vertices of the rectangular region are output as the position of the index. Note that the rectangular index detected in this way is considered as four indices individually formed by four vertices in the present specification.

The weight setting unit 2060 provides a user interface (UI) used to set a parameter which expresses the "degree of attaching an importance on the orientation measurement value" (to be referred to as "weight parameter" hereinafter as needed).

The weight setting unit 2060 receives a weight parameter via input devices such as the keyboard 1004, mouse 1005 (to be described later), and the like, and outputs it to the position/orientation calculation unit 2020.

As an expression method of the weight parameter for the operator on the UI, the value of a weighting coefficient w used inside the position/orientation calculation unit 2020 may be used intact. Alternatively, a numerical value of an exponent part of the weighting coefficient w (10 to the N-th power) may be used. Also, a normalized value (a value between 0 and 1) may be input, and may be internally mapped on the weighting coefficient w. These numerical values may be input by directly typing values from the keyboard or by selecting the values using a GUI such as a slider or the like.

When a GUI such as slider or the like is used, a parameter may be input using a conceptual expression other than a numerical value, and that input value may be internally mapped on the weighting coefficient w. As the conceptual expression, a UI that allows the operator to select the parameter from "minimum", "maximum", and several levels between them can be used. Also, a UI that allows the operator to select the parameter from "index-oriented", "sensor-oriented", and several levels between them may be used.

The position/orientation calculation unit 2020 receives the measurement value of the orientation of the image capture device 2030 from the orientation sensor 2040, and also pairs of the image coordinates $u^{Qkn}$ and reference coordinates $x_W^{Qkn}$ or detection indices $Q_{kn}$ from the index detection unit 2010. The unit 2020 calculates and outputs the position and orientation of the image capture device 2030 based on the input information. Details of the processing of the position/orientation calculation unit 2020 will be described later using the flowchart.

Note that at least some of the image input unit 2050, index detection unit 2010, weight setting unit 2060, and position/orientation calculation unit 2020 may be implemented as independent devices, or may be implemented as software programs that implement the functions by installing the software programs in one or a plurality of computers and executing them by a CPU of each computer. In this embodiment, assume that the respective units (image input unit 2050, index detection unit 2010, weight setting unit 2060, and position/orientation calculation unit 2020) are implemented by software and are installed in a single computer. The basic arrangement of the computer that implements the functions of the respective units by executing software is the same as that in the first embodiment, and a repetitive description thereof will be avoided.

Figure 21:
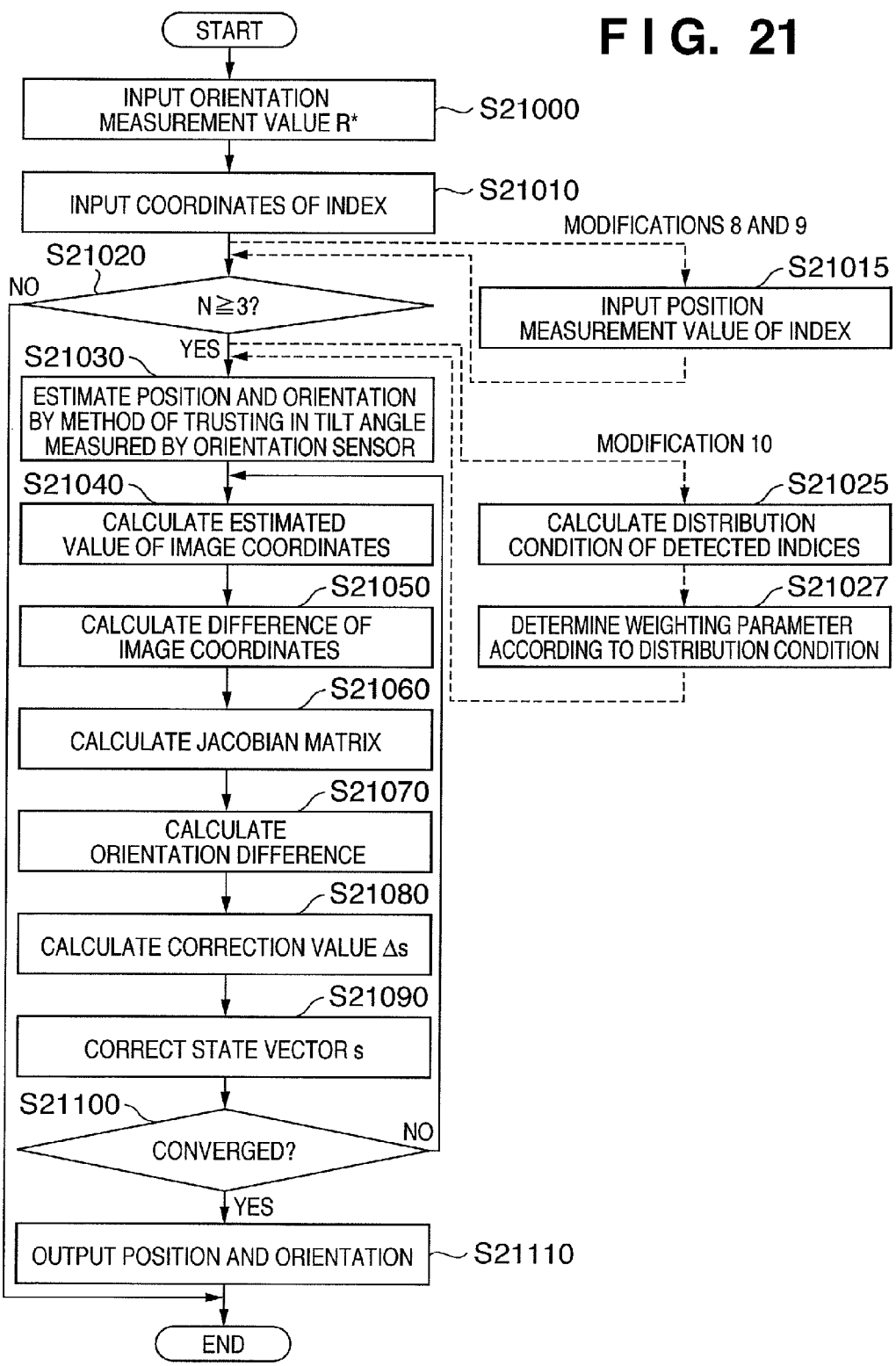
FIG. 21 is a flowchart for explaining the processing for calculating the position and orientation of an image capture device 130 according to the seventh embodiment.

FIG. 21 is a flowchart showing the processing sequence of the position/orientation calculation unit 2020. This processing sequence is implemented when the CPU 1001 executes a program that implements the function of the position/orientation calculation unit 2020 in this embodiment. Assume that the program code that implements the sequence according to the flowchart of FIG. 21 has already been loaded from, e.g., the external storage device 1007 onto the RAM 1002 prior to execution of the following processing.

In the following description, the position of the image capture device 2030 is internally expressed by a three-valued vector $t = [x \ y \ z]^T$. Also, the orientation of the image capture device 2030 is expressed by a three-valued vector $\omega = [\xi \ \psi \ \zeta]^T$, which defines the rotation angle by the size of the vector and the rotation axis direction by the direction of the vector. The position and orientation of the image capture device 2030 are expressed by a six-valued vector $s = [t^T \ \omega^T]^T = [x \ y \ z \ \xi \ \psi \ \zeta]^T$.

Note that information of the orientation is converted into a 3×3 rotation matrix R that attains rotation conversion from the camera coordinate system into the reference coordinate system when it is used. ω and R can be uniquely converted to each other. Conversion from ω to R can be attained by formula (3). Since the conversion method from R to ω is known to those who are skilled in the art, a detailed description thereof will not be given.

In step S21000, the position/orientation calculation unit 2020 receives an orientation measurement value $\omega^*_\tau (= [\xi^*_\tau \ \psi^*_\tau \ \zeta^*_\tau]^T)$ of the image capture device 2030 at time τ from the orientation sensor 2040.

In step S21010, the position/orientation calculation unit 2020 receives pairs of the image coordinates $u_n (= u_C^{Qkn})$ and reference coordinates $x_W^{Qkn}$ of indices $Q_{kn}$ (n=1, 2, ..., N) detected from a captured image at time τ from the index detection unit 2010.

The position/orientation calculation unit 2020 checks in step S21020 if the input information of the detection indices is enough to estimate the position and orientation, and branches the processes according to the checking result. More specifically, if the number of input indices is three or more, the process advances to step S21030; otherwise, the processing ends.

In step S21030, the position/orientation calculation unit 2020 handles two parameters associated with tilt angles of the orientation measurement value as prescribed values, and estimates the remaining four parameters using the information of the respective detection indices. Note that the remaining four parameters include the azimuth and position of the image capture device 2030. Since this processing can be implemented by the method disclosed in, e.g., non-patent reference 6, a detailed explanation thereof will not be given. In the following description, the position and orientation obtained in step S21030 are described as an initial value $s_0 = [t_0^T \ \omega_0^T]^T = [x_0 \ y_0 \ z_0 \ \xi_0 \ \psi_0 \ \zeta_0]^T$ of the position and orientation in the subsequent processing. Note that the difference between the obtained orientation $\omega_0$ and the orientation measurement value $\omega^*_\tau$ is only an azimuth component. That is, $\omega_0$ can be considered as an orientation obtained by correcting an azimuth drift error of $\omega^*_\tau$.

In step S21040, the position/orientation calculation unit 2020 calculates an estimated value (theoretical value) $u_n^* (= u_C^{Qkn*})$ of image coordinates of each index $Q_{kn}$. $u_n^*$ is calculated based on an observation equation of an index defined by s, i.e., formula (19) that calculates image coordinates from the reference coordinates $x_W^{Qkn}$ of the index. In formula (19), the estimated value $u_n^*$ of the image coordinates is described as $u^{Qkn*}$.

In step S21050, the position/orientation calculation unit 2020 calculates a difference (re-projection error) $\Delta u_n$ between the estimated value $u_n^*$ and actually measured value $u_n$ of the image coordinates of each index $Q_{kn}$ by:

$$\Delta u_n = u_n - u_n^* \tag{34}$$

In step S21060, the position/orientation calculation unit 2020 calculates an image Jacobian $J_{us}^{Qkn} (= \partial u / \partial s)$ for s with respect to each index $Q_{kn}$. Note that the image Jacobian is a Jacobian matrix of 2 rows×3 columns having, as respective elements, solutions obtained by partially differentiating the observation equation given by formula (19) by the elements of s. More specifically, the unit 2020 calculates a Jacobian matrix $J_{ux}^{Qkn}$ ($=\partial u/\partial x$), and a Jacobian matrix $J_{xs}^{Qkn}$ ($=\partial x/\partial s$), and then calculates $J_{us}^{Qkn}$ by:

$$J_{us}^{Q_{k_n}} = J_{ux}^{Q_{k_n}} \cdot J_{xs}^{Q_{k_n}} \quad (35)$$

where $J_{ux}^{Qkn}$ is a Jacobian matrix of 2 rows×3 columns having, as respective elements, solutions obtained by partially differentiating the right-hand side of formula (6) by respective elements of the camera coordinates $x_C^{Qkn}$. $J_{xs}^{Qkn}$ is a Jacobian matrix of 3 rows×6 columns having, as respective elements, solutions obtained by partially differentiating the right-hand side of formula (20) by respective elements of the vector s.

In step S21070, the position/orientation calculation unit 2020 calculates a difference $\Delta\omega$ ($=[\Delta\xi\ \Delta\omega\ \Delta\zeta]^T$) of the current orientation estimated value $\omega$ with respect to the initial value $\omega_0$ of the orientation obtained in step S21030 using:

$$\Delta\omega = \omega_0 - \omega \quad (36)$$

In step S21080, the position/orientation calculation unit 2020 calculates a correction value $\Delta s$ of s based on the re-projection errors $\Delta u_n$, image Jacobians $J_{us}^{Qkn}$, and orientation difference $\Delta\omega$ calculated in the above steps. More specifically, the unit 2020 generates a matrix $\Theta$ formed by arranging the Jacobians, and an error vector U, and calculates $\Delta s$ by:

$$\Delta s = (\Theta'\Theta)^{-1}\Theta'U \quad (37)$$

where the matrix $\Theta$ is a matrix generated by adding Jacobians associated with s of orientation parameters $\xi$, $\psi$, and $\zeta$ to a matrix formed by arranging the Jacobians $J_{us}^{Qkn}$ vertically. $\Theta$ is defined by:

$$\Theta = \begin{bmatrix} J_{us}^{Q_{k_1}} \\ \vdots \\ J_{us}^{Q_{k_N}} \\ 0 & 0 & 0 & 1 & 0 & 0 \\ 0 & 0 & 0 & 0 & 1 & 0 \\ 0 & 0 & 0 & 0 & 0 & 1 \end{bmatrix} \quad (38)$$

Also, $\Theta'$ is a matrix generated by adding weighting coefficients w to a transposed matrix of $\Theta$, and is defined by:

$$\Theta' = \begin{bmatrix} J_{us}^{Q_{k_1}^T} & \cdots & J_{us}^{Q_{k_N}^T} & \begin{matrix} 0 & 0 & 0 \\ 0 & 0 & 0 \\ 0 & 0 & 0 \\ w & 0 & 0 \\ 0 & w & 0 \\ 0 & 0 & w \end{matrix} \end{bmatrix} \quad (39)$$

where w is a weighting coefficient used to balance between the image information and orientation measurement value, and represents the "degree of attaching an importance on the orientation measurement value". The value w determines a reference value of the influence of the orientation measurement value on the position and orientation to be finally obtained. The value of the weighting coefficient w is given by the weight setting unit 2060. Note that the actual influence of the orientation measurement value is passively changed according to the information amount obtained from indices.

On the other hand, the error vector U is a (2N+3)-dimensional vector formed by arranging terms of $\Delta u_n$ and $\Delta\omega$, and is defined by:

$$U = \begin{bmatrix} \Delta u_1 \\ \vdots \\ \Delta u_N \\ \Delta\xi \\ \Delta\psi \\ \Delta\zeta \end{bmatrix} \quad (40)$$

The meaning of $\Delta s$ calculated by formulas (37) to (40) will be described below. The aim of formula (36) is to calculate $\Delta s$ so as to reduce the error vector U intuitively. For example, in the method of calculating the position and orientation of the camera using only information of the indices like the processing in step S15070 of the fifth embodiment, the error vector U is defined by:

$$U = \begin{bmatrix} \Delta u_1 \\ \vdots \\ \Delta u_N \end{bmatrix} \quad (41)$$

This formula intends to minimizing the re-projection errors of indices using them as evaluation criteria.

On the other hand, the error vector U defined by formula (40) is formed by adding the orientation difference $\Delta\omega$ to the error vector U defined by formula (41). This indicates that the position/orientation calculation unit 2020 according to this embodiment uses the difference between the re-projection errors of indices and the orientation measurement value as an evaluation criterion. Intuitively, the unit 2020 calculates $\Delta s$, which minimizes the re-projection errors of indices in consideration of the constrained condition that the orientation must not be excessively different from the orientation measurement value (strictly speaking, the value obtained by correcting the azimuth error of the orientation measurement value).

In step S21090, the position/orientation calculation unit 2020 corrects s according to formula (12) using the correction value $\Delta s$ calculated in step S21080, and sets the obtained value as a new estimated value of s.

The position/orientation calculation unit 2020 checks in step S21100 if the calculations are converged using some criteria as to whether or not the error vector U is smaller than a predetermined threshold or whether or not the correction value $\Delta s$ is smaller than a predetermined threshold. If the calculations are not converged, the unit 2020 executes the processing in step S21040 and subsequent steps again using s after correction. On the other hand, if it is determined that the calculations are converged, the process advances to step S21110.

In step S21110, the position/orientation calculation unit 2020 outputs s obtained by the processing until step S21100 as the estimated value of the position and orientation of the image capture device 2030. Note that the output form of the position and orientation is not limited to s itself. For example, the orientation may be converted into a rotation matrix, rotation axis vector and rotation angle, Euler angle, quaternion, or the like when it is output. Also, the position and orientation may be expressed by a 4×4 position/orientation conversion matrix or its inverse matrix based on the homogeneous coordinate expression. The position and orientation of the image capture device 2030 on the reference coordinate system may be calculated and output. Of course, combinations of these output forms may be simultaneously output.

With the aforementioned processing, the position and orientation of the image capture device 2030 are calculated. Upon calculating the position and orientation of the image capture device 2030 for continuously captured time-series images, the aforementioned processing can be executed for each input frame.

According to the position/orientation measurement apparatus of this embodiment, the position and orientation, which minimize the re-projection errors of indices in consideration of the constrained condition that the orientation must not be excessively different from the orientation measurement value (strictly speaking, the value obtained by correcting the azimuth error of the orientation measurement value), are calculated.

According to the position/orientation measurement apparatus of this embodiment, when information obtained from the image is insufficient, since the influence of the terms of detection indices becomes small, the position and orientation that attach an importance on the orientation measurement value can be obtained. As a result, the effect of stabilizing solutions as in the method of limiting unknown parameters while trusting in the orientation measurement value can be obtained. On the other hand, when sufficient image information is obtained, the influence of the terms of detection indices becomes large. As a result, high-precision solutions can be obtained without being influenced by errors of the orientation measurement value.

That is, according to the position/orientation measurement apparatus of this embodiment, information obtained from the image and orientation sensor can be efficiently used, and measurements which are excellent in both stability and precision can be implemented compared to the conventional method.

Eighth Embodiment

A position measurement apparatus according to this embodiment measures the position and orientation of an arbitrary measurement target object using a plurality of image capture devices and indices laid out on the environment side, and a plurality of image capture devices, indices, and an orientation sensor set on the measurement target object. The position measurement apparatus and position measurement method according to this embodiment will be described below.

Figure 22:
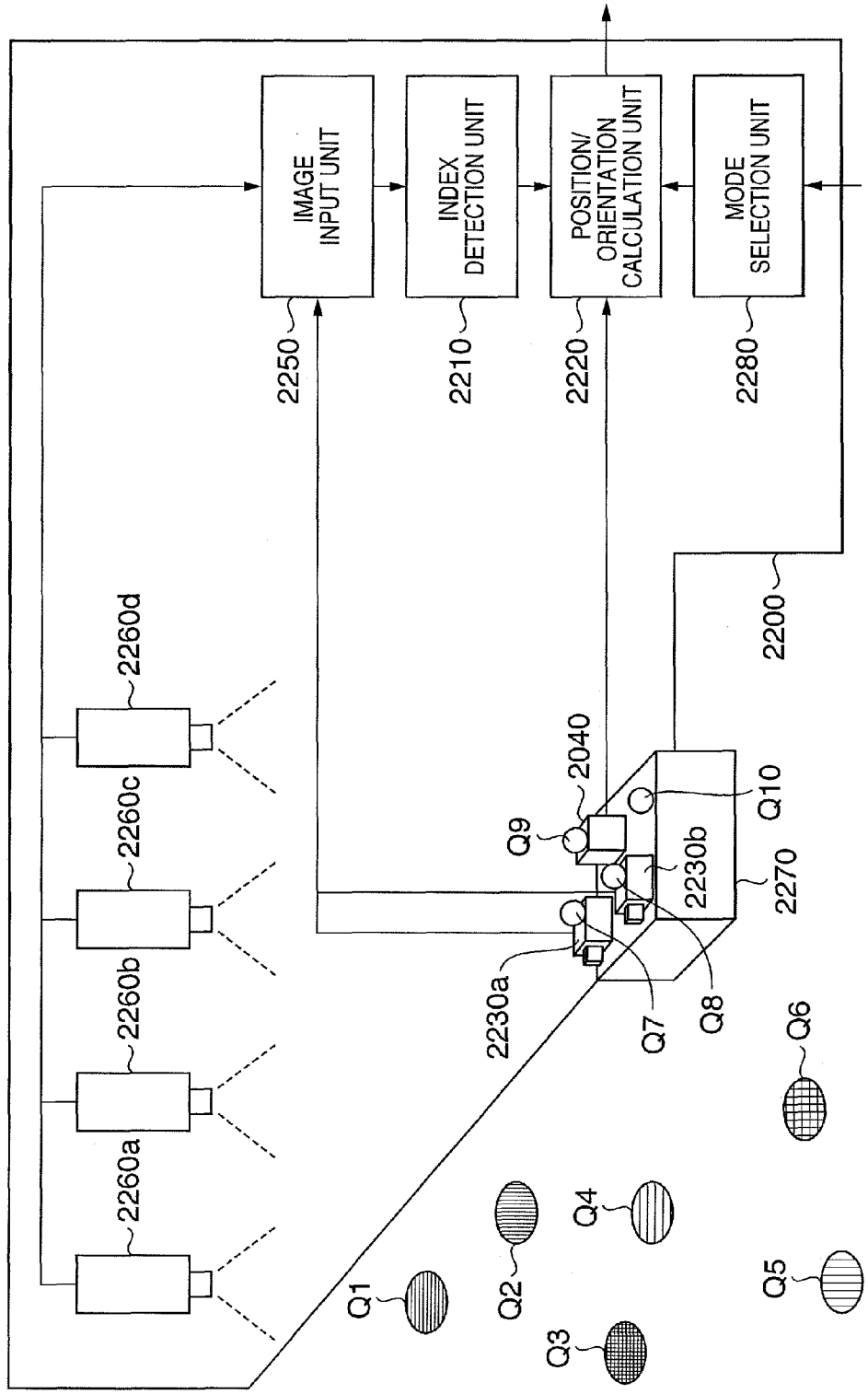
FIG. 22 is a block diagram showing the arrangement of a position/orientation measurement apparatus according to the eighth embodiment.

FIG. 22 is a block diagram showing the arrangement of a position/orientation measurement apparatus according to this embodiment. As shown in FIG. 22, a position/orientation measurement apparatus 2200 according to this embodiment comprises an image input unit 2250, index detection unit 2210, position/orientation calculation unit 2220, mode selection unit 2280, one or more subjective viewpoint cameras 2230, one or more objective viewpoint cameras 2260, and orientation sensor 2040. The position/orientation measurement apparatus 2200 is connected to an object 2270 to be measured. The position/orientation measurement apparatus 2200 according to this embodiment measures the position and orientation of the object 2270 to be measured on the reference coordinate system.

In a scene, one or more indices $Q_k$ (k=1, 2, ..., $K_W$) whose positions on the reference coordinate system are known are laid out as in the first embodiment. In the following description, these indices laid out on the environment side will be referred to as subjective viewpoint indices as needed. The subjective viewpoint indices may adopt every forms as long as the image coordinates of their projected images on the captured image are detectable, and each of the indices is identifiable by an arbitrary method, as in the first embodiment. In FIG. 22, $K_W$=6, i.e., six subjective viewpoint indices are laid out.

On the object 2270 to be measured, one or more indices $Q_{KW+k}$ (k=1, ..., $K_O$) whose positions (object coordinates) on an object coordinate system are known are laid out. In the following description, these indices laid out on the object side will be referred to as objective viewpoint indices as needed. The objective viewpoint indices may adopt every forms as long as the image coordinates of their projected images on the captured image are detectable, and each of the indices is identifiable by an arbitrary method, as in the subjective viewpoint indices. In FIG. 22, $K_O$=4, i.e., four objective viewpoint indices are laid out. Note that the objective viewpoint indices may not be directly laid out on the object 2270 to be measured. The objective viewpoint indices may be laid out on, e.g., the subjective viewpoint cameras 2230 or orientation sensor 2040.

Subjective viewpoint cameras 2230a and 2230b (to be also collectively referred to as subjective viewpoint cameras 2230) are, for example, video cameras. The subjective viewpoint cameras 2230 are laid out on the object 2270 to be measured. Images (subjective viewpoint images) captured by the subjective viewpoint cameras 2230 are input to the image input unit 2250. Assume that camera internal parameters of the subjective viewpoint cameras 2230 and their positions and orientations on object coordinate systems are known. The layout of the subjective viewpoint indices and subjective viewpoint cameras 2230 are preferably adjusted so that subjective viewpoint indices can always be observed in a captured image when the object 2270 to be measured moves within a measurement range. In FIG. 22, the two subjective viewpoint cameras 2230a and 2230b are laid out. In the following description, subjective viewpoint camera coordinate systems respectively defined by the subjective viewpoint cameras 2230 are expressed by symbols $C_1$ and $C_2$, as needed.

Objective viewpoint cameras 2260a to 2260d (to be also collectively referred to as objective viewpoint cameras 2260) are, for example, video cameras. The objective viewpoint cameras 2260 are set at positions that close in the measurement range, so as to capture an image of the object 2270 to be measured. Images (objective viewpoint images) captured by the objective viewpoint cameras 2260 are input to the image input unit 2250. Assume that camera internal parameters of the objective viewpoint cameras 2260 and their positions and orientations on the reference coordinate system are known. The layouts of the objective viewpoint indices and objective viewpoint cameras 2260 are preferably adjusted so that objective viewpoint indices can always be observed in a captured image when the object 2270 to be measured moves within a measurement range. In FIG. 22, the four objective viewpoint cameras 2260a, 2260b, 2260c, and 2260d are laid out. In the following description, objective viewpoint camera coordinate systems respectively defined by the objective viewpoint cameras 2260a to 2260d are expressed by symbols $B_1$, $B_2$, $B_3$, and $B_4$.

The orientation sensor 2040 is laid out on the object 2270 to be measured. The orientation sensor 2040 measures the orientation of the object 2270 to be measured, and outputs it to the position/orientation calculation unit 2220.

The image input unit 2250 converts a captured image input to the position/orientation measurement apparatus 2000 into digital data, and outputs the digital data to the index detection unit 2210.

The index detection unit 2210 receives the captured images from the image input unit 2250. The index detection unit 2210 analyzes each input image and detects (and identifies) indices captured in each image. The index detection unit 2210 outputs, for each individual detection index, a set of an identifier of the camera which detects that index, an actually measured value of image coordinates, and corresponding 3D coordinates to the position/orientation calculation unit 2220. Note that the 3D coordinates mean reference coordinates when the index is a subjective viewpoint index, or object coordinates when the index is an objective viewpoint index. Note that the index detection method is not particularly limited as in the first embodiment, and a detailed description thereof will not be given.

In the following description, note that serial numbers n (n=1, 2, ..., N) are assigned to respective detection indices, and each index detected on each image is described as $Q_{kn}$. Note that N indicates the total number of indices detected on each image. Also, $N = \Sigma N_d$, and $N_d$ represents the number of indices detected on the captured image of each camera. Furthermore, d represents the identifier of the camera (d=$C_1$, $C_2$, $B_1$, $B_2$, $B_3$, and $B_4$). The image coordinates of each index $Q_{kn}$ are described as $u_n$, the identifier of the camera which captures that index is described by $d_n$, and the image coordinates of each index $Q_k$ detected by the camera with the identifier d are described by $u_d^{Qk}$ (i.e., $u_n = u_{d_n}^{Qkn}$). When each index $Q_k$ is a subjective viewpoint index, its reference coordinates as the known value are described as $x_W^{Qk}$. Likewise, when each index $Q_k$ is an objective viewpoint index, its object coordinates as the known value are described by $x_O^{Qk}$.

The mode selection unit 2280 allows the user to select an algorithm used in the position/orientation calculation unit 2220 via input devices such as the keyboard 1004, mouse 1005, and the like. For example, the unit 2280 allows the user to select one of an "index information-oriented" mode, "orientation sensor measurement value-oriented" mode, and "intermediate" mode between them using GUIs such as radio buttons and the like. The mode selection unit 2280 outputs information indicating the selected mode to the position/orientation calculation unit 2220.

The position/orientation calculation unit 2220 receives the orientation measurement value of the object 2270 to be measured from the orientation sensor 2040. Also, the unit 2220 receives, for each detection index, a set of the identifier $d_n$ of the camera that detects the index, the actually measured value $u_n$ of the image coordinates, and the corresponding 3D coordinates ($x_W^{Qkn}$ or $x_O^{Qkn}$) from the index detection unit 2210. The unit 2220 calculates and outputs the position and orientation of the object 2270 to be measured based on the input information. Details of the processing of the position/orientation calculation unit 2220 will be described later using the flowchart.

Note that at least some of the image input unit 2250, index detection unit 2210, mode selection unit 2280, and position/orientation calculation unit 2220 may be implemented as independent devices, or may be implemented as software programs that implement the functions by installing the software programs in one or a plurality of computers and executing them by a CPU of each computer. In this embodiment, assume that the respective units (image input unit 2250, index detection unit 2210, mode selection unit 2280, and position/orientation calculation unit 2220) are implemented by software and are installed in a single computer. The basic arrangement of the computer that implements the functions of the respective units by executing software is the same as that in the first embodiment, and a repetitive description thereof will be avoided.

Figure 23:
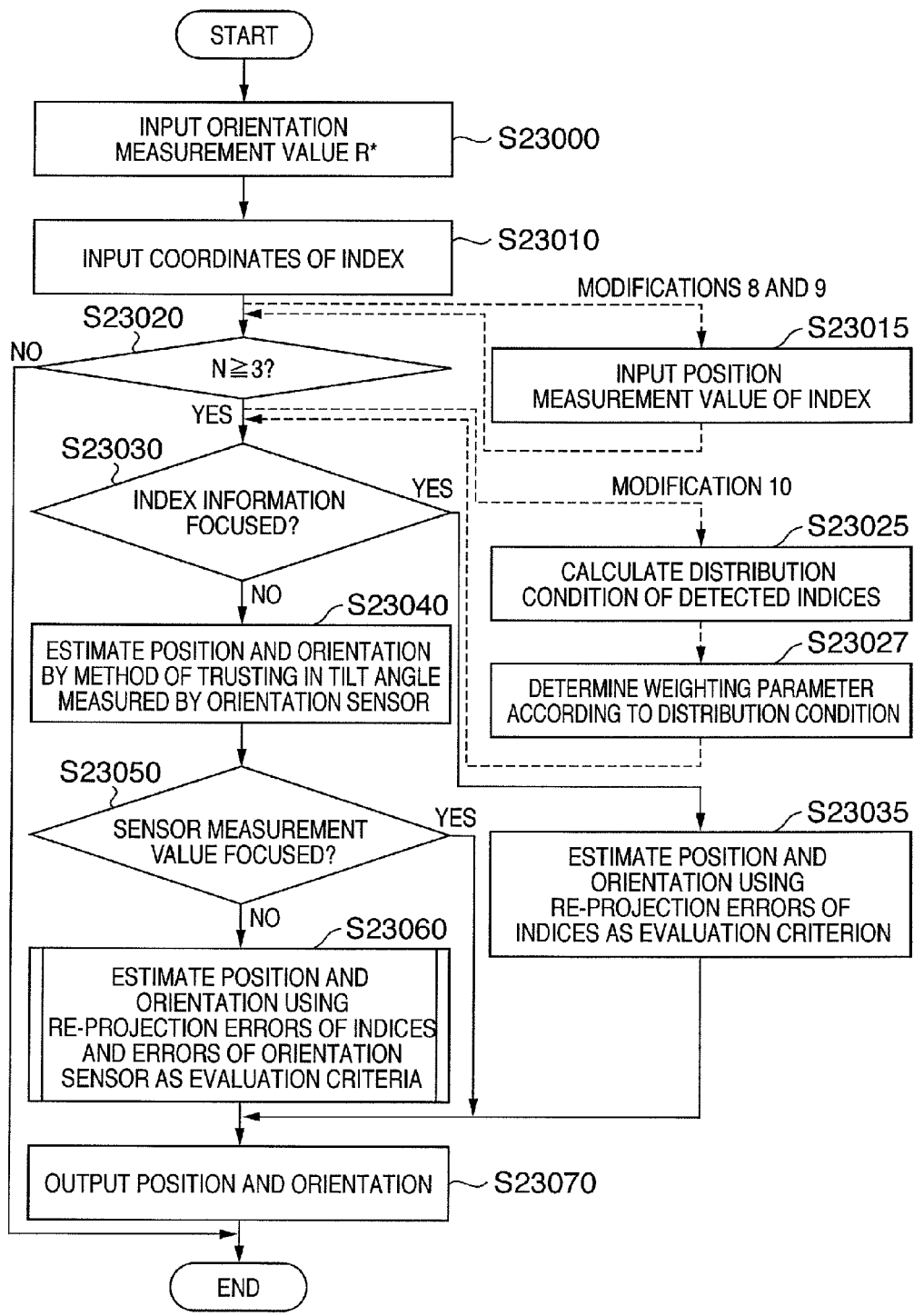
FIG. 23 is a flowchart for explaining the processing for calculating the position and orientation of an object 2270 to be measured according to the eighth embodiment.

FIG. 23 is a flowchart showing the processing sequence of the position/orientation calculation unit 2220. This processing sequence is implemented when the CPU 1001 executes a program that implements the function of the position/orientation calculation unit 2220 in this embodiment. Assume that the program code that implements the sequence according to the flowchart of FIG. 23 has already been loaded from, e.g., the external storage device 1007 onto the RAM 1002 prior to execution of the following processing.

In the following description, the position and orientation of the object 2270 to be measured are internally expressed by three-valued vectors $t=[x\ y\ z]^T$ and $\omega=[\xi\ \psi\ \zeta]^T$, as in the first embodiment. Also, the position and orientation of the object 2270 to be measured are expressed by a six-valued vector $s=[t^T\ \omega^T]^T=[x\ y\ z\ \xi\ \psi\ \zeta]^T$.

In step S23000, the position/orientation calculation unit 2220 receives an orientation measurement value $\omega^*_\tau (=[\xi^*_\tau\ \psi^*_\tau\ \zeta^*_\tau]^T)$ of the object 2270 to be measured at time $\tau$ from the orientation sensor 2040.

In step S23010, the position/orientation calculation unit 2220 receives information of detection indices $Q_{kn}$ detected from respective captured images at time $\tau$ from the index detection unit 2210. More specifically, the unit 2220 receives sets of identifiers $d_n$ of the cameras that detect the corresponding indices, actually measured values $u_n$ of the image coordinates, and corresponding 3D coordinates ($x_W^{Qkn}$ or $x_O^{Qkn}$).

The position/orientation calculation unit 2220 checks in step S23020 if the input information of the detection indices is enough to estimate the position and orientation, and branches the processes according to the checking result. More specifically, if the substantive total number of input indices is three or more (N≧3), the process advances to step S23030; otherwise, the processing ends. Note that the substantive total number means the total number which is counted when an identical index is detected in a plurality of images, and it is determined that one index is detected.

The position/orientation calculation unit 2220 checks in step S23020 if the mode selected by the mode selection unit 2280 is the "index information-oriented" mode. If the "index information-oriented" mode is selected, the process advances to step S23035; otherwise, the process advances to step S23040.

In step S23035, the position/orientation calculation unit 2220 estimates the position and orientation of the object 2270 to be measured by the method of using re-projection errors of respective detection indices as evaluation criteria. As the method of calculating the position and orientation of an object while minimizing the re-projection errors of detection indices obtained from the subjective and objective viewpoint cameras, since a method based on nonlinear optimization calculations is disclosed in non-patent reference 1 and the like, a detailed description thereof will not be given. Furthermore, the process advances to step S23070.

In step S23040, the position/orientation calculation unit 2220 handles two parameters associated with the tilt angles of the orientation measurement values as prescribed values, and estimates the remaining four parameters using the information of the respective detection indices. Note that the remaining four parameters include the azimuth and position of the object 2270 to be measured. Since this processing can be implemented by the method disclosed in, e.g., non-patent reference 1, a detailed explanation thereof will not be given. In the following description, the position and orientation obtained in step S23040 are described as an initial value $s_0=[t_0^T \omega_0^T]^T=[x_0\ y_0\ z_0\ \xi_0\ \psi_0\ \zeta_0]^T$ of the position and orientation in the subsequent processing.

The position/orientation calculation unit 2220 checks in step S23050 if the mode selected by the mode selection unit 2280 is the "orientation sensor measurement value-oriented" mode. If the "orientation sensor measurement value-oriented" mode is selected, it is determined that the position and orientation obtained in step S23040 are output intact, and the process jumps to step S23070. Otherwise, the process advances to step S23060.

In step S23060, the position/orientation calculation unit 2220 estimates the position and orientation of the object 2270 to be measured by the method using, as evaluation criteria, the re-projection errors of respective detection indices and the difference between the estimated orientation parameters and orientation measurement value. Details of the processing in step S23060 will be described later using the flowchart.

In step S23070, the position/orientation calculation unit 2220 outputs the position and orientation of the object 2270 to be measured obtained by the aforementioned processing.

Figure 24:
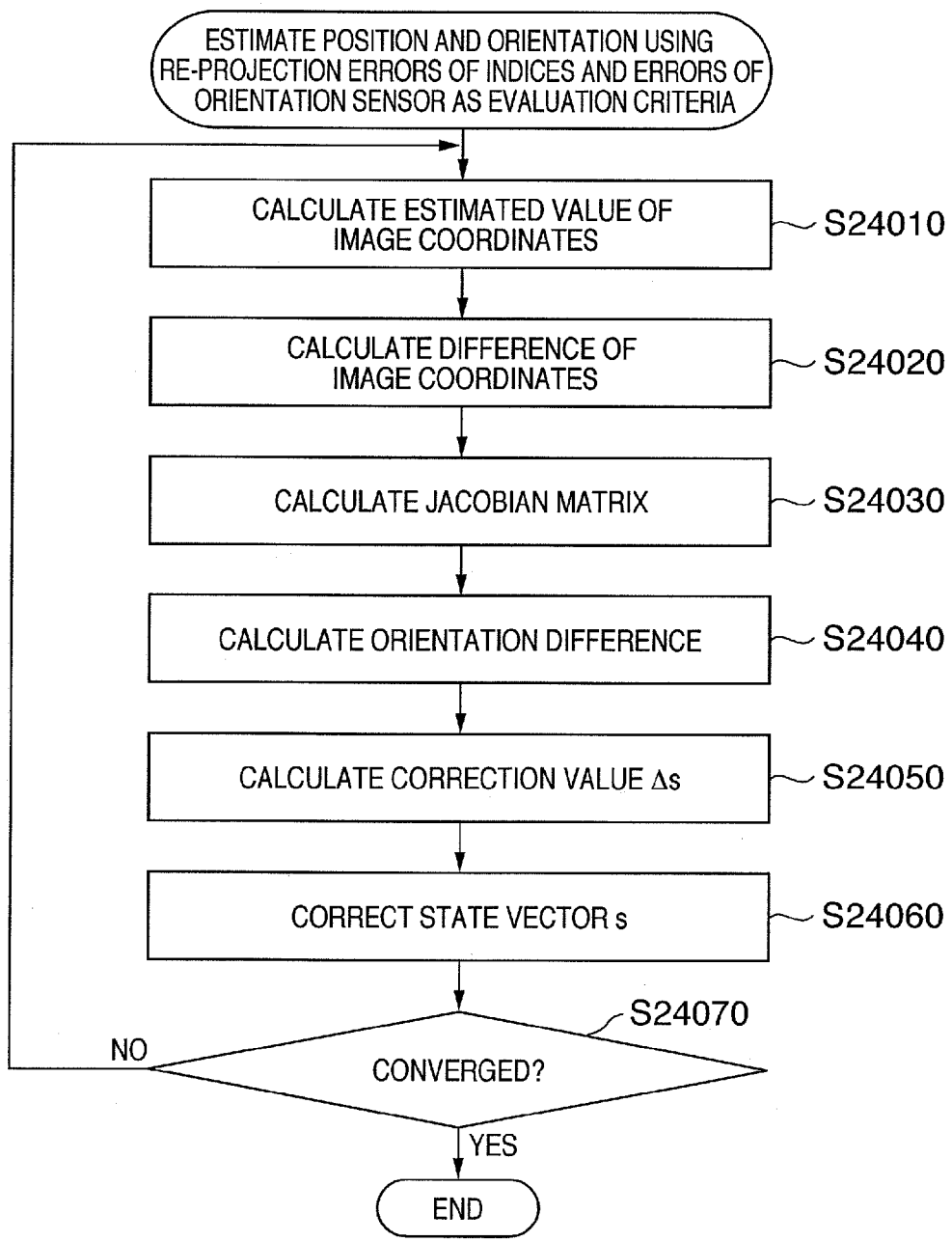
FIG. 24 is a flowchart for explaining the estimation processing of the position and orientation using re-projection errors of indices and errors of an orientation sensor as evaluation criteria.

Details of the processing in step S23060 will be described below using the flowchart of FIG. 24.

In step S24010, the position/orientation calculation unit 2220 calculates an estimated value (theoretical value) $u_n^*$ of the image coordinates of each individual index $Q_{kn}$. If the index $Q_{kn}$ is a subjective viewpoint index, $u_n$ is calculated based on an observation equation based on the subjective viewpoint camera index $C_i$, as described by:

$$u_n^* = u_{C_i}^{Q_{kn}*} = F_{C_i}(x_W^{Q_{kn}}, s) \qquad (42)$$

The observation equation $F_{C_i}()$ is configured by formula (43) for calculating camera coordinates $x_{C_i}^{Q_{kn}}$ of the index of interest from $x_W^{Q_{kn}}$ and $s$, and formula (44) for calculating image coordinates $u_n^*$ from $x_{C_i}^{Q_{kn}}$:

$$x_{C_i}^{Q_{kn}} = \begin{bmatrix} x_{C_i}^{Q_{kn}} \\ y_{C_i}^{Q_{kn}} \\ z_{C_i}^{Q_{kn}} \end{bmatrix} = R_{C_iO} \cdot R(\omega)^{-1}(x_W^{Q_{kn}} - t) + t_{C_iO} \qquad (43)$$

$$u_n^* = u_{C_i}^{Q_{kn}*} = \begin{bmatrix} u_x^{Q_{kn}*} & u_y^{Q_{kn}*} \end{bmatrix}^T = \begin{bmatrix} -f_x^{C_i} \frac{x_{C_i}^{Q_{kn}}}{z_{C_i}^{Q_{kn}}} & -f_y^{C_i} \frac{y_{C_i}^{Q_{kn}}}{z_{C_i}^{Q_{kn}}} \end{bmatrix}^T \qquad (44)$$

where $f_x^{C_i}$ and $f_y^{C_i}$ are focal lengths of the subjective viewpoint camera index $C_i$ respectively in the x- and y-axis directions. $R_{C_iO}$ is a matrix for converting the orientation from the object coordinate system O onto the subjective viewpoint camera coordinate system $C_i$, and $t_{C_iO}$ is a vector for converting the position between the identical coordinate systems. Assume that all of these values are held as known values in advance in correspondence with the subjective viewpoint cameras 2230a and 2230b.

On the other hand, if the index $Q_{kn}$ is an objective viewpoint, $u_n^*$ is calculated based on an observation equation based on an objective viewpoint camera $B_i$, as described by:

$$u_n^* = u_{B_i}^{Q_{kn}*} = F_{B_i}(x_O^{Q_{kn}}, s) \qquad (45)$$

The observation equation $F_{B_i}()$ is configured by formula (46) for calculating world coordinates $x_W^{Q_{kn}}$ of the index of interest based on $x_O^{Q_{kn}}$ and $s$, formula (47) for calculating coordinates $x_{B_i}^{Q_{kn}}$ on each objective viewpoint camera coordinate system, and formula (48) for calculating image coordinates $u_n^*$ from $x_{B_i}^{Q_{kn}}$:

$$x_W^{Q_{kn}} = \begin{bmatrix} x_W^{Q_{kn}} \\ y_W^{Q_{kn}} \\ z_W^{Q_{kn}} \end{bmatrix} = R(\omega) \cdot x_O^{Q_{kn}} + t \qquad (46)$$

$$x_{B_i}^{Q_{kn}} = \begin{bmatrix} x_{B_i}^{Q_{kn}} \\ y_{B_i}^{Q_{kn}} \\ z_{B_i}^{Q_{kn}} \end{bmatrix} = R_{WB_i}^{-1}(x_W^{Q_{kn}} - t_{WB_i}) \qquad (47)$$

$$u_n^* = u_{B_i}^{Q_{kn}*} = \begin{bmatrix} u_x^{Q_{kn}*} & u_y^{Q_{kn}*} \end{bmatrix}^T = \begin{bmatrix} -f_x^{B_i} \frac{x_{B_i}^{Q_{kn}}}{z_{B_i}^{Q_{kn}}} & -f_y^{B_i} \frac{y_{B_i}^{Q_{kn}}}{z_{B_i}^{Q_{kn}}} \end{bmatrix}^T \qquad (48)$$

In step S24020, the position/orientation calculation unit 2220 calculates a difference (re-projection error) $\Delta u_n$ between the estimated value $u_n^*$ and actually measured value $u_n$ of the image coordinates of each index $Q_{kn}$ using formula (34).

In step S24030, the position/orientation calculation unit 2220 calculates an image Jacobian $J_{us}^{Q_{kn}}$ ($=\partial u/\partial s$) for s with respect to each index $Q_{kn}$. Note that the image Jacobian is a Jacobian matrix of 2 rows×6 columns having, as respective elements, solutions obtained by partially differentiating the observation equation given by formula (42) or (45) by the elements of s. The image Jacobian of the observation equation $F_{C_i}()$ can be obtained in the same manner as formula (35). On the other hand, an image Jacobian of the observation equation $F_{B_i}()$ is calculated by calculating a Jacobian matrix $J_{uxB}^{Q_{kn}}$ ($=\partial u/\partial x_B$), a Jacobian matrix $J_{xBxW}^{Q_{kn}}$ ($=\partial x_B/\partial x_W$), and a Jacobian matrix $J_{xWs}^{Q_{kn}}$ ($=\partial x_W/\partial s$), and using:

$$J_{us}^{Q_{kn}} = J_{uxB}^{Q_{kn}} \cdot J_{xBxW}^{Q_{kn}} \cdot J_{xWs}^{Q_{kn}} \qquad (49)$$

where $J_{uxB}^{Q_{kn}}$ is a Jacobian matrix of 2 rows×3 columns having, as elements, solutions obtained by partially differentiating the right-hand side of formula (48) by elements of the objective viewpoint camera coordinates $x_{Bi}^{Q_{kn}}$. $J_{xBxW}^{Q_{kn}}$ is a Jacobian matrix of 3 rows×3 columns having, as elements, solutions obtained by partially differentiating the right-hand side of formula (47) by elements of the world coordinates $x_W^{Q_{kn}}$. $J_{xWs}^{Wkn}$ is a Jacobian matrix of 3 rows×6 columns having, as elements, solutions obtained by partially differentiating the right-hand side of formula (46) by elements of the state vector s.

In step S24040, the position/orientation calculation unit 2220 calculates a difference $\Delta\omega$ ($[\Delta\xi\ \Delta\psi\ \Delta\zeta]^T$) of the current orientation estimated value $\omega$ with respect to the initial value $\omega_0$ of the orientation obtained in step S23040 using formula (35).

In step S24050, the position/orientation calculation unit 2220 calculates a correction value $\Delta s$ of s based on the re-projection errors $\Delta u_n$, image Jacobians $J_{us}^{Q_{kn}}$, and orientation difference $\Delta\omega$ calculated in the above steps. More specifically, the unit 2220 generates a matrix $\Theta$ formed by arranging the Jacobians, and an error vector U, and calculates $\Delta s$ using formula (37). Note that the definitions of the matrices $\Theta$, $\Theta'$, and U are the same as in formulas (38), (39), and (40). However, unlike in the seventh embodiment, each matrix include all pieces of information associated with detection indices $Q^{kn}$ by different cameras (subjective and objective viewpoint cameras). In this embodiment, as the weighting coefficient w, an appropriate value calculated in advance is set as a fixed value.

In step S24060, the position/orientation calculation unit 2220 corrects s according to formula (12) using the correction value Δs calculated in step S24050, and sets the obtained value as a new estimated value of s.

The position/orientation calculation unit 2220 checks in step S24070 if the calculations are converged using some criteria as to whether or not the error vector U is smaller than a predetermined threshold or whether or not the correction value Δs is smaller than a predetermined threshold. If the calculations are not converged, the unit 2220 executes the processing in step S21040 and subsequent steps again using s after correction. On the other hand, if it is determined that the calculations are converged, the process advances to step S24010.

With the aforementioned processing, the position and orientation of the object 2270 to be measured are calculated. According to the position/orientation measurement apparatus of this embodiment, the position and orientation, which minimize the re-projection errors of indices by respective cameras in consideration of the constrained condition that the orientation must not be excessively different from the orientation measurement value (strictly speaking, the value obtained by correcting the azimuth error of the orientation measurement value), are calculated.

In this embodiment, both the subjective viewpoint cameras 2230 and objective viewpoint cameras 2260 are used. However, the configuration of the cameras used to measure the position and orientation of the object 2270 to be measured is not limited to this. For example, only the subjective viewpoint cameras 2230 may be used, or only the objective viewpoint cameras 2260 may be used.

Note that upon aiming at calculations of the positions and orientations of the subjective viewpoint cameras 2230, the same method as in this embodiment can be used. In this case, (one of) the subjective viewpoint cameras 2230 themselves can be considered as the object 2270 to be measured.

In this embodiment, the predetermined weighting coefficient is used as a fixed value. However, as in the seventh embodiment, the weight setting unit 2060 may be provided to allow the operator to set the weighting coefficient w. Also, it may be devised to set the weight setting unit 2060 and mode selection unit 2280 using a single UI. For example, as input means of the weight setting unit 2060, a UI which numerically inputs a normalized parameter (e.g., a value between 0 and 1) will be examined. In this case, if the input parameter is 0, the "index information-oriented" mode may be set; if it is 1, the "orientation sensor measurement value-oriented" mode may be set; and if it is an intermediate value between 0 and 1, the "intermediate" mode may be set. Only in case of the "intermediate" mode, the input parameter may be converted into the weighting coefficient w when it is used.

Modifications of Seventh and Eighth Embodiments (Modification 8)

In the seventh and eighth embodiments, the position and orientation of a measurement target object (the image capture device 2030 or the object 2270 to be measured) are estimated in consideration of the constrained condition that the orientation must not be excessively different from the orientation measurement value by the orientation sensor 2040. However, the application range of the technical idea described in the above embodiments is not limited to consideration of only the constrained condition that the orientation must not be excessively different from the orientation measurement value.

For example, upon calculating the position and orientation of the measurement target object for continuously captured time-series images, continuity with the previous frame may be considered. In consideration of the constrained condition that the position and orientation must not be excessively different from those calculated in the previous frame, the position and orientation which are excellent in continuity between frames can be obtained.

The processing steps of this modification are nearly the same as those in the seventh and eighth embodiments. The differences from the seventh embodiment will be described below with reference to FIG. 21. Basically, only differences from the seventh embodiment are that an estimation result $(s_{\tau-1})$ of the position and orientation is held in step S21110, and the condition of constraint with respect to the previous frame is considered in the calculation step of the correction value (step S21080). Note that the eighth embodiment can also be similarly modified.

In this modification, the matrix Θ (formula (38)), Θ' (formula (39)), and the error vector U (formula (40)) are respectively modified as:

$$\Theta = \begin{bmatrix} J_{us}^{Q_{k_1}} \\ \vdots \\ J_{us}^{Q_{k_N}} \\ 0 & 0 & 0 & 1 & 0 & 0 \\ 0 & 0 & 0 & 0 & 1 & 0 \\ 0 & 0 & 0 & 0 & 0 & 1 \\ 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix} \quad (50)$$

$$\Theta' = \begin{bmatrix} J_{us}^{Q_{k_1}^T} & \ldots & J_{us}^{Q_{k_N}^T} & 0 & 0 & 0 & w_2 & 0 & 0 & 0 & 0 & 0 \\ & & & 0 & 0 & 0 & 0 & w_2 & 0 & 0 & 0 & 0 \\ & & & 0 & 0 & 0 & 0 & 0 & w_2 & 0 & 0 & 0 \\ & & & w_1 & 0 & 0 & 0 & 0 & 0 & w_3 & 0 & 0 \\ & & & 0 & w_1 & 0 & 0 & 0 & 0 & 0 & w_3 & 0 \\ & & & 0 & 0 & w_1 & 0 & 0 & 0 & 0 & 0 & w_3 \end{bmatrix} \quad (51)$$

$$U = \begin{bmatrix} \Delta u_1 \\ \vdots \\ \Delta u_N \\ \Delta \xi \\ \Delta \psi \\ \Delta \zeta \\ (s_{\tau-1} - s)^T \end{bmatrix} \quad (52)$$

That is, six evaluation values that represent the condition of restraint for the result of the previous frame are newly added. Note that $w_1$, $w_2$, and $w_3$ are weight parameters which define the influence of the orientation measurement value, that of the position of the previous frame, and that of the orientation of the previous frame. In this modification, assume that appropriate values are set in advance for the respective weight parameters. These values may be independently set in accordance with the degrees of attaching importance on the reliability of the sensor and the continuity between frames, or the same value may be set in a simple way. Different values may be set for respective parameters. As in the above embodiments, the user may adjust values via the weight setting unit 2060.

With the above processing, the constrained condition that the orientation must not be excessively different from the orientation measurement value, and the constrained condition that the position and orientation must not be excessively different from the estimation result of the previous frame can be considered at the same time. With the ranges of these conditions of constraint, the position and orientation which minimize the re-projection errors of indices can be calculated.

Note that $s_{\tau-1}$ as the estimation result of the position and orientation in the previous frame may not always be those estimated in step S21110. For example, the estimated values of the position and orientation of the measurement target object in the current frame may be used based on the history of movement of the measurement target object. In this case, prediction may be done by simple linear approximation based on the velocity or angular velocity of the measurement target object, or by various other methods.

In this modification, all the position and orientation parameters (six degrees of freedom) in the previous frame are used as the constrained condition. However, all the parameters need not always be used as the constrained condition. For example, as for the orientation, only the measurement value of the orientation sensor may be constrained. In this case, terms associated with the orientation of the previous frames can be excluded from the matrix $\Theta$ (formula (50)), $\Theta'$ (formula (51)), and the error vector U (formula (52)). Likewise, terms associated with the position of the previous frame may be omitted. Also, only an arbitrary combination of the position and orientation parameters in the previous frame may be constrained.

(Modification 9)

A case will be examined below wherein a position sensor is further set on a measurement target object (image capture device 2030 or object 2270 to be measured) in a form to be added to the seventh and eighth embodiments. In this case, both the orientation measurement value obtained from the orientation sensor and the position measurement value obtained from the position sensor can be used as the constrained condition.

The processing steps of this modification are nearly the same as those in the seventh and eighth embodiments. The differences from the seventh embodiment will be described below with reference to FIG. 21. Basically, only differences from the seventh embodiment are that a step of inputting the position measurement value by the position sensor is inserted immediately after step S21010 as step S21015, and the constraint for the position measurement value is considered in the calculation step of the correction value (step S21080). Note that the eighth embodiment can also be similarly modified (see FIG. 23).

In step S21015 as a newly added step, the position/orientation calculation unit 2020 receives a position measurement value $t^*_\tau$ of the image capture device 2030 at time $\tau$ from the position sensor.

In step S21030, the position/orientation calculation unit 2020 calculates an initial value $s_0$ of the position and orientation. In this modification, the unit 2020 equates the orientation obtained by multiplying the orientation measurement value $\omega^*_\tau$ input in step S21010 by the error correction value $\Delta\omega_{\tau-1}$ of the orientation sensor estimated by the process of the previous frame to an initial value $\omega_0$ of the orientation. Also, the unit 2020 calculates an initial value $t_0$ of the position using the position measurement value $t^*_\tau$ input in step S21015 and using:

$$t_0 = t_\tau^* - R(\omega_0) \cdot x_O \tag{53}$$

where $x_O$ indicates the coordinates of a measurement point of the position sensor on the coordinate system of the measurement target object as a known value. More specifically, formula (53) represents a conversion equation from the measurement value (which represents the position of the measurement point) of the position sensor to that of the measurement target object.

In this modification, the equation (formula (36)) for calculating the difference between the initial value of the orientation and the current estimated orientation in step S21070 is modified to include both the position and orientation as:

$$\Delta s = s_0 - s \tag{54}$$

Also, the matrix $\Theta$ (formula (38)), $\Theta$ (formula (39)), and the error vector U (formula (40)) to be calculated in step S21080 are respectively modified as:

$$\Theta = \begin{bmatrix} J_{us}^{Q_{k_1}} \\ \vdots \\ J_{us}^{Q_{k_N}} \\ 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix} \tag{55}$$

$$\Theta' = \begin{bmatrix} J_{us}^{Q_{k_1}^T} & \cdots & J_{us}^{Q_{k_N}^T} & w_1 & 0 & 0 & 0 & 0 & 0 \\ & & & 0 & w_1 & 0 & 0 & 0 & 0 \\ & & & 0 & 0 & w_1 & 0 & 0 & 0 \\ & & & 0 & 0 & 0 & w_2 & 0 & 0 \\ & & & 0 & 0 & 0 & 0 & w_2 & 0 \\ & & & 0 & 0 & 0 & 0 & 0 & w_2 \end{bmatrix} \tag{56}$$

$$U = \begin{bmatrix} \Delta u_1 \\ \vdots \\ \Delta u_N \\ \Delta s^T \end{bmatrix} \tag{57}$$

More specifically, a new condition of constraint for the measurement value of the position is added. Note that $w_1$ and $w_2$ are weight parameters that respectively define the influence of the position measurement value and that of the orientation measurement value. In this modification, appropriate values are set in advance for $w_1$ and $w_2$. These values may be independently set in accordance with the reliabilities of the sensors, or the same value may be set in a simple way. Different values may be set for respective parameters. As in the above embodiments, the user may adjust values via the weight setting unit 2060.

In step S21110, the position/orientation calculation unit 2020 outputs the estimated position and orientation. At this time, the unit 2020 calculates a difference between the orientation measurement value $\omega^*_\tau$ and the finally obtained orientation $\omega$, and holds it as an error correction value $\Delta\omega_\tau$.

With the above processing, the position and orientation which minimize the re-projection errors of indices can be calculated in consideration of the constrained condition that the position and orientation must not be excessively different from the position measurement value and orientation measurement value, respectively.

According to the position/orientation measurement apparatus of this modification, when information obtained from the image is insufficient, since the influence of the terms of indices becomes small, the position and orientation that attach an importance on the measurement values of the respective sensors can be obtained. On the other hand, when sufficient image information is obtained, the influence of the terms of indices becomes large. As a result, high-precision solutions can be obtained without being influenced by errors of the respective sensor measurement values.

In this modification as well, continuity between frames can be considered. In this case, as in Modification 8, the constraint for the position and orientation calculated in the previous frame can be added to the calculation step of the correction value. More specifically, terms for evaluating the position and orientation parameters of the previous frame can be added to the matrix $\Theta$ (formula (55)), $\Theta'$ (formula (56)), and the error vector U (formula (57)). Note that arbitrary combinations of all the 12 constrained conditions (six for the previous frame and six for the sensor measurement values) may be selected and used.

(Modification 10)

In each of the seventh and eighth embodiments and Modifications 8 and 9, the parameters of the six degrees of freedom of the position and orientation of the measurement target object (image capture device 2030 or object 2270 to be measured) are estimated. However, the application range of the technical idea described in the above embodiments is not limited to the case in which the parameters to be estimated are the six values of the position and orientation.

For example, a case will be examined below wherein a position sensor with higher precision is set on the measurement target object. In this case, as a known method, an approach that calculates only orientation parameters of the measurement target object from image information while the position obtained from the position sensor is set as a known value can be adopted. This approach can be implemented by nonlinear optimization processing having only the orientation parameters of the measurement target object as unknowns, as described in, e.g., the sixth embodiment of patent reference 4. Upon adopting such approach as well, the technical idea described in the above embodiments can be applied intact. That is, the orientation parameters of the measurement target object can be estimated while considering the condition of constraint for the orientation measurement value of the orientation sensor 2040.

The processing steps of this modification are nearly the same as those in the seventh and eighth embodiments. The differences from the seventh embodiment will be described below with reference to FIG. 21. Basically, only differences from the seventh embodiment are that a step of inputting the position measurement value by the position sensor (step S21015) is added, and only the orientation $\omega$ of the measurement target object becomes unknown parameters. Note that the eighth embodiment can also be similarly modified.

The processes in steps S21015, S21030, and S21110 are the same as those in Modification 8.

In this modification, the position of the measurement target object is handled as a known value, and unknown parameters are only $\omega$ that represents the orientation. In step S21060, the position/orientation calculation unit 2020 calculates image Jacobians for only respective parameters of $\omega$. Furthermore, the matrix $\Theta$ (formula (38)) and $\Theta'$ (formula (39)) in step S21080 are respectively modified according to changes of the unknown parameters as:

$$\Theta = \begin{bmatrix} J_{us}^{\omega_{k_1}} \\ \vdots \\ J_{us}^{\omega_{k_N}} \\ 1 & 0 & 0 \\ 0 & 1 & 0 \\ 0 & 0 & 1 \end{bmatrix} \tag{58}$$

$$\Theta' = \begin{bmatrix} J_{us}^{\omega_{k_1}^T} & \ldots & J_{us}^{\omega_{k_N}^T} & \begin{matrix} w & 0 & 0 \\ 0 & w & 0 \\ 0 & 0 & w \end{matrix} \end{bmatrix} \tag{59}$$

With the above processing, even when the position and orientation of the six degrees of freedom are not used as unknown parameters, the orientation that minimizes the re-projection errors of indices can be calculated in consideration of the constrained condition that the orientation must not be excessively different from the measurement value of the orientation sensor.

In this modification as well, continuity between frames can be considered. In this case, as in Modification 8, the constraint for the orientation calculated in the previous frame can be added to the calculation step of the correction value. More specifically, terms for evaluating the orientation parameters of the previous frame can be added to the matrix $\Theta$ (formula (58)), $\Theta'$ (formula (59)), and the error vector U (formula (40)).

(Modification 11)

In each of the seventh and eighth embodiments and Modifications 8 to 10, the weight parameter w is a fixed value which is determined in advance, or is a value set by the user via the weight setting unit 2060. However, the setting methods of the weight parameter value are not limited to such specific methods. In this modification, a weight parameter is actively adjusted according to the distribution of detected indices, thus more positively achieving the effect of adjusting the influence of indices according to the information amount obtained from the indices.

The processing steps of this modification are nearly the same as those in the seventh and eighth embodiments. The differences from the seventh embodiment will be described below with reference to FIG. 21. Basically, only differences from the seventh embodiment are that a step of calculating the distribution condition of the detected indices (step S21025) and a step of determining the weight parameter w according to the calculated distribution condition of the detected indices (step S21027) are added. Note that the eighth embodiment can also be similarly modified.

In step S21025 as a newly added step, the position/orientation calculation unit 2020 calculates a convex hull which includes the image coordinates of all the detected indices. This processing is the same as that in step S17050 in the sixth embodiment.

Next, in step S21027 as a newly added step, the position/orientation calculation unit 2020 determines a weight adjusting parameter $w_0$ according to an area A of the convex hull calculated in step S21025 by:

$$w_0 = \begin{cases} 1 & A \leq T^{min} \\ \dfrac{T^{max} - A}{T^{max} - T^{min}} & T^{min} < A < T^{max} \\ 0 & T^{max} \leq A \end{cases} \tag{60}$$

where $T^{min}$ and $T^{max}$ are parameters required to normalize the area of the convex hull, and appropriate values are set in advance for these parameters. $w_0$ assumes a value normalized to a range between 0 and 1. If the distribution of indices is sufficient, $w_0$ assumes 0; if it is insufficient, $w_0$ assumes a value close to 1. The position/orientation calculation unit 2020 calculates the weighting coefficient w used in the calculation step of the correction value Δs based on the obtained $w_0$ by:

$$w = w_0 \cdot w' \tag{61}$$

where w' is the weighting coefficient set by the weight setting unit 2060. That is, the weighting coefficient set by the weight setting unit 2060 is increased/decreased according to the distribution of indices. Note that w' need not be set using the weight setting unit 2060, and an appropriate value may be set in advance.

With the above processing, if the distribution of indices is sufficient, the value of the weighting coefficient w becomes small, and the influence of the constrained condition that the orientation must not be excessively different from the orientation measurement value is reduced. For this reason, the position and orientation can be measured by fully exploiting the detected image information without being constrained by errors of the sensor.

On the other hand, if the distribution of indices is insufficient, the value of the weighting coefficient w becomes large, and the influence of the constrained condition that the orientation must not be excessively different from the orientation measurement value is enhanced. For this reason, even when the information amount of the detected image information is insufficient, the estimation result can be obtained without any departure from the orientation obtained from the sensor.

As described above, according to this modification as well, the effect of controlling the influence of information obtained from the image according to the distribution of indices can be obtained.

Note that in this modification, it is not indispensable to use the area of the convex hull formed by indices as the measure of the distribution of indices. As in Modification 4 of the embodiments, various other measures may be used. Also, the deviation of the weighting coefficient w need not always be linear with respect to the measure of the distribution of indices, and an arbitrary value which monotonically increases in two periods can be used as in the sixth embodiment.

Even when the constrained conditions that the position and orientation must not be excessively different from those calculated in the previous frame are simultaneously taken into consideration as in Modification 8, the weighting coefficient can be adjusted according to the distribution of indices. In this case, $w_1'$, $w_2'$, and $w_3'$ are held as base weighting coefficients, and are multiplied by $w_0$ to obtain weighting coefficients, i.e., $w_1$, $w_2$, and $w_3$ to be actually applied. Also, upon exploiting the constraint by the position sensor as in Modification 9, the weighting coefficient can be similarly adjusted according to the distribution of indices.

Note that the effect of adjusting the influence of the detected image information according to the distribution of indices can also be obtained when arbitrary combinations of the aforementioned 12 constrained conditions (six for the previous frame and six for the sensor measurement values) are used. For example, a configuration that uses only the constrained condition that the position and orientation must not be excessively different from the estimation result (at least one parameter thereof) of the previous frame without using any sensor may be adopted.

In this case, if the distribution of indices is sufficient, the value of the weighting coefficient w becomes small and then the influence of the constrained condition that the position and orientation must not be excessively different from the estimated values in the previous frame is reduced. For this reason, the position and orientation can be measured by fully exploiting the detected image information without being influenced by the constraint that may apply smoothing between frames.

On the other hand, if the distribution of indices is insufficient, the value of the weighting coefficient w becomes large, and then the influence of the constrained condition that the position and orientation must not be excessively different from the estimated values in the previous frame is enhanced. For this reason, even when the information amount of the detected image information is insufficient, unnatural jitter between frames can be avoided, and the stable position and orientation can be obtained.

(Modification 12)

Each of the seventh and eighth embodiments and Modifications 8 to 11 calculates the correction value Ds using the method expressed by formula (37). Also, the estimated value s is updated by replacing s by s+Ds. However, the method of calculating s based on the matrix Θ, matrix Θ', and error vector U is not limited to such specific method. For example, s may be calculated using, e.g., an LM method (Levenberg-Marquardt method) as a known iterative solving method of a nonlinear equation. Or a statistical method such as M-estimation or the like as a known robust estimation method may be combined. Hence, the gist of the invention does not impair even when any other numerical calculation methods are applied.

(Modification 13)

In each of the above embodiments and modifications, the orientation is expressed by three values described by formula (3), and is used in the optimization calculation step. However, the expression of the orientation used in the optimization calculation step is not limited to this. For example, the orientation may be expressed by three values using an Euler angle, and the optimization calculations may be made using this Euler angle as an unknown parameter. In this case, a formula for calculating 3×3 rotation matrix R from the Euler angle is obtained in place of formula (3), and may be built in each individual observation equation. Upon imposing the constraint based on the orientation measurement value or the orientation estimated value of the previous frame, each individual parameter may be similarly changed to the Euler angle. Of course, even when other parameter expression methods are used as unknown parameters, they can be similarly solved, and the parameter expression methods do not pose any essential problem. Since the estimation method of the camera position and orientation based on the non-linear optimization calculations using the Euler angle is disclosed in, e.g., non-patent reference 3, a detailed description thereof will not be given.

The objects of the present invention are also achieved by supplying a storage medium (or recording medium), which records a program code of a software program that can implement the functions of the aforementioned embodiments to the system or apparatus, and reading out and executing the program code stored in the storage medium by a computer (or a CPU or MPU) of the system or apparatus. In this case, the program code itself read out from the storage medium implements the functions of the aforementioned embodiments, and the storage medium which stores the program code constitutes the present invention. Also, the present invention includes a case wherein the functions of the aforementioned embodiments are implemented not only by executing the readout program code by the computer but also by some or all of actual processes executed by an operating system (OS) running on the computer on the basis of an instruction of the program code.

Moreover, the present invention also includes a case wherein the functions of the aforementioned embodiments are implemented by some or all of actual processes executed by a CPU or the like arranged in a function expansion card or a function expansion unit, which is inserted in or connected to the computer, after the program code read out from the storage medium is written in a memory of the expansion card or unit.

When the present invention is applied to the aforementioned storage medium, that storage medium preferably stores the program codes corresponding to the aforementioned flowcharts.

The present invention is not limited to the above embodiments and various changes and modifications can be made within the spirit and scope of the present invention. Therefore to apprise the public of the scope of the present invention, the following claims are made.

This application claims the benefit of Japanese Patent Application No. 2005-029827, filed Feb. 4, 2005, and Japanese Patent Application No. 2006-026177, filed Feb. 2, 2006, which are hereby incorporated by reference herein in their entirety.

The invention claimed is:

1. A position/orientation measurement method for using at least one processor to measure a position and an orientation of a measurement target object, characterized by comprising:
   a captured image acquisition step of acquiring a captured image;
   an index detection step of detecting indices included in the captured image;
   a distribution range calculation step of calculating an evaluation value associated with a distribution range of the indices detected in the index detection step; and
   a position/orientation calculation step of calculating the position and the orientation of the measurement target object using information associated with image coordinates of the detected indices, and the evaluation value associated with the distribution range,
   wherein in the position/orientation calculation step, a first position/orientation and a second position/orientation of the measurement target
   object are calculated using different methods by exploiting the information associated with the image coordinates of the indices detected in the index detection step.

2. The position/orientation measurement method according to claim 1, characterized in that the measurement target object is an image capture device, and
   the captured image is an image captured by the image capture device.

3. The position/orientation measurement method according to claim 1, characterized in that the captured image is an image captured by an image capture device, which has a known relative positional relationship with the measurement target object.

4. The position/orientation measurement method according to claim 1, characterized in that the captured image is an image captured by an image capture device which captures the measurement target object.

5. The position/orientation measurement method according to claim 1, characterized in that in the position/orientation calculation step, one of a plurality of calculation methods is selected in accordance with the evaluation value of the distribution range.

6. The position/orientation measurement method according to claim 1, characterized in that the evaluation value associated with the distribution range is an evaluation value associated with a three-dimensional distribution range of the detected indices.

7. The position/orientation measurement method according to claim 1, characterized in that the evaluation value associated with the distribution range is an evaluation value associated with a distribution range of the detected indices on the captured image.

8. The position/orientation measurement method according to claim 1, characterized in that in the position/orientation calculation step, an influence of information associated with the image coordinates of the detected indices on calculations of the position and the orientation of the measurement target object is controlled in accordance with the evaluation value associated with the distribution range of the indices.

9. The position/orientation measurement method according to claim 1, wherein in the position/orientation calculation step,
   the position and the orientation of the measurement target object are calculated from the first position/orientation and the second position/orientation based on the evaluation value associated with the distribution range of the indices calculated in the distribution range calculation step.

10. The position/orientation measurement method according to claim 1, characterized by further comprising a measurement result acquisition step of acquiring a measurement result of at least one of parameters which represent the position and the orientation of the measurement target object from a measurement unit,
    wherein in the position/orientation calculation step, the position and the orientation of the measurement target object are calculated by controlling an influence of the information associated with the image coordinates of the indices and an influence of the measurement result based on the evaluation value associated with the distribution range of the indices.

11. The position/orientation measurement method according to claim 10, characterized in that the measurement unit is a position sensor and/or an orientation sensor attached to the measurement target object.

12. The position/orientation measurement method according to claim 1, characterized by further comprising a holding step of holding at least one of parameters which represent the position and the orientation of the measurement target object, and are calculated from a captured image of a previous frame,
    wherein in the position/orientation calculation step,
    the position and the orientation of the measurement target object are calculated by controlling an influence of the information associated with the image coordinates of the indices and an influence of the parameters which represent the position and the orientation of the measurement target object, and are calculated from the captured image of the previous frame, based on the evaluation value associated with the distribution range of the indices.

13. The position/orientation measurement method according to claim 1, characterized by further comprising an orientation measurement value acquisition step of acquiring an orientation measurement value from an orientation sensor which measures the orientation of the measurement target object, wherein in the position/orientation calculation step, an influence of the information associated with the image coordinates of the indices and an influence of the orientation measurement value are set according to a size of an information amount of the information associated with the image coordinates of the indices, and a position and an orientation of the measurement target object are calculated.

14. The position/orientation measurement method according to claim 1, characterized by further comprising an orientation measurement value acquisition step of acquiring an orientation measurement value from an orientation sensor which measures the orientation of the measurement target object, wherein in the position/orientation calculation step, the position and the orientation of the measurement target object are calculated using, as evaluation criteria, both a difference between actually measured values of the information associated with the image coordinates of the indices detected in the index detection step and theoretical values of the information associated with the image coordinates, which are calculated based on estimated values of the position and the orientation of the measurement target object, and a difference between the estimated values and at least some parameters of the orientation measurement value.

15. A position/orientation measurement method for measuring a position and an orientation of a measurement target object, characterized by comprising:
an orientation measurement value input step of inputting an orientation measurement value from an orientation sensor attached to the measurement target object;
a captured image acquisition step of acquiring a captured image;
an index detection step of detecting indices included in the captured image; and
a position/orientation calculation step of calculating the position and the orientation of the measurement target using information associated with image coordinates of the detected indices, and the orientation measurement value,
wherein in the position/orientation calculation step,
the position and the orientation of the image capture device are calculated using, as evaluation criteria, a difference between actually measured values of the information associated with the image coordinates of the detected indices and theoretical values of the information associated with the image coordinates of the detected indices, which are calculated based on estimated values of the position and the orientation of the image capture device, and
a difference between the estimated values and at least some parameters of the orientation measurement value.

16. The position/orientation measurement method according to claim 15, characterized in that the measurement target object is an image capture device, and the captured image is an image captured by the image capture device.

17. The position/orientation measurement method according to claim 15, characterized in that the captured image is an image captured by an image capture device, which has a known relative positional relationship with the measurement target object.

18. The position/orientation measurement method according to claim 15, characterized in that the captured image is an image captured by an image capture device which captures the measurement target object.

19. The position/orientation measurement method according to claim 15, characterized by further comprising a holding step of holding at least one of parameters which represent the position and the orientation of the measurement target object, and are calculated from a captured image of a previous frame, wherein in the position/orientation calculation step,
the position and the orientation of the measurement target object are calculated using, as evaluation criteria, the difference between the actually measured values of the information associated with the image coordinates of the indices and the theoretical values of the information associated with the image coordinates of the detected indices, which are calculated based on the actually measured values of the information associated with the image coordinates of the detected indices and the estimated values of the position and the orientation of the measurement target object,
a difference between the estimated values and at last one of parameters which represent a previous position and orientation held by the holding means; and
a difference between the estimated values and at least one of parameters which represent a position and an orientation and are calculated from the captured image of the previous frame.

20. A position/orientation measurement method for measuring a position and an orientation of an image capture device as a measurement target object, characterized by comprising:
an orientation measurement value input step of inputting an orientation measurement value from an orientation sensor attached to the image capture device;
an image input step of inputting an image captured by the image capture device;
an index detection step of detecting indices included in the captured image;
a weight setting step of setting a weight input by an operator; and
a position/orientation calculation step of calculating the position and the orientation of the image capture device using information associated with image coordinates of the indices detected in the index detection step, and the orientation measurement value,
wherein in the position/orientation calculation step, the position and the orientation of the image capture device are calculated by changing influences of the information associated with the image coordinates of the indices and the orientation measurement value in accordance with the weight set in the weight setting step.

21. The position/orientation measurement method according to claim 20, characterized in that in the position/orientation calculation step, at least one of a difference between actually measured values of information associated with the image coordinates of the indices and theoretical values of the information associated with the image coordinates which are calculated based on the estimated values of the position and the orientation of the image capture device, and a difference between the estimated values and at least some parameters of the orientation measurement value is weighted according to the weight set in the weight setting step, and the position and the orientation of the image capture device are calculated using the difference as an evaluation criterion.

22. A position/orientation measurement method for measuring a position and an orientation of an image capture device as a measurement target object, characterized by comprising:

an orientation measurement value input step of inputting an orientation measurement value from an orientation sensor attached to the image capture device;

an image input step of inputting an image captured by the image capture device;

an index detection step of detecting indices included in the captured image;

a mode selection step of selecting one of a first mode focused on the information associated with the image coordinates of the indices, a second mode focused on the orientation measurement value, and a third mode as an intermediate mode between the first mode and the second mode; and a position/orientation calculation step of calculating the position and the orientation of the image capture device by applying a method according to the mode selected in the mode selection step using information associated with image coordinates of the indices detected in the index detection step, and the orientation measurement value.

23. The position/orientation measurement method according to claim 22, characterized in that in the position/orientation calculation step, when the first mode is selected in the mode selection step, the position and the orientation of the image capture device are calculated based on the information associated with the image coordinates of the indices detected in the index detection step without using the orientation measurement value as a prescribed value or an evaluation criterion, when the third mode is selected in the mode selection step, the position and the orientation of the image capture device are calculated using, as evaluation criteria, both a difference between actually measured values of the information associated with the image coordinates of the indices detected in the index detection step and theoretical values of the information associated with the image coordinates which are calculated based on estimated values of the position and the orientation of the image capture device, and a difference between the estimated values and at least some parameters of the orientation measurement value, and when the second mode is selected in the mode selection step, unknown parameters of the position and the orientation of the image capture device are calculated based on the information associated with the image coordinates of the indices detected in the index detection step while setting at least some parameters of the orientation measurement value as prescribed values.

24. A position/orientation measurement apparatus for measuring a position and an orientation of a measurement target object, characterized by comprising:

captured image acquisition means for acquiring a captured image;

index detection means for detecting indices included in the captured image;

distribution range calculation means for calculating an evaluation value associated with a distribution range of the indices detected by said index detection means; and position/orientation calculation means for calculating the position and the orientation of the measurement target object using information associated with image coordinates of the detected indices, and the evaluation value associated with the distribution range, wherein the position/orientation calculation means calculates a first position/orientation and a second position/orientation of the measurement target object by using different methods by exploiting the information associated with the image coordinates of the indices detected by the index detection means.

25. A position/orientation measurement apparatus for measuring a position and an orientation of a measurement target object, characterized by comprising:

orientation measurement value input means for inputting an orientation measurement value from an orientation sensor attached to the measurement target object;

captured image acquisition means for acquiring a captured image;

index detection means for detecting indices included in the captured image; and position/orientation calculation means for calculating the position and the orientation of the measurement target object using information associated with image coordinates of the detected indices, and the orientation measurement value, wherein said position/orientation calculation means calculates the position and the orientation of the image capture device using, as evaluation criteria, a difference between actually measured values of the information associated with the image coordinates of the detected indices and theoretical values of the information associated with the image coordinates of the detected indices, which are calculated based on estimated values of the position and the orientation of the image capture device, and a difference between the estimated values and at least some parameters of the orientation measurement value.

26. A computer-readable medium storing commands for causing a computer to perform a position/orientation measurement method for measuring a position and an orientation of a measurement target object, the method comprising:

a captured image acquisition step of acquiring a captured image;

an index detection step of detecting indices included in the captured image;

a distribution range calculation step of calculating an evaluation value associated with a distribution range of the indices detected in the index detection step; and a position/orientation calculation step of calculating the position and the orientation of the measurement target object using information associated with image coordinates of the detected indices, and the evaluation value associated with the distribution range, wherein in the position/orientation calculation step, a first position/orientation and a second position/orientation of the measurement target object are calculated using different methods by exploiting the information associated with the image coordinates of the indices detected in the index detection step.

27. A computer-readable medium storing commands for causing a computer to perform a position/orientation measurement method for measuring a position and an orientation of a measurement target object, the method comprising:

an orientation measurement value input step of inputting an orientation measurement value from an orientation sensor attached to the measurement target object;

a captured image acquisition step of acquiring a captured image;

an index detection step of detecting indices included in the captured image; and a position/orientation calculation step of calculating the position and the orientation of the measurement target using information associated with image coordinates of the detected indices, and the orientation measurement value, wherein in the position/orientation calculation step, the position and the orientation of the image capture device are calculated using, as evaluation criteria, a difference between actually measured values of the information associated with the image coordinates of the detected indices and theoretical values of the information associated with the image coordinates of the detected indices, which are calculated based on estimated values of the position and the orientation of the image capture device, and a difference between the estimated values and at least some parameters of the orientation measurement value.

28. A computer-readable medium storing commands for causing a computer to perform a position/orientation measurement method for measuring a position and an orientation of an image capture device as a measurement target object, the method comprising:

an orientation measurement value input step of inputting an orientation measurement value from an orientation sensor attached to the image capture device;

an image input step of inputting an image captured by the image capture device;

an index detection step of detecting indices included in the captured image;

a weight setting step of setting a weight input by an operator; and a position/orientation calculation step of calculating the position and the orientation of the image capture device using information associated with image coordinates of the indices detected in the index detection step, and the orientation measurement value, wherein in the position/orientation calculation step, the position and the orientation of the image capture device are calculated by changing influences of the information associated with the image coordinates of the indices and the orientation measurement value in accordance with the weight set in the weight setting step.

29. A computer-readable medium storing commands for causing a computer to perform a position/orientation measurement method for measuring a position and an orientation of an image capture device as a measurement target object, the method comprising:

an orientation measurement value input step of inputting an orientation measurement value from an orientation sensor attached to the image capture device;

an image input step of inputting an image captured by the image capture device;

an index detection step of detecting indices included in the captured image;

a mode selection step of selecting one of a first mode focused on the information associated with the image coordinates of the indices, a second mode focused on the orientation measurement value, and a third mode as an intermediate mode between the first mode and the second mode; and a position/orientation calculation step of calculating the position and the orientation of the image capture device by applying a method according to the mode selected in the mode selection step using information associated with image coordinates of the indices detected in the index detection step, and the orientation measurement value.

* * * * *